US012467267B2

(12) United States Patent
Whispell et al.

(10) Patent No.: US 12,467,267 B2
(45) **Date of Patent: *Nov. 11, 2025**

(54) FLOOR COVERING WITH INTERLOCKING DESIGN

(71) Applicant: Välinge Innovation AB, Viken (SE)

(72) Inventors: John M. Whispell, Woodstown, NJ (US); Hao A. Chen, Chadds Ford, PA (US)

(73) Assignee: VÄLINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 19/076,403

(22) Filed: Mar. 11, 2025

(65) Prior Publication Data

US 2025/0207411 A1 Jun. 26, 2025

Related U.S. Application Data

(63) Continuation of application No. 18/369,836, filed on Sep. 18, 2023, now Pat. No. 12,281,482, which is a (Continued)

(51) Int. Cl.
*E04F 15/02* (2006.01)
*B32B 3/06* (2006.01)
(Continued)

(52) U.S. Cl.
CPC .............. *E04F 15/107* (2013.01); *B32B 3/06* (2013.01); *B32B 5/024* (2013.01); *B32B 5/18* (2013.01);
(Continued)

(58) Field of Classification Search
CPC .......... E04F 15/02038; E04F 15/02033; E04F 13/0889; E04F 13/0894; E04F 2201/02;
(Continued)

(56) References Cited

U.S. PATENT DOCUMENTS 1,787,027 A 12/1930 Wasleff
3,120,083 A 2/1964 Dahlberg et al.
(Continued)

FOREIGN PATENT DOCUMENTS

CA 2252791 A1 5/1999
CN 1270263 A 10/2000
(Continued)

OTHER PUBLICATIONS

Communication Pursuant to Article 94(3) EPC mailed Oct. 13, 2017 in EP Patent Application No. 14 794 996.0, EPO, Munich, DE, 9 pages.
(Continued)

*Primary Examiner* — Kyle J. Walraed-Sullivan
(74) *Attorney, Agent, or Firm* — Boone IP Law

(57) ABSTRACT

Surface coverings, such as floor coverings, with an interlocking design are described. Methods of making the surface coverings are further described. A plank including a resilient composite sheet having four sides, an upper surface, a lower surface, and an overall thickness, and said composite sheet including at least one base layer, wherein said at least one base layer including at least one polymeric material and at least one filler, wherein opposite sides of the composite sheet include a first tongue on a first side and a first groove on the opposite second side, wherein the first tongue and first groove have complementary shape to each other to be interlockingly engageable with a corresponding groove or tongue on an adjacent floor plank.

17 Claims, 43 Drawing Sheets

Related U.S. Application Data continuation of application No. 17/743,795, filed on May 13, 2022, now Pat. No. 11,795,701, which is a continuation of application No. 16/887,559, filed on May 29, 2020, now Pat. No. 11,359,387, which is a continuation of application No. 15/072,829, filed on Mar. 17, 2016, now Pat. No. 10,704,269, which is a continuation of application No. 14/463,008, filed on Aug. 19, 2014, now Pat. No. 9,695,601, which is a continuation of application No. 12/987,573, filed on Jan. 10, 2011, now Pat. No. 8,833,028.

(60) Provisional application No. 61/293,831, filed on Jan. 11, 2010.

(51) Int. Cl.

| | |
|---|---|
| ***B32B 5/02*** | (2006.01) |
| ***B32B 5/18*** | (2006.01) |
| ***B32B 5/24*** | (2006.01) |
| ***B32B 7/12*** | (2006.01) |
| ***E04F 15/10*** | (2006.01) |

(52) U.S. Cl.

CPC ................ *B32B 5/245* (2013.01); *B32B 7/12* (2013.01); *E04F 15/02* (2013.01); *E04F 15/02005* (2013.01); *E04F 15/02016* (2013.01); *E04F 15/02033* (2013.01); *E04F 15/02038* (2013.01); *E04F 15/0215* (2013.01); *E04F 15/102* (2013.01); *E04F 15/105* (2013.01); *B32B 2255/02* (2013.01); *B32B 2266/0235* (2013.01); *B32B 2419/04* (2013.01); *E04F 2201/0153* (2013.01); *E04F 2201/0161* (2013.01)

(58) Field of Classification Search

CPC .......... E04F 2201/023; E04F 2201/027; E04F 2201/028; E04F 2201/03; E04F 2201/043; B32B 3/06

See application file for complete search history.

(56) References Cited

U.S. PATENT DOCUMENTS 3,247,638 A 4/1966 Gay, Jr.
3,538,665 A 11/1970 Gohner
3,694,983 A 10/1972 Couquet
3,720,027 A 3/1973 Christensen
3,742,669 A 7/1973 Mansfeld
3,760,547 A 9/1973 Brenneman
3,787,259 A * 1/1974 Kleinfeld ............. D06N 7/0084 156/283
3,857,749 A 12/1974 Yoshida
3,919,820 A 11/1975 Green
3,950,581 A 4/1976 Maurin
4,113,399 A 9/1978 Hansen, Sr.
4,172,169 A 10/1979 Mawson et al.
4,176,210 A 11/1979 Skinner
4,180,615 A 12/1979 Bettoli
4,187,131 A 2/1980 Graham et al.
4,196,554 A 4/1980 Anderson et al.
4,313,866 A 2/1982 Renshaw
4,333,987 A 6/1982 Kwart et al.
4,393,187 A 7/1983 Boba et al.
4,423,178 A 12/1983 Renshaw
4,426,820 A 1/1984 Terbrack et al.
4,489,115 A 12/1984 Layman et al.
4,507,188 A 3/1985 Chu
4,512,131 A 4/1985 Laramore
4,599,841 A 7/1986 Haid
4,614,680 A 9/1986 Fry et al.
4,772,500 A 9/1988 Stroppiana
4,785,065 A 11/1988 Uhl et al.
4,807,412 A 2/1989 Frederiksen
5,007,222 A 4/1991 Raymond
5,112,671 A 5/1992 Diamond et al.
5,148,850 A 9/1992 Urbanick
5,162,141 A 11/1992 Davey et al.
5,182,892 A 2/1993 Chase
5,344,700 A 9/1994 Mcgath et al.
5,380,794 A 1/1995 Schaefer et al.
5,441,677 A 8/1995 Phillips, Sr.
5,458,953 A 10/1995 Wang et al.
5,465,546 A 11/1995 Buse
5,548,937 A 8/1996 Shimonohara
5,618,602 A 4/1997 Nelson
5,630,304 A 5/1997 Austin
5,670,237 A 9/1997 Shultz et al.
5,694,730 A 12/1997 Del et al.
5,797,237 A 8/1998 Finkell, Jr.
5,950,389 A 9/1999 Porter
6,006,486 A 12/1999 Moriau et al.
6,052,960 A 4/2000 Yonemura
6,065,262 A 5/2000 Motta
6,101,778 A 8/2000 Goeran
6,139,945 A 10/2000 Krejchi et al.
6,173,548 B1 1/2001 Hamar et al.
6,182,410 B1 2/2001 Pervan
6,209,278 B1 4/2001 Tychsen
6,216,409 B1 4/2001 Roy et al.
6,233,899 B1 5/2001 Mellert et al.
6,291,078 B1 9/2001 Chen et al.
6,324,809 B1 12/2001 Nelson
6,332,733 B1 12/2001 Hamberger et al.
6,345,481 B1 2/2002 Nelson
6,363,677 B1 4/2002 Chen et al.
6,455,127 B1 9/2002 Valtanen
6,490,836 B1 12/2002 Moriau et al.
6,497,079 B1 12/2002 Pletzer et al.
6,505,452 B1 1/2003 Hannig et al.
6,536,178 B1 3/2003 Paalsson et al.
6,536,778 B2 3/2003 Behil et al.
6,546,691 B2 4/2003 Leopolder
6,553,724 B1 4/2003 Bigler
6,558,070 B1 5/2003 Valtanen
6,617,009 B1 9/2003 Chen et al.
6,647,690 B1 11/2003 Martensson
6,672,030 B2 1/2004 Schulte
6,675,545 B2 1/2004 Chen et al.
6,729,091 B1 5/2004 Martensson
6,761,008 B2 7/2004 Chen et al.
6,763,643 B1 7/2004 Maartensson
6,766,622 B1 7/2004 Thiers
6,769,218 B2 8/2004 Pervan
6,769,219 B2 8/2004 Schwitte et al.
6,772,568 B2 8/2004 Thiers et al.
6,790,512 B2 9/2004 Macqueen et al.
6,804,926 B1 10/2004 Eisermann
6,851,241 B2 2/2005 Pervan
6,854,235 B2 2/2005 Martensson
6,862,857 B2 3/2005 Tychsen
6,865,855 B2 3/2005 Knauseder
6,874,292 B2 4/2005 Moriau et al.
6,880,307 B2 4/2005 Schwitte et al.
6,895,881 B1 5/2005 Whitaker
6,928,779 B2 8/2005 Moriau et al.
6,986,934 B2 1/2006 Chen et al.
7,051,486 B2 5/2006 Pervan
7,090,430 B1 8/2006 Fletcher et al.
7,121,058 B2 10/2006 Palsson et al.
7,155,871 B1 1/2007 Stone et al.
7,169,460 B1 1/2007 Chen et al.
7,171,791 B2 2/2007 Pervan
7,211,310 B2 5/2007 Chen et al.
7,251,916 B2 8/2007 Konzelmann et al.
7,275,350 B2 10/2007 Pervan et al.
7,337,588 B1 3/2008 Moebus
7,377,081 B2 5/2008 Ruhdorfer
7,398,625 B2 7/2008 Pervan
7,419,717 B2 9/2008 Chen et al.
7,451,578 B2 11/2008 Hannig
7,454,875 B2 11/2008 Pervan et al.

(56) References Cited

U.S. PATENT DOCUMENTS

| | | | |
|---|---|---|---|
| 7,484,337 | B2 | 2/2009 | Hecht |
| 7,552,568 | B2 | 6/2009 | Paalsson et al. |
| 7,568,322 | B2 | 8/2009 | Pervan |
| 7,584,583 | B2 | 9/2009 | Bergelin et al. |
| 7,603,826 | B1 | 10/2009 | Moebus |
| 7,607,271 | B2 | 10/2009 | Griffin et al. |
| 7,614,197 | B2 | 11/2009 | Nelson |
| 7,617,645 | B2 | 11/2009 | Moriau et al. |
| 7,621,092 | B2 | 11/2009 | Groeke et al. |
| 7,621,094 | B2 | 11/2009 | Moriau et al. |
| 7,634,886 | B2 | 12/2009 | Moriau et al. |
| 7,634,887 | B2 | 12/2009 | Moriau et al. |
| 7,637,066 | B2 | 12/2009 | Moriau et al. |
| 7,640,708 | B2 | 1/2010 | Moriau et al. |
| 7,644,555 | B2 | 1/2010 | Moriau et al. |
| 7,644,557 | B2 | 1/2010 | Moriau et al. |
| 7,647,743 | B2 | 1/2010 | Moriau et al. |
| 7,650,728 | B2 | 1/2010 | Moriau et al. |
| 7,654,054 | B2 | 2/2010 | Moriau et al. |
| 7,658,048 | B2 | 2/2010 | Moriau et al. |
| 7,677,001 | B2 | 3/2010 | Pervan |
| 7,678,215 | B2 | 3/2010 | Martin et al. |
| 7,716,896 | B2 | 5/2010 | Pervan |
| 7,739,849 | B2 | 6/2010 | Pervan |
| 7,763,345 | B2 | 7/2010 | Chen et al. |
| 7,779,597 | B2 | 8/2010 | Thiers et al. |
| 7,802,415 | B2 | 9/2010 | Pervan et al. |
| 7,841,144 | B2 | 11/2010 | Pervan |
| 7,841,150 | B2 | 11/2010 | Pervan |
| 7,856,784 | B2 | 12/2010 | Martensson |
| 7,856,789 | B2 | 12/2010 | Eisermann |
| 7,861,482 | B2 | 1/2011 | Pervan et al. |
| 7,866,110 | B2 | 1/2011 | Pervan |
| 7,886,497 | B2 | 2/2011 | Pervan |
| 7,896,571 | B1 | 3/2011 | Hannig et al. |
| 7,930,862 | B2 | 4/2011 | Bergelin et al. |
| 7,958,689 | B2 | 6/2011 | Lei |
| 7,980,043 | B2 | 7/2011 | Moebus |
| 7,984,600 | B2 | 7/2011 | Alford et al. |
| 8,006,460 | B2 | 8/2011 | Chen et al. |
| 8,021,741 | B2 | 9/2011 | Chen et al. |
| 8,028,486 | B2 | 10/2011 | Pervan et al. |
| 8,037,656 | B2 | 10/2011 | Liu et al. |
| 8,038,363 | B2 | 10/2011 | Hannig et al. |
| 8,042,311 | B2 | 10/2011 | Pervan et al. |
| 8,071,193 | B2 | 12/2011 | Windmoeller |
| 8,091,238 | B2 | 1/2012 | Hannig |
| 8,099,924 | B2 | 1/2012 | Braun |
| 8,112,891 | B2 | 2/2012 | Pervan |
| 8,132,384 | B2 | 3/2012 | Hannig |
| 8,166,718 | B2 | 5/2012 | Liu |
| 8,191,328 | B1 | 6/2012 | Liu |
| 8,191,333 | B2 | 6/2012 | Braun |
| 8,196,366 | B2 | 6/2012 | Thiers et al. |
| 8,215,078 | B2 | 7/2012 | Pervan |
| 8,234,829 | B2 | 8/2012 | Thiers et al. |
| 8,245,478 | B2 | 8/2012 | Bergelin et al. |
| 8,281,549 | B2 | 10/2012 | Du |
| 8,293,058 | B2 | 10/2012 | Pervan et al. |
| 8,353,140 | B2 | 1/2013 | Pervan et al. |
| 8,356,452 | B2 | 1/2013 | Thiers et al. |
| 8,365,499 | B2 | 2/2013 | Nilsson et al. |
| 8,375,672 | B2 | 2/2013 | Hannig |
| 8,375,674 | B2 | 2/2013 | Braun et al. |
| 8,480,841 | B2 | 7/2013 | Pervan et al. |
| 8,484,924 | B2 | 7/2013 | Braun |
| 8,490,361 | B2 | 7/2013 | Curry et al. |
| 8,499,521 | B2 | 8/2013 | Pervan et al. |
| 8,511,031 | B2 | 8/2013 | Bergelin et al. |
| 8,544,231 | B2 | 10/2013 | Hannig |
| 8,544,232 | B2 | 10/2013 | Wybo et al. |
| 8,544,234 | B2 | 10/2013 | Pervan et al. |
| 8,584,423 | B2 | 11/2013 | Pervan et al. |
| 8,613,826 | B2 | 12/2013 | Pervan et al. |
| 8,658,274 | B2 | 2/2014 | Chen et al. |
| 8,707,651 | B2 | 4/2014 | Stockl |
| 8,726,604 | B2 | 5/2014 | Hannig |
| 8,745,952 | B2 | 6/2014 | Perra et al. |
| 8,756,899 | B2 | 6/2014 | Nilsson et al. |
| 8,763,340 | B2 | 7/2014 | Pervan et al. |
| 8,800,150 | B2 | 8/2014 | Pervan |
| 8,806,832 | B2 | 8/2014 | Kell |
| 8,833,028 | B2 | 9/2014 | Whispell et al. |
| 8,834,992 | B2 | 9/2014 | Chen et al. |
| 8,952,078 | B2 | 2/2015 | Gould |
| 8,966,853 | B2 | 3/2015 | Hannig |
| 8,978,336 | B2 | 3/2015 | Perra et al. |
| 9,103,126 | B2 | 8/2015 | Kell |
| 9,212,492 | B2 | 12/2015 | Pervan et al. |
| 9,217,250 | B2 | 12/2015 | Perra et al. |
| 9,222,267 | B2 | 12/2015 | Bergelin et al. |
| 9,249,581 | B2 | 2/2016 | Nilsson et al. |
| 9,260,870 | B2 | 2/2016 | Vermeulen et al. |
| 9,296,191 | B2 | 3/2016 | Pervan et al. |
| 9,314,936 | B2 | 4/2016 | Pervan |
| 9,410,328 | B2 | 8/2016 | Pervan |
| 9,528,278 | B2 | 12/2016 | Cappelle |
| 9,650,792 | B2 | 5/2017 | Ramachandra |
| 9,695,600 | B2 | 7/2017 | Vandevoorde et al. |
| 9,695,601 | B2 | 7/2017 | Whispell et al. |
| 9,714,515 | B2 | 7/2017 | Pervan |
| 9,765,530 | B2 | 9/2017 | Bergelin et al. |
| 9,777,487 | B2 | 10/2017 | Pervan et al. |
| 9,874,035 | B2 | 1/2018 | Wagner |
| 10,000,935 | B2 | 6/2018 | Kell |
| 10,047,527 | B2 | 8/2018 | Nilsson et al. |
| 10,059,084 | B2 | 8/2018 | Lundblad et al. |
| 10,113,318 | B2 | 10/2018 | Cappelle et al. |
| 10,137,659 | B2 | 11/2018 | Pervan |
| 10,214,917 | B2 | 2/2019 | Pervan et al. |
| 10,287,777 | B2 | 5/2019 | Boo |
| 10,301,830 | B2 | 5/2019 | Boo |
| 10,316,526 | B2 | 6/2019 | Kell |
| 10,344,379 | B2 | 7/2019 | Pervan et al. |
| 10,407,919 | B2 | 9/2019 | Boo |
| 10,450,760 | B2 | 10/2019 | Bergelin et al. |
| 10,486,399 | B2 | 11/2019 | Chen et al. |
| 10,493,731 | B2 | 12/2019 | Lundblad et al. |
| 10,526,793 | B2 | 1/2020 | Nilsson et al. |
| 10,704,269 | B2 | 7/2020 | Whispell et al. |
| 10,780,676 | B2 | 9/2020 | Lundblad et al. |
| 10,808,410 | B2 | 10/2020 | Boo et al. |
| 10,837,181 | B2 | 11/2020 | Josefsson et al. |
| 10,844,612 | B2 | 11/2020 | Boo |
| 10,851,549 | B2 | 12/2020 | Boo |
| 10,865,571 | B2 | 12/2020 | Kell |
| 11,421,426 | B2 | 8/2022 | Boo |
| 2001/0021431 | A1 | 9/2001 | Chen et al. |
| 2001/0024707 | A1 | 9/2001 | Andersson et al. |
| 2002/0007606 | A1 | 1/2002 | Kettler et al. |
| 2002/0007608 | A1 | 1/2002 | Pervan |
| 2002/0007609 | A1 | 1/2002 | Pervan |
| 2002/0014047 | A1 | 2/2002 | Thiers |
| 2002/0020127 | A1 | 2/2002 | Thiers et al. |
| 2002/0031646 | A1 | 3/2002 | Chen et al. |
| 2002/0046528 | A1 | 4/2002 | Pervan et al. |
| 2002/0069611 | A1 | 6/2002 | Leopolder |
| 2002/0092263 | A1 | 7/2002 | Schulte |
| 2002/0142135 | A1 | 10/2002 | Chen et al. |
| 2002/0152707 | A1 | 10/2002 | Martensson |
| 2002/0170258 | A1 | 11/2002 | Schwitte et al. |
| 2002/0178674 | A1 | 12/2002 | Pervan |
| 2002/0178681 | A1 | 12/2002 | Zancai et al. |
| 2002/0189183 | A1 | 12/2002 | Ricciardelli |
| 2003/0009971 | A1 | 1/2003 | Palmberg |
| 2003/0024199 | A1 | 2/2003 | Pervan et al. |
| 2003/0024200 | A1 | 2/2003 | Moriau et al. |
| 2003/0037504 | A1 | 2/2003 | Schwitte et al. |
| 2003/0041545 | A1 | 3/2003 | Stanchfield |
| 2003/0084636 | A1 | 5/2003 | Pervan |
| 2003/0101674 | A1 | 6/2003 | Pervan et al. |
| 2003/0101681 | A1 | 6/2003 | Tychsen |
| 2003/0110720 | A1 | 6/2003 | Berard et al. |
| 2003/0133353 | A1 | 7/2003 | Kato et al. |

(56) References Cited

U.S. PATENT DOCUMENTS

2003/0143383 A1* 7/2003 Eshbach, Jr. ........... E04F 15/02 428/209
2003/0154681 A1 8/2003 Pletzer et al.
2003/0163968 A1 9/2003 Nel
2003/0180091 A1 9/2003 Stridsman
2003/0188504 A1 10/2003 Ralf
2003/0196405 A1 10/2003 Pervan
2003/0203213 A1* 10/2003 Woo ........................ C08L 61/12 428/422.8
2003/0224147 A1 12/2003 Maine et al.
2004/0031225 A1 2/2004 Fowler
2004/0031227 A1 2/2004 Knauseder
2004/0035080 A1 2/2004 Becker
2004/0060255 A1 4/2004 Knauseder
2004/0068954 A1 4/2004 Martensson
2004/0128934 A1 7/2004 Hecht
2004/0137180 A1 7/2004 Sjoberg et al.
2004/0139678 A1 7/2004 Pervan
2004/0159066 A1 8/2004 Thiers et al.
2004/0168392 A1 9/2004 Konzelmann et al.
2004/0177584 A1 9/2004 Pervan
2004/0182036 A1 9/2004 Sjoberg et al.
2004/0187424 A1 9/2004 Wang
2004/0206036 A1 10/2004 Pervan
2004/0211143 A1 10/2004 Hanning
2004/0211144 A1 10/2004 Stanchfield
2004/0219339 A1 11/2004 Dempsey et al.
2004/0241374 A1 12/2004 Thiers et al.
2004/0255538 A1 12/2004 Ruhdorfer
2004/0255541 A1 12/2004 Thiers et al.
2004/0261348 A1 12/2004 Vulin
2005/0003160 A1 1/2005 Chen et al.
2005/0005559 A1 1/2005 Ralf
2005/0028474 A1* 2/2005 Kim ........................ E04F 15/04 52/578
2005/0050827 A1 3/2005 Schitter
2005/0076598 A1 4/2005 Lewark
2005/0079780 A1* 4/2005 Rowe ........................ B32B 5/18 442/326
2005/0112320 A1 5/2005 Wright
2005/0138881 A1 6/2005 Pervan
2005/0144881 A1 7/2005 Tate et al.
2005/0166514 A1 8/2005 Pervan
2005/0176321 A1 8/2005 Crette et al.
2005/0193677 A1 9/2005 Vogel
2005/0208255 A1 9/2005 Pervan
2005/0210810 A1 9/2005 Pervan
2005/0221073 A1 10/2005 Liou
2005/0235593 A1 10/2005 Hecht
2005/0247000 A1 11/2005 Zhu
2005/0250921 A1 11/2005 Qiu et al.
2005/0252130 A1 11/2005 Martensson
2005/0268570 A2 12/2005 Pervan
2006/0010820 A1 1/2006 Schwitte et al.
2006/0032168 A1 2/2006 Thiers et al.
2006/0032175 A1 2/2006 Chen et al.
2006/0053724 A1 3/2006 Braun et al.
2006/0070333 A1 4/2006 Pervan
2006/0075713 A1 4/2006 Pervan et al.
2006/0101769 A1 5/2006 Pervan et al.
2006/0154015 A1 7/2006 Miller et al.
2006/0156666 A1 7/2006 Caufield
2006/0169773 A1 8/2006 Lyons et al.
2006/0174974 A1 8/2006 Brannstrom et al.
2006/0179773 A1 8/2006 Pervan
2006/0225377 A1 10/2006 Moriau et al.
2006/0236642 A1 10/2006 Pervan
2006/0248830 A1 11/2006 Gustaaf et al.
2006/0248831 A1 11/2006 Moriau et al.
2006/0260252 A1 11/2006 Brice
2006/0260254 A1 11/2006 Pervan
2007/0006543 A1 1/2007 Engstrom
2007/0011981 A1 1/2007 Eisermann
2007/0022694 A1 2/2007 Chen et al.
2007/0028547 A1 2/2007 Grafenauer et al.
2007/0094986 A1 5/2007 Moriau et al.
2007/0094987 A1 5/2007 Moriau et al.
2007/0107359 A1 5/2007 Zhang
2007/0130872 A1 6/2007 Goodwin et al.
2007/0151189 A1 7/2007 Yang
2007/0151191 A1 7/2007 August
2007/0154840 A1 7/2007 Thies et al.
2007/0175148 A1 8/2007 Bergelin et al.
2007/0175156 A1 8/2007 Pervan et al.
2007/0184230 A1 8/2007 Verrue et al.
2007/0193178 A1 8/2007 Groeke et al.
2007/0196624 A1 8/2007 Chen et al.
2007/0218252 A1 9/2007 Donald
2007/0275207 A1 11/2007 Higgins et al.
2008/0000182 A1 1/2008 Pervan
2008/0000183 A1 1/2008 Bergelin et al.
2008/0000186 A1 1/2008 Pervan et al.
2008/0000187 A1 1/2008 Pervan
2008/0000188 A1 1/2008 Pervan
2008/0010931 A1 1/2008 Pervan et al.
2008/0010937 A1 1/2008 Pervan et al.
2008/0028707 A1 2/2008 Pervan
2008/0028713 A1 2/2008 Pervan et al.
2008/0029490 A1 2/2008 Martin et al.
2008/0034701 A1 2/2008 Pervan
2008/0034708 A1 2/2008 Pervan
2008/0041007 A1 2/2008 Pervan et al.
2008/0053028 A1 3/2008 Moriau et al.
2008/0060309 A1 3/2008 Moriau et al.
2008/0060310 A1 3/2008 Moriau et al.
2008/0092473 A1 4/2008 Heyns
2008/0104921 A1 5/2008 Pervan et al.
2008/0110125 A1 5/2008 Pervan
2008/0120938 A1 5/2008 Jacobsson et al.
2008/0134607 A1 6/2008 Pervan et al.
2008/0134613 A1 6/2008 Pervan
2008/0134614 A1 6/2008 Pervan et al.
2008/0138560 A1* 6/2008 Windmoller .............. B32B 3/02 428/46
2008/0141610 A1 6/2008 Thiers et al.
2008/0148674 A1 6/2008 Thiers et al.
2008/0153609 A1 6/2008 Kotler
2008/0172971 A1 7/2008 Pervan
2008/0184646 A1 8/2008 Alford et al.
2008/0216435 A1 9/2008 Nolan
2008/0241440 A1 10/2008 Bauer
2008/0245020 A1 10/2008 Kiefel et al.
2008/0256890 A1 10/2008 Pervan et al.
2008/0311355 A1 12/2008 Chen et al.
2009/0031662 A1 2/2009 Chen et al.
2009/0038253 A1 2/2009 Martensson
2009/0049787 A1 2/2009 Hannig
2009/0101236 A1 4/2009 Boucke
2009/0110888 A1 4/2009 Wuest et al.
2009/0133353 A1 5/2009 Pervan et al.
2009/0133358 A1* 5/2009 Hecht ................... E04F 15/181 52/741.1
2009/0151290 A1 6/2009 Liu
2009/0159156 A1 6/2009 Walker
2009/0186710 A1 7/2009 Joseph
2009/0193748 A1 8/2009 Boo et al.
2009/0193753 A1 8/2009 Schitter
2009/0217611 A1 9/2009 Schrader
2009/0223162 A1 9/2009 Chen et al.
2009/0226662 A1 9/2009 Dyczko-Riglin et al.
2009/0235604 A1 9/2009 Cheng et al.
2009/0249731 A1 10/2009 Cappelle
2009/0249733 A1 10/2009 Moebus
2009/0260313 A1 10/2009 Segaert
2009/0272058 A1 11/2009 Duselis et al.
2009/0320402 A1 12/2009 Schacht et al.
2010/0011695 A1 1/2010 Cheng et al.
2010/0018147 A1 1/2010 Du
2010/0018149 A1 1/2010 Thiers
2010/0031594 A1 2/2010 Liu et al.
2010/0037550 A1 2/2010 Braun
2010/0043333 A1 2/2010 Hannig
2010/0058702 A1 3/2010 Lei
2010/0260962 A1 10/2010 Chen et al.

(56) References Cited

U.S. PATENT DOCUMENTS

2010/0293879 A1 11/2010 Pervan et al.
2010/0300029 A1 12/2010 Braun et al.
2010/0319293 A1 12/2010 Dammers
2011/0001420 A1 1/2011 Tchakarov et al.
2011/0008567 A1 1/2011 Weeks et al.
2011/0030303 A1 2/2011 Pervan et al.
2011/0041996 A1 2/2011 Pervan
2011/0056167 A1 3/2011 Nilsson
2011/0094178 A1 4/2011 Braun
2011/0114224 A1 5/2011 Fridlund
2011/0131901 A1 6/2011 Pervan et al.
2011/0131909 A1 6/2011 Hannig
2011/0136188 A1 6/2011 Jones et al.
2011/0138722 A1 6/2011 Hannig
2011/0146177 A1 6/2011 Hannig
2011/0146188 A1 6/2011 Wallin
2011/0154763 A1 6/2011 Bergelin et al.
2011/0162312 A1 7/2011 Schulte
2011/0167744 A1 7/2011 Whispell et al.
2011/0173914 A1 7/2011 Engstrom
2011/0247285 A1 10/2011 Wybo et al.
2011/0247748 A1 10/2011 Pervan et al.
2011/0258959 A1 10/2011 Braun
2011/0296780 A1 12/2011 Ulrich
2012/0003439 A1 1/2012 Chen et al.
2012/0017534 A1 1/2012 Oh
2012/0040149 A1 2/2012 Chen et al.
2012/0066996 A1 3/2012 Konstanczak
2012/0067461 A1 3/2012 Braun
2012/0096801 A1 4/2012 Cappelle
2012/0124932 A1 5/2012 Schulte et al.
2012/0137617 A1 6/2012 Pervan
2012/0174521 A1 7/2012 Schulte
2012/0180416 A1 7/2012 Perra et al.
2012/0216472 A1 8/2012 Martensson et al.
2012/0266555 A1 10/2012 Cappelle
2012/0276369 A1 11/2012 Jing et al.
2012/0279154 A1 11/2012 Bergelin et al.
2013/0014890 A1 1/2013 Pervan et al.
2013/0042558 A1 2/2013 Cordeiro
2013/0042563 A1 2/2013 Pervan et al.
2013/0047536 A1 2/2013 Pervan
2013/0097959 A1 4/2013 Michel
2013/0111758 A1 5/2013 Nilsson et al.
2013/0152492 A1 6/2013 Whitaker
2013/0160391 A1 6/2013 Pervan et al.
2013/0212971 A1 8/2013 Cordeiro
2013/0269863 A1 10/2013 Pervan et al.
2013/0276398 A1 10/2013 Hannig
2013/0283719 A1 10/2013 Doehring et al.
2013/0283720 A1 10/2013 Pervan et al.
2013/0298487 A1 11/2013 Bergelin et al.
2014/0007539 A1 1/2014 Pervan et al.
2014/0033633 A1 2/2014 Kell
2014/0033635 A1 2/2014 Pervan et al.
2014/0069043 A1 3/2014 Pervan
2014/0069044 A1 3/2014 Wallin
2014/0115994 A1 5/2014 Pervan et al.
2014/0237924 A1 8/2014 Nilsson et al.
2014/0242342 A1 8/2014 Vandevoorde et al.
2014/0283466 A1 9/2014 Boo
2014/0287194 A1 9/2014 Pervan et al.
2014/0318061 A1 10/2014 Pervan
2014/0325930 A1 11/2014 Schneider
2014/0352248 A1 12/2014 Whispell et al.
2014/0356594 A1 12/2014 Chen et al.
2014/0366476 A1 12/2014 Pervan et al.
2014/0366477 A1 12/2014 Kell
2015/0225964 A1 8/2015 Chen et al.
2015/0233127 A1 8/2015 Dohring
2015/0240500 A1 8/2015 Stevens, Jr.
2015/0252573 A1 9/2015 Devos
2015/0337542 A1 11/2015 Cappelle et al.
2015/0368910 A1 12/2015 Kell
2016/0016390 A1 1/2016 Lundblad et al.
2016/0016391 A1 1/2016 Lundblad et al.
2016/0047129 A1 2/2016 Bowers
2016/0052245 A1 2/2016 Chen et al.
2016/0069089 A1 3/2016 Bergelin et al.
2016/0076260 A1 3/2016 Pervan et al.
2016/0108624 A1 4/2016 Nilsson et al.
2016/0186318 A1 6/2016 Pervan et al.
2016/0194883 A1 7/2016 Pervan
2016/0194885 A1 7/2016 Whispell et al.
2016/0201324 A1 7/2016 Hkansson et al.
2016/0201336 A1 7/2016 Pervan
2016/0265234 A1 9/2016 Pervan
2016/0375674 A1 12/2016 Schulte
2017/0009462 A1 1/2017 Muehlebach
2017/0030088 A1 2/2017 Simoens
2017/0037642 A1 2/2017 Boo
2017/0037645 A1 2/2017 Pervan
2017/0067261 A1 3/2017 Hannig et al.
2017/0165936 A1 6/2017 Schulte
2017/0167145 A1 6/2017 Naeyaert
2017/0175400 A1 6/2017 Josefsson et al.
2017/0241136 A1 8/2017 Kell
2017/0335571 A1 11/2017 Hannig
2017/0342725 A1 11/2017 Pervan et al.
2017/0350140 A1 12/2017 Bergelin et al.
2017/0362834 A1 12/2017 Pervan et al.
2018/0002935 A1 1/2018 Devos
2018/0010342 A1 1/2018 Van Hooydonck
2018/0094441 A1 4/2018 Boo
2018/0119429 A1 5/2018 Schulte
2018/0155934 A1 6/2018 D'Hondt et al.
2018/0179763 A1 6/2018 Simon et al.
2018/0298622 A1 10/2018 Courey et al.
2018/0305937 A1 10/2018 Cappelle et al.
2018/0313093 A1 11/2018 Nilsson et al.
2019/0024388 A1 1/2019 Devos
2019/0091977 A1 3/2019 Lundblad et al.
2019/0106887 A1 4/2019 Simon
2019/0106888 A1 4/2019 Liu
2019/0127989 A1 5/2019 Kell
2019/0211569 A1 7/2019 Boo et al.
2019/0211571 A1 7/2019 Van et al.
2019/0249444 A1 8/2019 Kell
2019/0277041 A1 9/2019 Pervan et al.
2019/0292793 A1 9/2019 Van et al.
2019/0394314 A1 12/2019 Pervan et al.
2020/0056379 A1 2/2020 Boo
2020/0063441 A1 2/2020 Boo
2020/0063443 A1 2/2020 Boucke et al.
2020/0131784 A1 4/2020 Alberic
2020/0180282 A1 6/2020 Lundblad et al.
2020/0208409 A1 7/2020 Kell
2020/0232226 A1 7/2020 De Rick
2020/0248462 A1 8/2020 Bergelin et al.
2020/0263714 A1 8/2020 Schulte et al.
2020/0284049 A1 9/2020 De Rick
2020/0308846 A1 10/2020 Josefsson et al.
2020/0362567 A1 11/2020 Nilsson et al.
2020/0407981 A1 12/2020 Boo et al.
2021/0002907 A1 1/2021 Alberic
2021/0047838 A1 2/2021 Miclo
2021/0062517 A1 3/2021 Markovski et al.
2021/0087829 A1 3/2021 Ylikangas et al.
2021/0087831 A1 3/2021 Nilsson et al.
2021/0087832 A1 3/2021 Boo
2021/0087833 A1 3/2021 Ylikangas et al.
2021/0087834 A1 3/2021 Ylikangas et al.
2021/0114344 A1 4/2021 Van Vlassenrode
2021/0207385 A1 7/2021 Boo
2021/0214952 A1 7/2021 Alberic
2021/0214953 A1 7/2021 Kell
2021/0237397 A1 8/2021 Van Vlassenrode

FOREIGN PATENT DOCUMENTS

CN 1735737 A 2/2006
CN 1757856 A 4/2006
CN 101492950 A 7/2009
DE 2251762 A1 5/1974

(56) References Cited

FOREIGN PATENT DOCUMENTS

| | | | |
|---|---|---|---|
| DE | 19854475 | A1 | 7/1999 |
| DE | 20207844 | U1 | 8/2002 |
| DE | 202005004537 | U1 | 6/2005 |
| DE | 102005061099 | A1 | 3/2007 |
| DE | 102006024184 | A1 | 11/2007 |
| DE | 102006058655 | A1 | 6/2008 |
| DE | 102006058658 | A1 | 6/2008 |
| DE | 202008011589 | U1 | 11/2008 |
| DE | 202008012001 | U1 | 11/2008 |
| DE | 202004021867 | U1 | 12/2011 |
| EP | 1045083 | A1 | 10/2000 |
| EP | 1165906 | A1 | 1/2002 |
| EP | 1308577 | A2 | 5/2003 |
| EP | 1350904 | A2 | 10/2003 |
| EP | 1420125 | A2 | 5/2004 |
| EP | 1570143 | A1 | 9/2005 |
| EP | 1585875 | A1 | 10/2005 |
| EP | 1938963 | A1 | 7/2008 |
| EP | 2009197 | A1 | 12/2008 |
| FR | 1293043 | A | 5/1962 |
| GB | 1430423 | A | 3/1976 |
| JP | 60-255843 | A | 12/1985 |
| JP | 07-180333 | A | 7/1995 |
| JP | 07-300979 | A | 11/1995 |
| JP | 08-074405 | A | 3/1996 |
| JP | 3363976 | B2 | 1/2003 |
| KR | 10-1996-0005785 | A | 2/1996 |
| KR | 10-2008-0096189 | A | 10/2008 |
| KR | 10-0870496 | B1 | 11/2008 |
| SE | 0000785 | L | 9/2001 |
| WO | 94/26999 | A1 | 11/1994 |
| WO | 96/27721 | A1 | 9/1996 |
| WO | 98/58142 | A1 | 12/1998 |
| WO | 00/47841 | A1 | 8/2000 |
| WO | 00/66856 | A1 | 11/2000 |
| WO | 01/02669 | A1 | 1/2001 |
| WO | 01/02670 | A1 | 1/2001 |
| WO | 01/02671 | A1 | 1/2001 |
| WO | 01/44669 | A2 | 6/2001 |
| WO | 01/48331 | A1 | 7/2001 |
| WO | 01/48332 | A1 | 7/2001 |
| WO | 01/51732 | A1 | 7/2001 |
| WO | 01/51733 | A1 | 7/2001 |
| WO | 01/66877 | A1 | 9/2001 |
| WO | 01/75247 | A1 | 10/2001 |
| WO | 01/77461 | A1 | 10/2001 |
| WO | 01/88306 | A1 | 11/2001 |
| WO | 01/98604 | A1 | 12/2001 |
| WO | 2002/103135 | A1 | 12/2002 |
| WO | 03/12224 | A1 | 2/2003 |
| WO | 03/16654 | A1 | 2/2003 |
| WO | 03/44303 | A1 | 5/2003 |
| WO | 2004/011740 | A2 | 2/2004 |
| WO | 2004/016877 | A1 | 2/2004 |
| WO | 2004/044348 | A1 | 5/2004 |
| WO | 2004/050780 | A2 | 6/2004 |
| WO | 2004/053256 | A1 | 6/2004 |
| WO | 2004/085765 | A1 | 10/2004 |
| WO | 2005/068747 | A1 | 7/2005 |
| WO | 2005/088029 | A1 | 9/2005 |
| WO | 2005/098163 | A1 | 10/2005 |
| WO | 2006/032378 | A1 | 3/2006 |
| WO | 2006/043893 | A1 | 4/2006 |
| WO | 2006/123988 | A1 | 11/2006 |
| WO | 2006/133690 | A1 | 12/2006 |
| WO | 2007/015669 | A2 | 2/2007 |
| WO | 2007/016978 | A1 | 2/2007 |
| WO | 2007/020088 | A1 | 2/2007 |
| WO | 2007/079845 | A1 | 7/2007 |
| WO | 2007/118352 | A1 | 10/2007 |
| WO | 2008/008016 | A1 | 1/2008 |
| WO | 2008/008824 | A1 | 1/2008 |
| WO | 2008/068245 | A1 | 6/2008 |
| WO | 2008/071264 | A1 | 6/2008 |
| WO | 2008/116623 | A1 | 10/2008 |
| WO | 2008/133377 | A1 | 11/2008 |
| WO | 2009/061279 | A1 | 5/2009 |
| WO | 2009/071822 | A2 | 6/2009 |
| WO | 2010/015516 | A2 | 2/2010 |
| WO | 2010/023042 | A1 | 3/2010 |
| WO | 2010/028901 | A1 | 3/2010 |
| WO | 2010/072357 | A2 | 7/2010 |
| WO | 2010/081531 | A1 | 7/2010 |
| WO | 2010/081532 | A1 | 7/2010 |
| WO | 2010/086084 | A1 | 8/2010 |
| WO | 2010/114236 | A2 | 10/2010 |
| WO | 2010/128043 | A1 | 11/2010 |
| WO | 2011/012104 | A2 | 2/2011 |
| WO | 2011/028171 | A1 | 3/2011 |
| WO | 2011/077311 | A2 | 6/2011 |
| WO | 2013/026559 | A2 | 2/2013 |

OTHER PUBLICATIONS

Decision to grant received for European Application No. 11732276, mailed on Mar. 17, 2022, 2 pages.
Decision to grant received for European Application No. 22167416, mailed on Nov. 16, 2023, 2 pages.
European Search Report and Search Opinion received for European Application No. 22167416, mailed on Oct. 21, 2022, 6 pages.
Extended European Search Report issued in EP 11 732 276.8, May 11, 2017, EPO, Munich, DE, 12 pages.
Intention to grant received for European Application No. 11732276, mailed on Oct. 27, 2021, 6 pages.
Intention to grant received for European Application No. 22167416, mailed on Jul. 4, 2023, 7 pages.
International Preliminary Report on Patentability received for PCT Patent Application No. PCT/US11/020671, mailed on Jul. 26, 2012, 14 pages.
International Search Report and Written Opinion, dated Mar. 23, 2011 in PCT/US2011/020671, ISA/US, Alexandria, VA, 20 pages.
Lowe's, How to Install a Laminate Floor, YouTube video available for viewing at https://voutu.be/zhIXVHAeilk?t=3m52s, Oct. 2008 (last accessed Feb. 15, 2018).
Notice of Allowance received for Chinese Patent Application No. 201180012223.4, mailed on Oct. 9, 2014, 3 pages (2 pages of English Translation and 1 pages of Original Document).
Office Action received for Chinese Patent Application No. 201180012223.4, mailed on Mar. 5, 2014, 8 pages (4 pages of English Translation and 4 pages of Original Document).
Office Action received for European Application No. 11732276, mailed on Apr. 5, 2019, 4 pages.
Pervan, Darko (Author), Technical Disclosure entitled "VA073a Zip Loc," IP com No. IPCOM000210869D, Sep. 13, 2011, IP.com Prior Art Database, 36 pages.
Supplementary European Search Report and Search Opinion received for European Application No. 11732276, mailed on May 11, 2017, 12 pages.
U.S. Appl. No. 18/302,566, Richard William Kell, filed Apr. 18, 2023.
U.S. Appl. No. 18/369,836, John M. Whispell, filed Sep. 18, 2023.
U.S. Appl. No. 18/369,822, Christian Boo, filed Sep. 18, 2023.
U.S. Appl. No. 18/941,341, Lucas Larsson, filed Nov. 8, 2023.
U.S. Appl. No. 19/042,538, Mats Nilsson, filed Jan. 31, 2025.
U.S. Appl. No. 19/076,420, John M. Whispell, filed Mar. 11, 2025.
U.S. Appl. No. 19/076,428, John M. Whispell, filed Mar. 11, 2025.
U.S. Appl. No. 19/076,451, John M. Whispell, filed Mar. 11, 2025.
U.S. Appl. No. 19/251,640, John M. Whispell, filed Jun. 26, 2025.

* cited by examiner 4.0mm (0.158") – Side & Head Seam (4" Straight Edge)

FLOOR COVERING WITH INTERLOCKING DESIGN

CROSS REFERENCE TO RELATED APPLICATIONS

This patent application is a continuation of U.S. application Ser. No. 18/369,836, filed on Sep. 18, 2023, which is a continuation of U.S. application Ser. No. 17/743,795, filed on May 13, 2022, now U.S. Pat. No. 11,795,701, which is a continuation of U.S. application Ser. No. 16/887,559, filed on May 29, 2020, now U.S. Pat. No. 11,359,387, which is a continuation of U.S. application Ser. No. 15/072,829, filed on Mar. 17, 2016, now U.S. Pat. No. 10,704,269, which is a continuation of U.S. application Ser. No. 14/463,008, filed on Aug. 19, 2014, now U.S. Pat. No. 9,695,601, which is a continuation of U.S. patent application Ser. No. 12/987,573, filed on Jan. 10, 2011, now U.S. Pat. No. 8,833,028, which claims the benefit of U.S. Provisional Patent Application No. 61/293,831 filed Jan. 11, 2010. The entire contents of each of U.S. application Ser. No. 18/369,836, U.S. application Ser. No. 17/743,795, U.S. application Ser. No. 16/887,559, U.S. application Ser. No. 15/072,829, U.S. application Ser. No. 14/463,008, U.S. patent application Ser. No. 12/987,573, and U.S. Provisional Patent Application No. 61/293,831 are hereby incorporated herein by reference in their entirety.

BACKGROUND

The present invention relates to surface coverings including floor coverings. The present invention more particularly relates to surface coverings, such as floor coverings having an interlocking design to connect individual pieces of floor plank or tile together. The present invention further relates to methods of making the surface covering.

Some of the current surface coverings, such as vinyl floor coverings, are typically laid down by placing an adhesive underneath the floor covering or on the sub-floor or on the underlayment in order to secure the floor covering. In resilient floor coverings, a large piece of resilient floor covering is typically cut in order to fit the dimensions of the room. The resilient floor coverings can often be 12-foot wide and can be any length, such as 12 feet, 20 feet, or longer. With this type of surface covering, it is necessary to adhere the resilient surface covering, such as vinyl sheet flooring, to the sub-floor, underlayment, or floor surface in order to keep the surface covering in place and also to achieve a surface covering that is level and does not curl. The installation process of using full-spread adhesive is very time consuming, costly, messy as well as cumbersome. For instance, an installer in general has to do the floor preparation first to remove all oil, dirt, grease, wax, sealers, paint, adhesives, or any other substances that would hinder installation. In addition, the subfloor must be level without major pot holes or cracks; the conditions of the subfloor such as moisture content, structure soundness, etc., also have to be taken care of before the adhesive is applied. On the adhesive part, the selection of the right type of adhesive based on the type of subfloor is critical. The proper tools such as trowel type and its size are important for achieving the best economics and performance. After the adhesive is applied, it requires a proper opening time for the adhesive to develop its tackiness before the floor is put down. Any residuals of adhesive oozing up to the surface of the flooring need to be removed quickly before they set and adhere to the flooring surface. Furthermore, the adhesive cost can be quite expensive. The best advantage of the floating floor installation is that products can be directly installed on the existing floor materials without major prep work or removing the existing floor. This is a tremendous benefit for any subfloor for instance, having asbestos content, where any disruption of the subfloor structure can be extremely hazardous to the installer's health.

With all the reasons mentioned above, it should not be a surprise that the design of floating floors has recently become almost necessary as a surface covering. For instance, laminate flooring is used, wherein the laminate flooring typically is a rigid floor plank that can be joined together using a mechanical locking system, wherein one side of the floor plank has a tongue profile and the adjacent floor plank has a groove profile which permits the joining of the two through a mechanical locking system. While this mechanical laminate flooring system has gained great popularity in the United States, there are several problems with this type of flooring. First, the flooring can be extremely heavy since the core of the floor plank is typically made out of a wood-based material, such as a lignocellulosic-resin composite material, such as high density fiber board or particle board. Further, this fiber or particle board is typically not water resistant and also can be insufficiently resistant to even humidity changes. Thus, the laminate flooring can be limited where it is used since if the wood-based core became moist and swelled, this would damage the flooring and the laminate joined floor planks would actually separate.

While some attempts have been made to provide flooring surfaces made out of vinyl that simulate floor planks, these designs have not addressed all of the problems associated with previous flooring products, such as the location of adhesives, failure to use mechanical locking systems, design features that permit easy joining of flooring planks together, and the like. There has been some attempt to use PVC-type floor panels with a lockable tongue and groove connection as, for instance, described generally in U.S. Patent Application Publication No. 2008/0138560 and U.S. Pat. No. 4,426,820. In the floor panel set forth in U.S. Patent Application Publication No. 2008/0138560, only general designs are shown in the figures, and there is no clear teaching on precise tongue and groove profiles with regard to parameters, such as height, width, angles, and the like regarding the tongue profile and groove profile. However, the illustrated figures of tongue and groove locking designs set forth in the indicated publication are either based on cantilever hook or arrowhead designs. The designs of the indicated publication are believed to have disadvantages in installation or joint strength. In the indicated publication, FIG. 2*a* shows a tongue interlockable with a sloped land at the end of the bottom side of a groove, wherein the tongue can be provided with sufficient thickness to achieve a good joint strength, but it is believed that the locking design can require significant effort to force the opening of a relatively narrow mouth of a groove for the hook part of the tongue to go in. This process may require using a tapping block or other devices with a hammer, which adds complexity for the installer and also increases the risk of damaging the product. On the contrary, if the tongue is thin to permit flexing for ease of connection, this can result in weak joint strength. In the indicated publication, FIGS. 2*b*, 2*c* and 2*d* show no sloped, inclined land in the groove to restrict the tongue from sliding apart from the groove after engagement which can result in a very weak joint strength. The typical joint strength of this type of design is less than 5 pounds of force per linear inch (pli). FIG. 2*e* of the indicated publication is expected to have even more problems for similar reasons.

With respect to U.S. Pat. No. 4,426,820, the '820 patent exemplifies a plastic tongue and groove profile for flooring. The plastic flooring of the '820 patent is made from hard plastic and is not flexible. The flooring of the '820 patent has tongue and groove characteristics similar to many current commercial laminate flooring made from rigid, high-density fiberboard or medium-density fiberboard. In the designs of the '820 patent, many sharp edges in the tongue and groove profiles are used, and this can generate problems with fit during installation. Additionally, the overall strength of the tongue and groove profiles, when joined together (joint strength), will be lessened by high stress concentrations associated with the sharp edges. In addition, the groove lip top surface plan of the designs in the '820 patent are horizontal, which can make insertion of the tongue into the groove difficult, which can be an especially important problem when inserting short ends of a panel in the short ends of an already engaged adjoining panel. Also, the tongue and groove profiles of the '820 patent have a tongue tip cross-sectional area, which is relatively small and can be one-third the area of certain embodiments of the present invention. This is further explained in the details of the present invention. Also, the groove deck cross-sectional area in the groove profile of the '820 patent is disproportionate compared to the tongue tip cross-sectional area, which engages this groove deck area. This can be especially important when dealing with thinner product applications, such as residential luxury vinyl tiles, wherein the tongue tip will not provide enough integrity to facilitate installation if the groove deck cross-sectional area is disproportionate to the tongue tip cross-sectional area. As shown in the present invention, a balanced or proportionate tongue tip cross-sectional area to groove deck cross-sectional area will permit overloading of groove voids during insertion, and the tongue and groove will flex to accommodate one another and produce a firm product fit. This firm fit assures stability through the duration of the installation and for the life of the installed product. A disproportionate groove deck area at the tongue tip area will not permit overloading of the void. In addition, in various profiles of the present invention, the tongue profile and/or groove profile can have slants in various edges as opposed to straight horizontal edges, which permits easier insertion of the tongue into the groove and also permits alternative ways to install the product (meaning, that the groove can be inserted into the tongue, angle insertion of one profile into another is possible, as well as lateral (no angle) insertion). Thus, with the present invention, significant improvements over the various tongue and groove profiles of the '820 patent are achieved, as well as permitting a tongue and groove design that will provide sufficient joint strength and operability in a luxury vinyl tile-type product, as well as other resilient floor products.

Furthermore, as described in the present application, not just any tongue design or groove design can be used with vinyl-type flooring to achieve acceptable connecting properties, such as pull strength or joint strength. The inventors of the present application have discovered that particular tongue and groove profiles are necessary in order to achieve acceptable pull strengths and other suitable properties which will work with respect to resilient-type flooring, such as vinyl flooring, such as LVT flooring. The problems encountered and the solutions achieved by the present invention simply were not described, predicted, or appreciated previously. The present invention overcomes these problems and provides a surface covering product that is easy to install, requires no adhesive on the bottom surface of the surface covering or sub-floor, is water resistant, achieves acceptable pull strengths or joint strengths, and/or other connecting properties, and permits a floating floor that is relatively lightweight compared to laminate flooring and provides a walking surface that is more realistic to solid wood flooring, even from the standpoint of acoustic sounds.

SUMMARY

A feature of the present invention is to provide surface coverings, such as floor coverings, that are relatively lightweight, water resistant, or both.

A further feature of the present invention is to provide surface coverings, such as floor coverings, that can be mechanically joined and yet are relatively thin in thickness.

An additional feature of the present invention is to provide surface coverings, such as floor coverings, that can be mechanically joined and yet are relatively resilient, light, and easy to install, and achieve acceptable pull strengths when connected and/or other connecting properties.

Another feature of the present invention is to be able to assemble a surface covering with resilient plank constructions having mechanically interlockable tongue and groove edge profiles on opposite sides of the planks.

An additional feature of the present invention is to be able to assemble a surface covering with resilient rectangular shaped planks with tongue and groove edge connections made with elongated tongue lengths to ease installation, application of tongue and groove profiles to head-seam joints, enhancement of flexure, enhancement of joint strength, enhancement of strength-to-plank thickness, or any combinations of these features.

Another feature of the present invention is to be able to assemble a surface covering with resilient planks with tongue and groove connections as a floating floor.

Another feature of the present invention is a floor that can be re-positioned, removed, or replaced without major efforts or destruction of the installed floor.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a surface covering plank comprising a resilient composite sheet having four sides, an upper surface, a lower surface, and an overall thickness, and the composite sheet comprising at least one base layer, wherein the at least one base layer comprising at least one polymeric material and at least one filler, and opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank. The surface covering plank has one or more of the following features (a)-(d):

(a) the first tongue has a first tongue length (TL) measured between the first side of the composite sheet and a distal end of the first tongue. The ratio of the first tongue length to the composite sheet overall thickness (CSt) is at least about 1.5;

(b) the composite sheet has a first pair of opposing sides comprising the first and second sides that are shorter than a second pair of opposing sides extending between the first pair of sides. The second pair of sides comprise a third side and a fourth side, wherein the first groove on the second side is defined between a first flange extending along a first edge of the composite sheet and protruding from the second side of the composite sheet and a second flange extending along an opposite second edge of the composite sheet and protruding from the second side of the composite sheet. The second flange comprises an interference that projects in a direction toward a horizontal plane of the upper surface of the composite sheet and includes an inclined inner surface defining part of the first groove, wherein the first groove is defined between the first and second flanges and opens toward the horizontal plane of the upper surface of the composite sheet. A locking angle defined between the inclined inner surface of the interference of the second flange and a horizontal plane parallel to the lower surface of the composite sheet is from about 55° to about 65°. The plank has a flexural force at 0.3" (pli), as determined according to Modified ASTM D790, of 1±0.35;

(c) the first groove on the second side is defined between a first flange extending along a first edge of the composite sheet and protruding from the second side of the composite sheet and a second flange extending along an opposite second edge of the composite sheet and protruding from the second side of the composite sheet. The first groove includes a groove bottom portion and a minimum groove thickness (Tg) is defined between the groove bottom portion and a horizontal plane of the lower surface of the composite sheet. The second flange comprises an interference that has a height (H) that projects in a direction toward a horizontal plane of the upper surface of the composite sheet, and the first tongue comprises a member having a minimum thickness (Tt) extending from the first side, and a distal end of the tongue includes a downward extending projection comprising a tongue underside and the downward extending projection has a projection height (H') from the member, wherein Tg and Tt are within ±24% of each other, H and H' are within ±7% of each other, and wherein a tongue tip thickness (Tt') is defined as a shortest vertical distance between the horizontal plane of the upper surface of the composite sheet and the tongue underside, wherein Tg/Tt' is from about 0.32 to about 0.82;

(d) the first tongue and the first groove are interlockingly engageable with a corresponding groove or tongue on an adjacent floor plank to have a first pull strength (pli)-to-overall thickness (mm) ratio of at least about 2.

The present invention further relates to a surface covering comprising a plurality of individual surface or flooring planks or tiles joined together, such as in the form of a floating floor.

The present invention also relates to methods of making and installing the surface coverings of the present invention.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF DRAWINGS

FIG. 1 is a perspective top view of a plank according to various embodiments of the present invention, wherein edge profiles on the plank are not shown in this view to simplify the illustration for the discussion of other features that are shown therein.

FIGS. 24 and 26 relate to planks with different thicknesses.

FIGS. 34 and 36 relate to planks with different thicknesses.

FIG. 62 is a perspective view of a test layout for application of a rolling load to a grouted LVT plank designed according to various options of the present invention.

DETAILED DESCRIPTION

Figure 1:
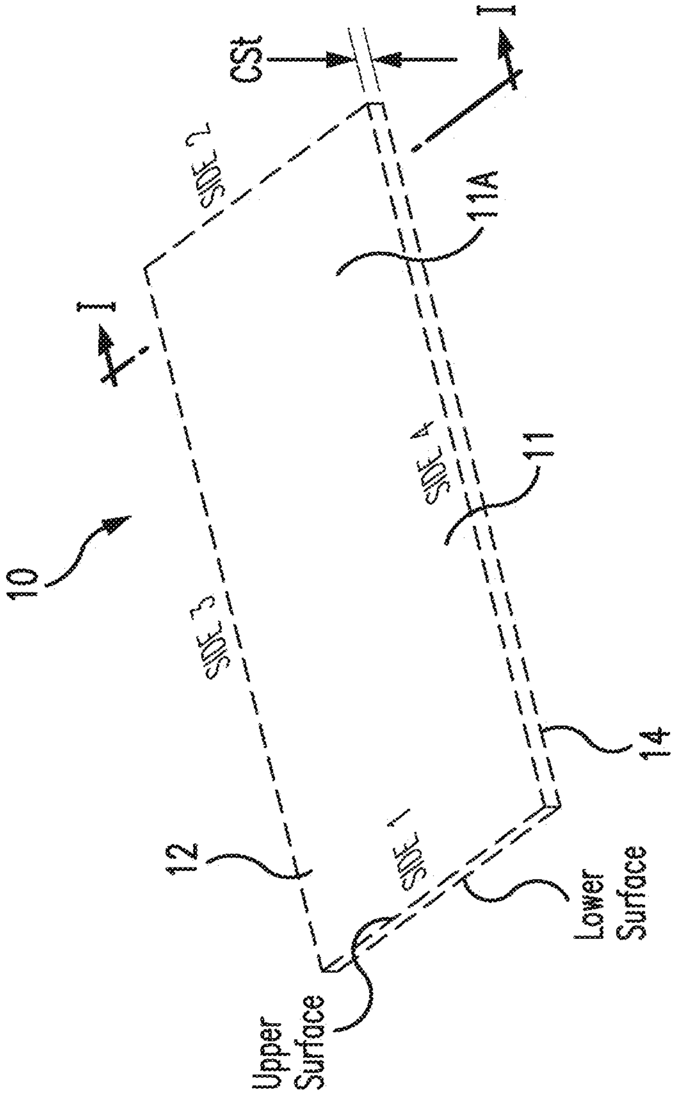
FIGS. 1-62 are various schematic drawings depicting the surface coverings of the present invention or plank portions thereof from various views. The drawings are not necessarily to scale. The drawings represent various design features of the surface coverings of the present invention. Similar referencing identifiers in different figures can refer to similar features unless indicated otherwise.

The present invention relates to surface coverings, such as floor coverings, constructed of resilient planks or tiles that can be assembled together by integral mechanical connections. Planks alone are often referenced herein for sake of simplifying the discussion. The planks can have any dimensions and can be a square or rectangular or other shapes. Wherever "planks" of the present invention are referenced herein, the description thereof can be understood to apply equally to "tiles" unless indicated otherwise. The present planks comprise a unique combination of resilient core construction and mechanically interlocking tongue and groove edge profiles. With the present planks, a surface covering can be assembled with resilient rectangular shaped planks with tongue and groove edge connections made with elongated tongue lengths relative to plank thickness to ease installation. A longer tongue tip can provide an improved guide for inserting the tongue to the groove. The present planks also have tongue and groove profiles useful for making head-seam joints (that is, shorter side joints) between planks. The joint profiles of the present planks, which can permit a very low angle of insertion, combined with the flexible nature of the resilient base, permit the practical application of this connection to the head seams, i.e., connections made at shorter sides of rectangular shaped planks. The edge profiles also can be used on the side seams of the planks, i.e., at longer sides of the planks. The present planks also can provide enhanced flexure, which can assist installation at head seams, side seams, or both. Further, the present planks can provide enhanced joint strength, enhancement of strength-to-plank thickness, or combinations of these strength features, between resilient planks. A significant correlation to joint pull strength, for example, has been determined to be associated with providing tongue and groove edge designs in the present planks which have a minimum groove thickness and a minimum tongue tip thickness (total, including any top layer portion) that are within ±24% of each other. The present resilient plank constructions can provide pull strength-to-thickness (pounds force per linear inch (pli)/mm) ratios of at least twice those determined for a prior tongue-and-groove plank design having a particle board core and top layer (print layer and overlay (wear layer)). The inclusion of one or more of these plank features is effective to prevent one connected plank from inadvertently disengaging from the adjacent plank under normal use conditions or moving out of place vertically to the surface plane of the flooring or other surface covering comprised of an assembly of the planks with interlocked tongue and groove edges.

The present plank or tile incorporates the edge profile designs in edges of a resilient composite sheet structure. The composite sheet can be comprised, for example, of one or more base layers comprising a homogenous blend of polymer material and filler in resilient sheet form. The polymer can be, for example, a thermoplastic polymer, a thermoset polymer, or blends of polymers. The filler can be, for example, a particulate material, which is dispersible in the polymeric material. The filler can be, for example, an inorganic filler, an organic filler, or any combinations of fillers. The polymeric material can form, for example, a continuous phase into which the filler is dispersed as a discrete phase. In another example, the composite sheet can comprise a laminate structure of diverse material layers including one or more base layers (e.g., two or three or more base layers that can be the same or different with respect to composition and/or physical properties) comprising a homogenous blend of polymer material and filler. The composite sheet structure of the plank can comprise, for example, a luxury vinyl tile (LVT) material, a vinyl composition tile (VCT) material, or a rubber material. Other resilient polymer-containing composite sheet materials can be used. The LVT material can further include a top layer, which can include at least a printed design and wear layer(s), arranged on top of the base layer or layers. The VCT material can optionally have inlaid surface chips, but typically no wear layer or printed design is overlying the VCT material. The printed design can be present as a separate design layer, can be part of a wear layer or other layer, or can be printed on a layer, such as a base layer or other layer. The VCT material, LVT material, or rubber material can further include a carpet surface layer to provide a carpet tile or plank. When a carpet surface layer is present, a design layer or surface or a printed design or print layer or print surface, or a wear layer can be omitted. The carpet layer can be located on a base layer(s) with or without other layers as mentioned herein.

The present planks and carpet tiles can be installed, for example, in a modular manner with mechanical interlocking of the profiled side edges, without need of separate adhesive to retain the positions of the planks or tiles on a surface to be covered. The locking joint provided in the profiled edges of the present planks and tiles can be very effective when applied to flexible and semi-flexible products, such as the LVT material, VCT material, or rubber material alone or in combination with other surface materials such as carpeting components.

For purposes herein, a luxury vinyl tile (LVT) refers to a resilient tile floor covering comprised of polymeric material and a minor amount (<50 wt %) of inorganic filler (based on the total wt % of the LVT). The LVT material can meet the requirements of ASTM F 1700, Class III (Printed Film Vinyl Tile). The LVT material can have a print design or film applied over a base layer(s) or other intermediate layers with a clear (e.g., vinyl) wear layer(s) on top of the print film. The base layer(s) of LVT can be comprised of polymeric material (or "binder"), fillers, and pigments compounded with suitable lubricants and processing aids. In LVT, the polymeric material can be present in an amount of at least 34 wt % polymeric material (or "binder") comprising, for example, one or more thermoplastic polymers, such as polymers of vinyl chloride, copolymers of vinyl chloride, or both, and other modifying resins, and can include plasticizers. Further, the polymers and copolymers of vinyl chloride can comprise at least 60 wt % of the polymer material, and copolymers of vinyl chloride can comprise at least 85 wt % vinyl chloride. In various options, the LVT material can be configured to be non-grouted or grouted. The LVT material optionally can include a groove for receiving grout at the upper surface above where the profiled edges are mated. The grout can be polymeric (e.g., thermoplastic, silicone, acrylic), cement, cement-like, mortar, mortar-like, or other materials that can be used to fill in a void or grout line.

For purposes herein, a vinyl composition tile (VCT) material refers to a resilient tile floor covering material comprised of polymeric binder material and inorganic filler in a predominant amount (≥50 wt %) based on the total weight of the VCT. The VCT material can be comprised of polymeric material (or "binder"), fillers, and pigments. The polymeric material can be one or more thermoplastic polymers, such as polymers of vinyl chloride, copolymers of vinyl chloride, or both, compounded with suitable plasticizers and stabilizers. The VCT material can meet requirements of ASTM F 1066. As indicated, the vinyl composition tile material can optionally have an inlaid construction at its upper surface, which does not change the overall thickness of the sheet product. The inlaid process can use, for example, solid colored vinyl chips that are laid on top of a VCT carrier sheet and then bonded together with heat and pressure, such as in conventional manner used for inlaid process. In various options, the VCT material can be configured to be non-grouted or grouted. The VCT material optionally can include a groove for receiving grout at the upper surface above where the profiled edges are mated.

In various options, one or more, or all, of the base layers of the plank or tile of the present invention can include one or more rubber or elastomer materials and at least one filler material. The rubber or elastomer can be present in the same amounts as those given for the thermoplastic polymer material, such as PVC, described herein. The rubber or elastomer can be the primary component (by weight) in one or more, or all, base layers. As an option, the rubber or elastomer can be a substitute for the thermoplastic or PVC ingredient that can be used in the base layer(s). The rubber or elastomer component can be considered a polymer for purposes of the present invention. Rubber-based base layer(s) of the present planks or tiles can be comprised of rubber (elastomer), fillers, and optionally pigment. The rubber can be, for example, a vulcanizable rubber, a reaction system elastomer, a thermoplastic elastomer, or other elastomers. Some filler, such as carbon black or others, also may function like a pigment to impart color to the base layer(s). The amount of filler in the rubber-based base layer(s) is not categorically limited, and can range, for example, from about 0.1 wt % to about 99 wt %, or from about 1 wt % to about 90 wt %, or from about 5 wt % to about 80 wt %, or from about 10 wt % to about 75 wt %, or from about 20 wt % to about 50 wt %, or other amounts, based on the total weight of the rubber-based layer(s).

The carpet tiles can be a laminate structure, for example, which combines a carpet layer as a surface layer and a substrate comprised of the VCT, LVT, or rubber materials, or similar materials, to which the carpeting is attached (where the attaching can be permanent or removeably attached to the substrate of the plank). The carpet tiles can include a carpet layer which can be any backed or non-backed carpet material, including conventional carpeting, which can be attached (e.g., adhesively, mechanically, and so forth) to a major surface of the substrate. In some examples, the carpet tile can have a substrate formed of one or more of the base layers of VCT, LVT, or rubber material(s) to which is adhesively bonded or thermally bonded (e.g., heated press laminated) a carpet layer (e.g., a cut pile, a loop pile, a cut and loop, a (print) tufted, and so forth). In the carpet tiles, a locking tongue and groove joint, for example, can be profiled into a flexible or semi-flexible base product (possibly with substantial recycle content), such as the indicated LVT material, VCT material, or rubber material. In view of the mechanical interlockable tongue and groove system provided at the profiled edges of the composite structure, the carpet tile does not need to be adhered to a floor which it covers to keep the tile(s) in place. The carpet tile can be a floating floor. This can provide modular carpet tile flooring which, for example, which is strongly connecting and can be easily installed, replaced/repaired, and uninstalled, while eliminating the need to use costly adhesives (e.g., some pressure sensitive adhesives) or difficult to remove adhesives.

The present invention particularly relates to surface coverings, such as floor coverings, having an interlocking design on at least two sides of planks or tiles used in the assembly of the surface covering. The interlocking design permits the connecting of individual pieces of the planks or tiles together in length and width directions to form a surface covering, such as a monolithic surface covering, without the need for any installation adhesive underneath to hold the product together and, further, preferably requires minimum preparation work for the sub-floor or sub-surface. The interlocking system used in the present invention generally involves a mechanical lock system to provide a durable locking and holding of the floor surface. The mechanical locking system can be visible with respect to a tongue (projections), also known as the "giving part," and a "receiving part," which is also known as a groove (recess). The tongues and grooves can be located parallel to each other on both pairs of sides or edges of the surface covering to achieve near-perfect or perfect alignment. The tongues and grooves of the mechanical lock can have any geometrical design or shape that includes one or more of the indicated features (a)-(d) and/or includes one or more other characteristics mentioned herein. The tongue extends outward from the edge or side of the plank or tile to have an appropriate width and length. The tongues and grooves can have dimensions indicated herein for providing enhanced pull strength when interfitted. The grooves of the mechanical lock system can be a complementary cut-out to the tongue portion. As an option, the size of the grooves can be slightly larger than the grooves to allow an easier interlocking of the tongues into the grooves. The edge of the cut-out or groove is lined up, preferably, precisely to the opposite edge or side having a groove as shown in the Figures. The thickness of the receiving part or grooves can be identical (or nearly identical) to the tongue thickness, so that once they are connected together, there is no ledge or ridge formed. As stated, the tongue and groove interlocking design with one or more of conditions (a)-(d) and/or one or more other characteristics mentioned herein, of the present invention permits easy installation. To connect the planks together, a motion, similar to putting a puzzle together, can be used. One plank can be connected to the other from end-to-end and then to another plank side-to-side, or vice versa, to cover the entire surface of the room.

The surface covering of the present invention can be any surface covering, such as a floor covering, wall covering, ceiling, and the like. The surface covering can be used essentially in any room in a house or work environment, including the kitchen, bathroom, living room, dining room, recreation room, garage, and outside living spaces, such as a porch, deck, and the like. The surface coverings of the present invention can be used in an inside or outside environment, especially since the surface coverings of the present invention are water resistant and do not swell when wet. In fact, the thickness swell of the surface coverings of the present invention is negligent (e.g., zero or zero to less than 0.01 mm or 0.0001 mm to less than 0.001 mm) when tested at LF 3.2 of NALFA LF 01-2003.

For purposes of the discussion below, a preferred embodiment, floor planks or floor tiles are described. However, it is realized that this description equally applies to surface coverings in general. Furthermore, while the term "floor plank" is used, it is to be understood that floor plank includes any geometrical design, especially designs having four sides, and the four sides can be rectangular, including squares, and can be any length or width such that the floor plank can serve as an elongated, rectangular floor plank or can be floor tile, which can be square or a rectangular shape of modular tile format. The present invention is not limited by any length or width, nor any geometrical design. Nonetheless, as indicated, a particular advantage of the present plank designs is the enhanced ability to manually interlock head seams (shorts) on rectangular shaped planks.

Figure 2:
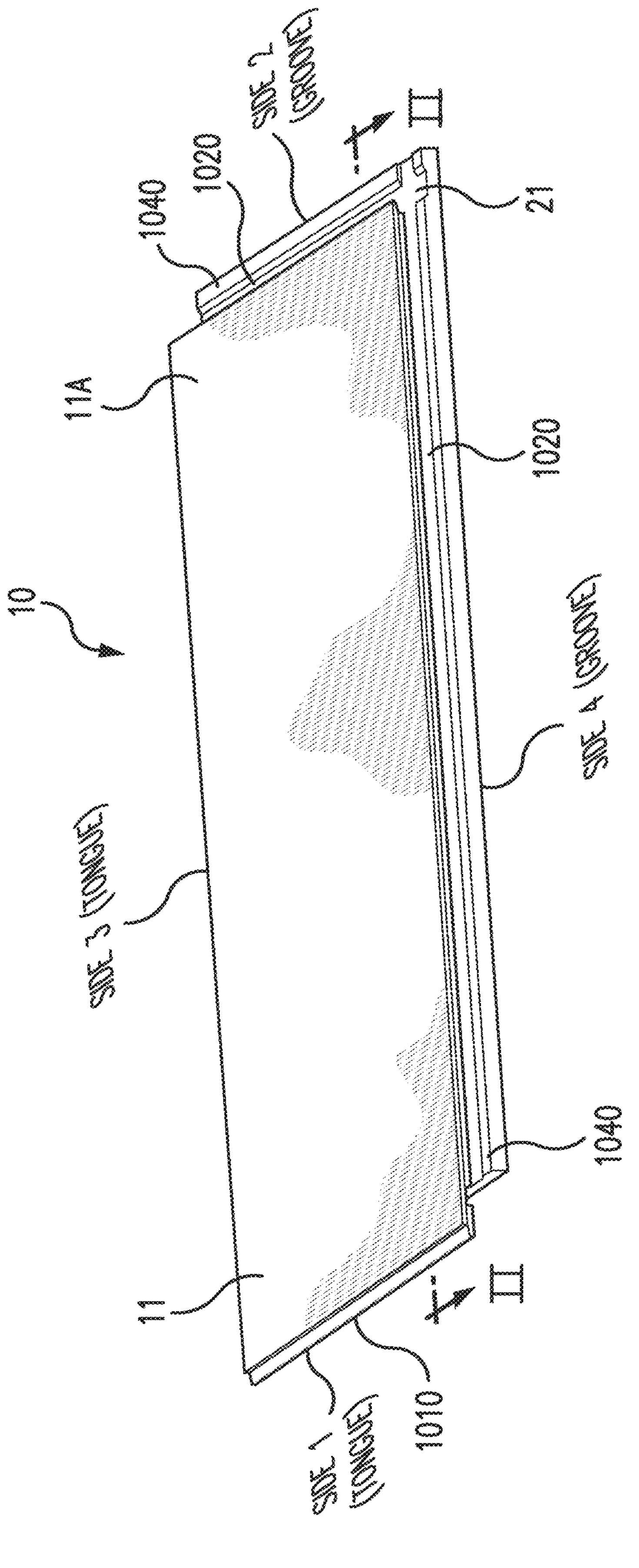
FIG. 2 is an enlarged perspective top view of a plank according to various embodiments of the present invention, wherein edge profiles on the plank are shown in this view.

In more detail, the floor plank 10 can have a generally rectangular shape, for instance, as shown in FIG. 1, which omits the tongue and groove profiles that extend along sides 1-4 (shown by hatched lines) to simplify this illustration. The tongue and groove profiles are illustrated in other figures herein. The floor plank has an overall thickness (CSt). It is noted, for instance, referring to FIG. 2, that technically with the presence of tongues 1010 and grooves 1020, the overall floor plank is not precisely rectangular due to these additional profiled edge surfaces that extend from sides of the plank body 11A. Other than the tongue and groove edge profile portions, the remaining plank body 11A can be precisely rectangular. In FIGS. 1 and 2, side 1 and side 2 would be the opposing short sides, and side 3 and side 4 would be the opposing long sides, and when compared to each other. (It is to be appreciated that the plank can be a square (not shown) with two sides having a groove profile and two sides having a tongue profile of the present invention.) The plank 10 is a composite sheet 11 that has a top surface 12 and a bottom surface 14. The top surface 12 is the surface of the plank that is seen when the plank is installed as a surface covering, and the bottom surface 14 can directly rest on a surface to be covered by the plank or on a subflooring that directly rests on such a surface. As also shown in FIG. 2, grooved sides 2 and 4 of the plank 10 can include a two-way cut-out portion 21 in the flange or interference 1040 that extends along each of sides 2 and 4 at a corner of the plank where these grooved sides intersect. The two-way cut-out portion 21 permits a tongue 1010 of another similar plank to be inserted in an unobstructed manner into a groove 1020 at either of sides 2 or 4, while a significant length of a flange or interference 1040 remains at the grooved sides for interlocking with the tongue 1010 when inserted in the groove 1020.

The plank or tile can be formed with two pairs of opposing sides (e.g., 1-2 and 3-4) wherein the pairs of sides can be the same or different in length relative to each other. In one example, the plank is rectangular. The width or shorter sides of the rectangular plank can be, for example, at least about 10%, or at least about 20%, or at least about 33%, or at least about 50%, or at least about 75%, or at least about 100% smaller, or at least about 200% smaller, or at least about 500% smaller in dimension than the length dimension of the plank. The rectangular plank can have opposite shorter sides having a width, for example, of from about 2 cm to about 60 cm, or from about 5 cm to about 30 cm, or from about 10 cm to about 25 cm, or other widths, and opposite longer sides having a length, for example, of from about 5 cm to about 300 cm, or from about 25 cm to about 225, or from about 35 cm to about 150 cm, or from about 50 cm to about 100 cm, or from about 60 cm to about 80 cm, or other lengths. As indicated, the plank also may be square shaped, and have four sides of equal length. In some examples, surface coverings of the present invention can be, for example, square shaped tiles, such as carpet tiles. The sizes of the present carpet tiles are not necessarily limited with respect to larger sizes other than possibly by practical considerations such as respect to handling, etc. The smaller sizes of the tiles should adequately allow for the formation and use of the profiled edges on the tile. In some examples, for any plank or tile of the present invention, the tiles have square shapes with a side length of from about 2 cm to about 300 cm, or from about 15 cm to about 200 cm, or from about 20 cm to about 125 cm, or from about 25 cm to about 100 cm, or from about 25 cm to about 80 cm, or from about 30 cm to about 65 cm, or from about 35 cm to about 50 cm, or other side lengths.

Figure 3:
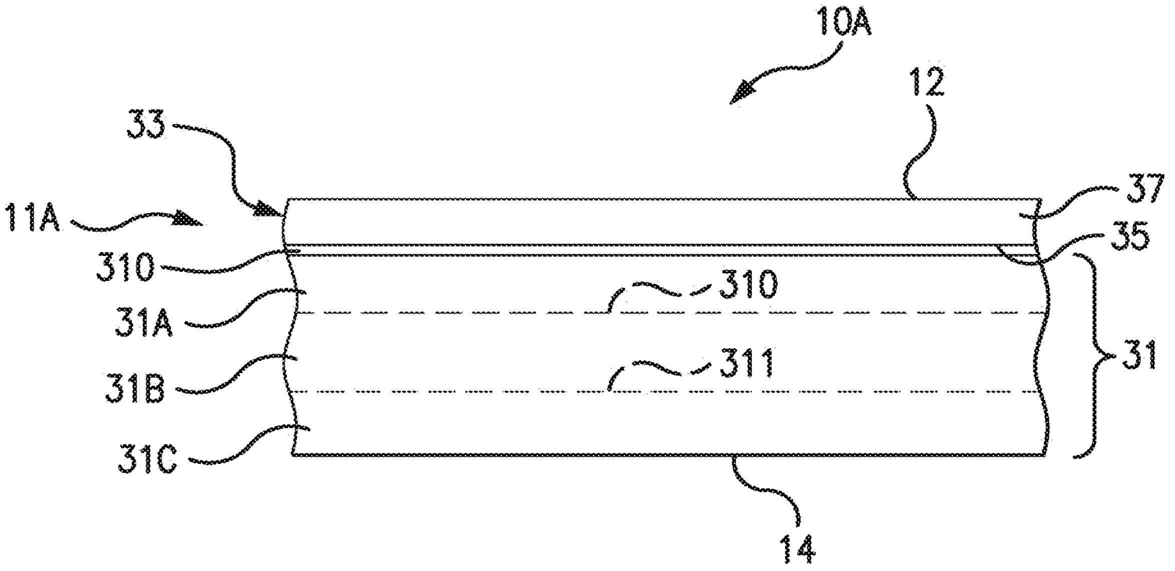
FIG. 3 is an enlarged partial cross-sectional view according to line I-I in FIG. 1 at a section medial to sides 3 and 4, wherein the plank is constructed of an LVT material.
Figure 4:
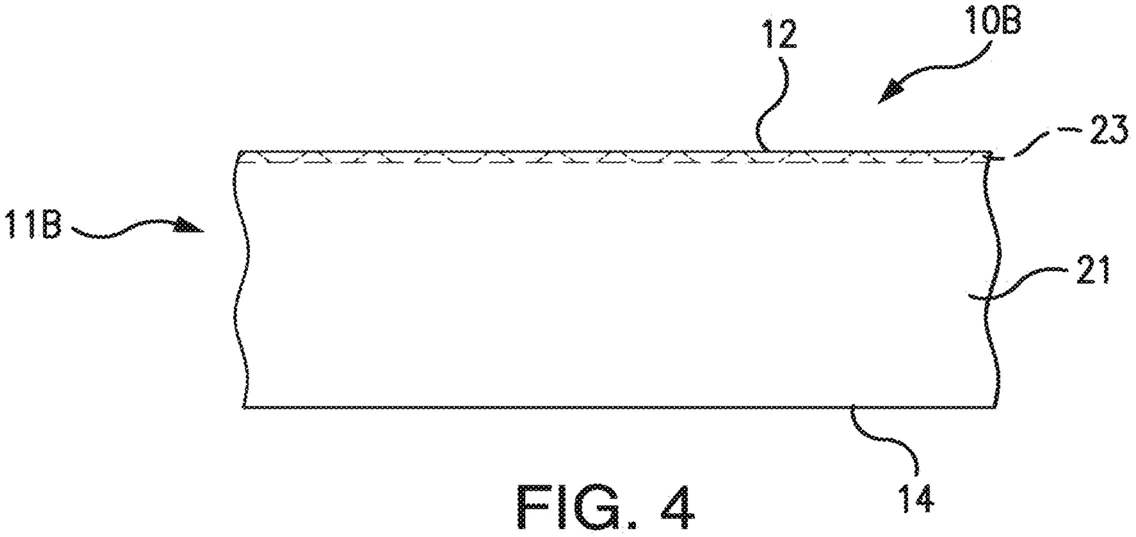
FIG. 4 is an enlarged partial cross-sectional view according to line I-I in FIG. 1 at a section medial to sides 3 and 4, wherein the plank is constructed of a VCT material.

As illustrated in FIGS. 3 and 4, the composite sheet (11A, 11B) has significant portions of the top and bottom surfaces 12 and 14 that are generally horizontally planar and extend parallel to each other. In one example, at least about 50%, or at least about 60%, or at least about 80%, or at least about 90%, or at least about 95%, of the top and bottom surfaces are flat or relatively flat surfaces. It is to be understood that a relatively flat surface can include a textural or embossed surface, where the embossed surface can be in registered with the print design, and can be achieved mechanically and/or chemically. The plank comprises a resilient composite sheet having at least one base layer (31A-C or 21) that comprises at least one polymeric material and at least one filler (e.g., inorganic filler). FIG. 3 illustrates a section of a present plank where composite sheet 11A comprises a laminate construction including base layer portion 31. Base layer 31 comprises at least one base layer, such as three base layers 31A-31C, and a top layer 33. The hatched lines 310 and 311 indicate original interfaces of the stacked sublayers, which may or may not be visible in the finished laminate, depending in part on the coloring or hues of the various sublayers. Top layer 33 comprises a print design 35 and a wear layer or overlay 37. The top layer 33 is integrally attached to an upper surface 310 of the base layer 31. The top layer also optionally can have an underlay (not shown) below the print design and a protective layer (not shown) on the wear layer. The top layer(s) can be, for example, PVC, olefins, urethane, ionomer, acrylic, polyester, thermoplastic polyolefin (TPO), thermoset polyurethane (TPU), or other materials conventionally used for this type of layer(s) or materials such as illustrated herein. The protective layer can be, for example, a thermally cured system such as water based polyurethane dispersion system, water based acrylic, or vinyl emulsion coating, or a radiation cured coating system such as urethane epoxy or polyester acrylates, or other materials conventionally used for this type of layer or materials such as illustrated herein. One or more of the base layers 31A-C can be formed, for example, of LVT-based material, VCT-based material, rubber-based material, or other polymeric materials in combination with filler. In another option, layer 37 can be replaced by a carpet layer and layer 35 can be replaced by an adhesive layer which bonds the carpet to the base layer 31. FIG. 4 illustrates a section of a present plank comprising composite sheet 11B including VCT material layer 21 and an optional inlaid chip surface region 23.

Figure 5:
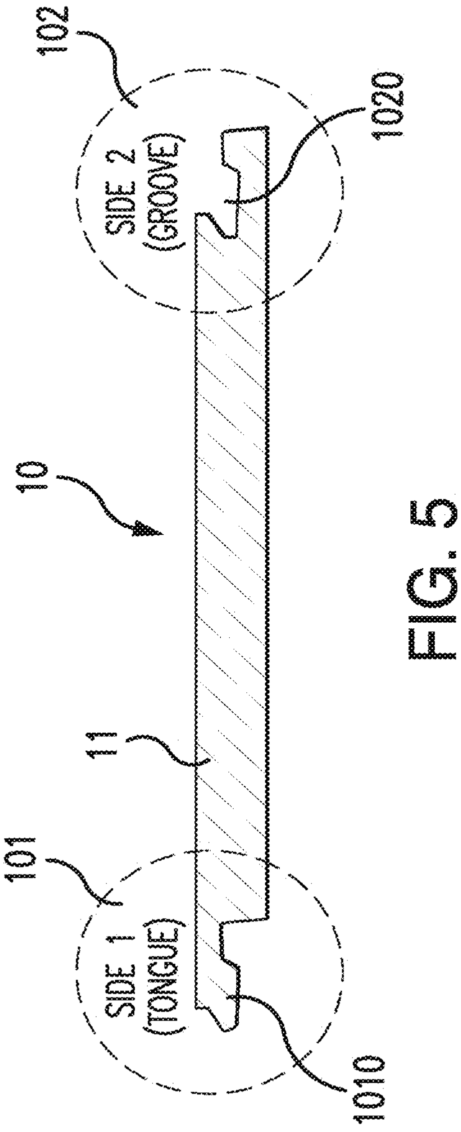
FIG. 5 is a cross-sectional view according to line II-II in FIG. 2.

FIG. 5 shows further details of the tongue profile portion 101 and groove profile portion 102 of the plank 10 shown in FIG. 4 from a cross-sectional perspective. The tongue 1010 and groove 1020 are located on opposite sides 1 and 2 of the plank 10. The plank 10 is constructed of a composite sheet 11, which can have a structure such as the indicated LVT composite sheet 11A of FIG. 3 or a VCT composite sheet 11B of FIG. 4, or other composite sheet structures.

Figure 6:
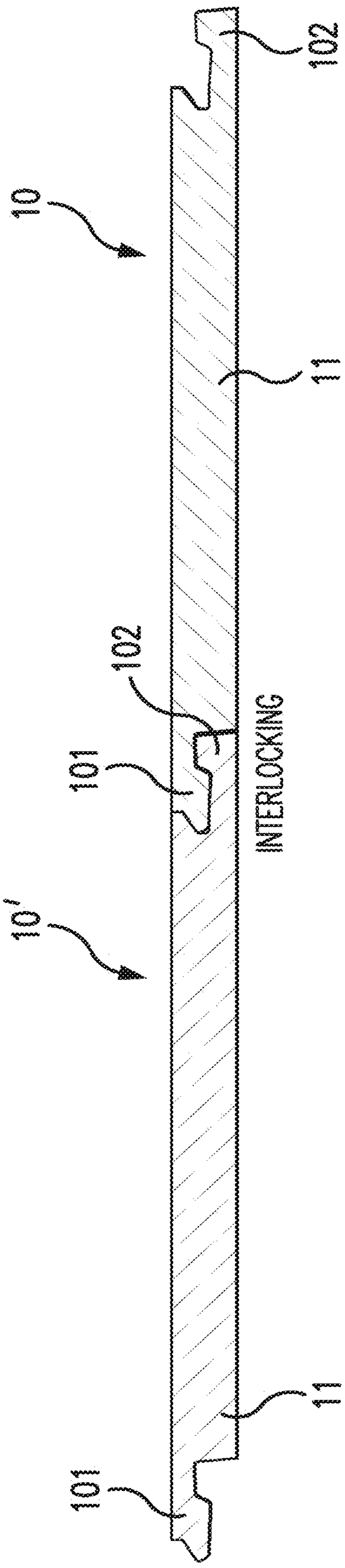
FIG. 6 is a cross-sectional side view through a plurality of connected planks of FIG. 5 according to various embodiments of the present invention.

FIG. 6 shows the plank 10 in a mechanically interlocked arrangement with an identical plank design, plank 10', at adjacent tongue and groove edges. The surface covering planks 10 and 10' used in this surface covering have one or more of the indicated features (a)-(d) and one or more of other characteristics mentioned herein.

Figure 7:
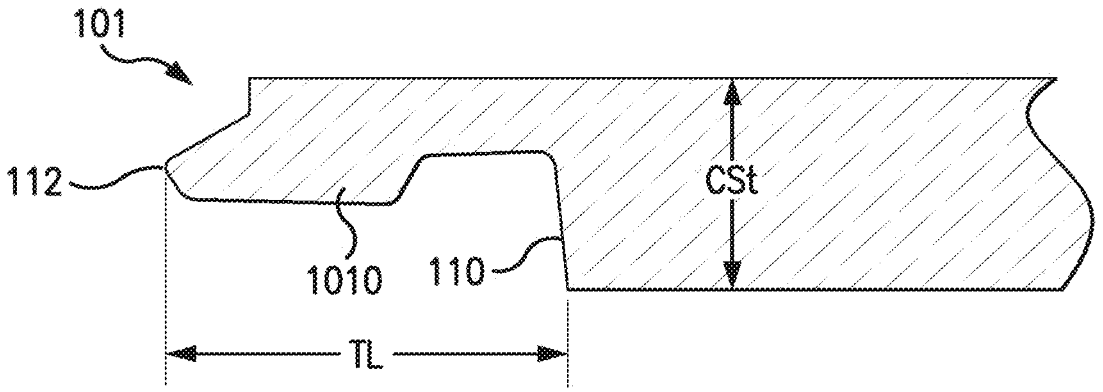
FIG. 7 is an enlarged cross-sectional view of a tongued edge shown with hatched encircling lines in FIG. 5.

FIG. 7 shows the tongue 1010 has a tongue length TL, as measured between the tongue channel wall 110 and a distal tip 112 of the tongue 1010 of the composite sheet forming the plank 10. The ratio of the tongue length TL to the composite sheet overall thickness (CSt) can be, for example, at least about 1.5, or from about 1.5 to about 2.0, or from about 1.7 to about 1.9. As indicated, planks made with elongated tongue lengths relative to plank thickness can ease installation and a longer tongue tip can provide an improved guide for inserting the tongue to the groove. The tongue can have any length (TL), such as, for example, from about 1.5 mm to about 50 mm or more, for instance, from about 3 mm to about 20 mm, or from about 5 mm to about 15 mm, or from about 8 mm to about 13 mm, or from about 9 mm to about 12 mm. As indicated, FIG. 7 illustrates how the length TL of the tongue is measured.

The plank can have a thickness (CSt), for example, of from about 2 mm to about 40 mm, or from about 2.5 mm to about 20 mm, or from about 3 mm to about 10 mm, or from about 3.5 mm to about 8 mm, or from about 3.9 mm to about 6 mm, or from about 4.0 mm to about 5 mm, or from about 4.2 to about 4.6 mm, or other thicknesses. The fabrication of tooling suitable to profile edges of the plank according to the present plank designs may encounter practical considerations where the plank thickness becomes very small or very large.

Figure 8:
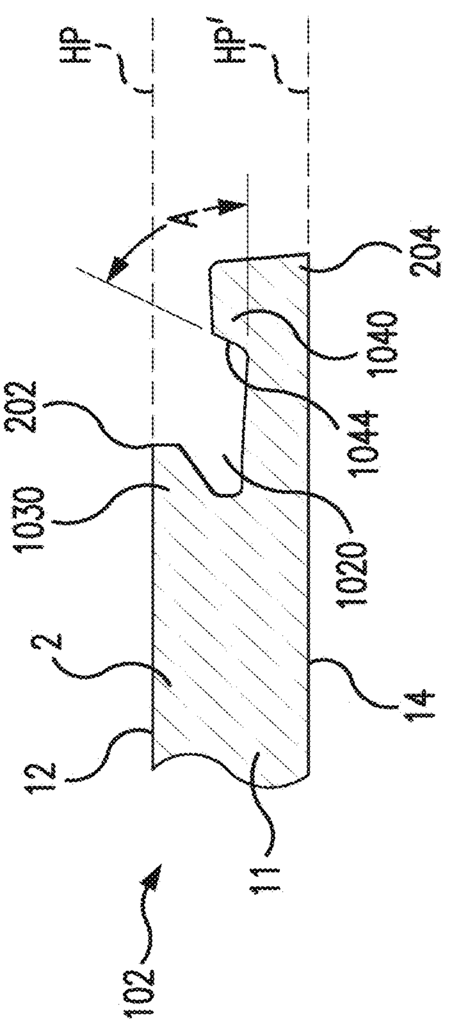
FIG. 8 is an enlarged cross-sectional view of a grooved edge shown with hatched encircling lines in FIG. 5.

FIG. 8 shows the groove 1020 defined between a first flange 1030 and a second flange 1040 extending along opposite edges 202 and 204 of side 2 of surfaces 12 and 14 of the composite sheet 11 and protruding horizontally from side 2 of the composite sheet 11 forming the plank. The second flange 1040 comprises an interference of height H that projects in a vertical direction toward a horizontal plane HP of the upper surface 12 of the composite sheet 11. The second flange 1040 includes an inclined inner surface 1044 defining part of the groove 1020. The groove 1020 opens toward the horizontal plane HP of the upper surface 12 of the composite sheet 11. A locking angle “A” is defined between inclined inner surface 1044 of the second flange 1040 and a horizontal plane HP' that extends parallel to the lower surface 14 of the composite sheet 11. Angle A can be, for example, from about 55° to about 65°, or from about 57.5° to about 62.5°, or from about 59° to about 61°, or other angles.

The plank 10 also has flexure property that can ease interlocking of adjacent planks. The plank can have a flexural force, for example, at 0.3" (pli), as determined according to Modified ASTM D790, of at least 0.5, at least 0.75, at least 1, at least 1.25, at least 1.5, at least 1.75, at least 2, at least 2.25, at least 2.5, at least 2.75, at least 3, at least 3.25, at least 3.5, at least 3.75, for example, 3±0.75, or 2±0.50, or 1.5±0.45, or 1±0.35. As indicated, the present planks have enhanced flexure, which can assist installation at head seams, side seams, or both. For example, the plank has a composite sheet structure which can bow or flex sufficient to facilitate making an engagement of a tongued edge of one plank with a grooved edge of another plank.

Figure 9:
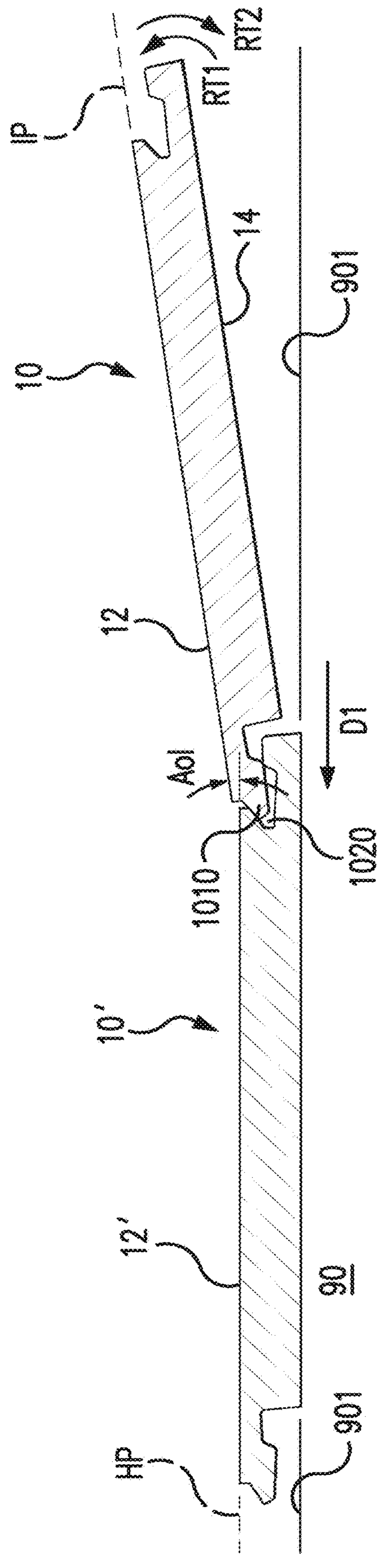
FIG. 9 is an enlarged cross-sectional view of adjacent edges of planks during insertion of a tongued edge of one plank into a grooved edge of an adjacent plank for interlocking as shown in FIG. 6.

FIG. 9 shows a method of interfitting adjacent tongue and groove edges of planks 10 and 10' shown in FIG. 6 for interlocking them. The planks 10 and 10' arranged on a surface body 90, such as a floor, to be covered with planks. The surface body 90 has an upper surface 901 upon which the planks will rest in an interfitted manner. Surface 901 can be generally flat. The tongue 1010 of plank 10 is introduced into groove 1020 of plank 10' at an insertion angle “AoI”.

The insertion angle AoI is the angle of tilt that can be applied to plank 10 by rotating the plank surfaces 12 and 14 counterclockwise RT1 sufficient to allow insertion, such as manual insertion, of tongue 1010 into groove 1020 of plank 10' with translation of the plank 10 in a direction D1. The amount of tilt imparted to plank 10 is also indicated by the upward deflection of the upper surface 12 of plank 10 away from its original horizontal plane HP, such as shown by its deflected plane IP. The AoI can be, for example, from about 2.5° to about 90°, or from about 3° to about 45°, or from about 3° to about 25°, or from about 5° to about 25°, or from about 7.5° to about 15°. After tongue 1010 is inserted into groove 1020 of plank 10', then the upper and lower surfaces 12 and 14 of plank are rotated downward in a clockwise direction RT2 downward until the lower surface 14 comes to rest on surface 901. At that point, the planks 10 and 10' have mechanically interlocked tongue and groove portions 101 and 102, such as shown in FIG. 6. The joint profiles of the present planks, which can permit a very low angle of insertion, combined with the flexible nature of the resilient base, permit the practical application of this connection to the head seams, i.e., connections made at shorter sides of rectangular shaped planks. The edge profiles also can be used on the side seams of the planks, i.e., at longer sides of the planks.

Figure 10:
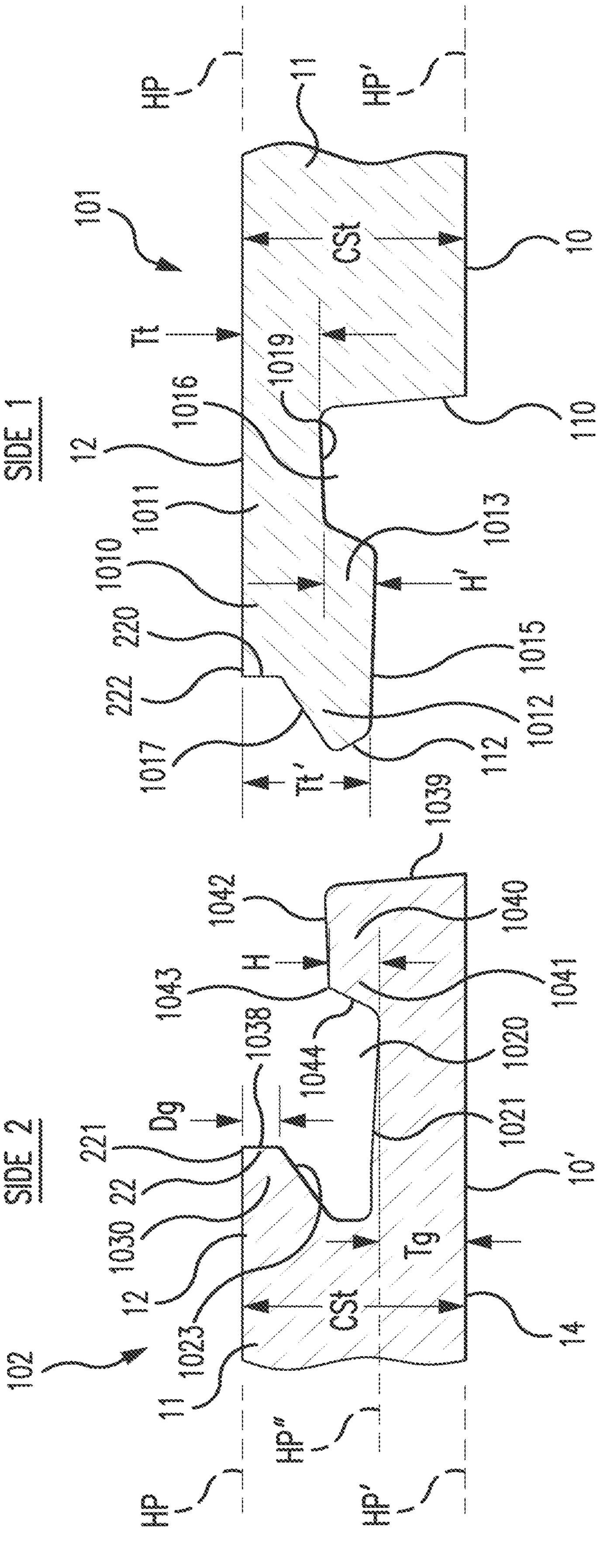
FIG. 10 is an enlarged cross-sectional view of adjacent tongued and grooved edges of adjacent planks as shown in FIG. 9 prior to installation.

FIG. 10 is an enlarged cross-sectional view of adjacent tongue and groove portions 101 and 102 of adjacent planks 10 and 10' shown in FIG. 9 showing some tongue and groove features in more detail. As indicated, these planks are composite sheet structures, such as illustrated herein but not limited thereto. In this illustration, the planks 10 and 10' have overall thickness Cst, and respective tongue and groove portions having square edges 221 and 222 at their upper approaching edge surfaces. With respect to the grooved portion 102 of plank 10', the groove 1020 on side 2 of plank 10' is defined in part by a groove landing or bottom portion 1021 located between flange 1030 extending along a first edge 1038 and a flange 1040 extending along an opposite edge 1039 of the plank 10'. A groove wall 1023 extends upwardly between the groove landing 1021 and a deck 22. The groove wall 1023 is curved, slanted, or both at least in part relative to plane HP. The groove landing 1021 can be sloped or extend parallel relative to plane HP' (or HP). The groove landing 1021 is illustrated with a slope relative to plane HP' in FIG. 10. When the groove landing 1021 has a slope relative to plane HP', such as illustrated in FIG. 10, the inclined land in the groove can further restrict the tongue from sliding apart from the groove after engagement, which can result in a stronger joint strength. The groove landing 1021 can comprise a planar surface that is sloped or parallel to plane HP'. A minimum groove thickness (Tg) is defined as the shortest vertical distance between the groove landing 1021 and the horizontal plane HP' of the lower surface 14 of the plank 10'. The flange 1040 comprises an interference 1041 having a height (H) that projects in a direction toward the horizontal plane HP of the upper surface 12 of the plank 10'. The flange 1040 has a lip landing 1042 defining its upper surface. The lip landing 1042 can be sloped or extend parallel relative to plane HP' (or HP). The lip landing 1042 is illustrated with a slope relative to plane HP' in FIG. 10. The lip landing 1042 can be a planar surface. Interference height (H) is defined as the shortest vertical distance between lip landing 1042 and a horizontal plane HP''' parallel to plane HP' that coincides with minimum groove thickness (Tg). The lip landing 1042 forms an edge 1043 with sloped or slanted wall 1044 of interference 1041 that in part defines groove 1020. As indicated, the grooved portion 102 also has a deck 22 having a length (Dg) that extends in a generally normal orientation to upper surface 12 and plane HP.

In FIG. 10, with respect to the tongued portion 101 of plank 10, the tongue 1010 comprises a member 1011 protruding from side 110 of the plank 10. The tongue 1010 has a minimum thickness (Tt) located in a downward facing recess 1016 defined by a recess wall 1019, wherein the minimum thickness (Tt) is defined as the shortest vertical distance between the recess wall 1019 and the horizontal plane HP of the upper surface 12 of the plank 10. A distal end portion 1012 of the tongue 1010 includes distal tip 112 and a downward extending projection 1013 of height (H') from the member 1011. The underside 1015 of the tongue distal end portion 1012 can be sloped or extend parallel relative to plane HP. The tongue underside 1015 can be a planar surface. The tongue underside 1015 is illustrated with a slope relative to plane HP in FIG. 10. A tongue tip thickness (Tt') is defined as a shortest vertical distance between the horizontal plane HP of the upper surface 12 of the composite sheet 11 and the tongue underside 1015. If tongue underside 1015 and recess wall 1019, in the alternative, are not sloped and extend parallel to plane HP, then Tt and H' have respective constant values and those values in combination correspond to the shortest vertical distance between plane HP and tongue underside 1015 to define the tongue tip thickness (Tt'). The tongue 1010 of plank 10 also includes a forward vertical abutment 220, which can abut or come into close proximity to opposing deck edge 22 of groove portion 102 of plank 10' when the tongue and groove portions of the planks are interlocked. The tongue distal end portion 1012 also has an upper slanted or sloped surface 1017 (relative to plane HP) that extends between abutment 220 and tip 112. The recess wall 1019 of the tongue 1010 can be sloped or extend parallel to plane HP. The recess wall 1019 has a slope relative to plane HP as illustrated in FIG. 10. The tongue 1010 also has a tongue length (TL) as indicated in FIG. 7, and reference is made thereto.

In embodiments of the present planks comprising composite sheets, such as illustrated (but not limited to) in FIGS. 7, 10, 12-16, and 61, wherein the plank can be, for example, a vinyl product or vinyl compositional product (e.g., a LVT-based product, or a VCT-based product, or a carpet tile which incorporates VCT-based product or an LVT-based product as a substrate component thereof), or similar construction, or a rubber product or a carpet tile which incorporates a rubber product as a substrate component thereof, at least one, or two or more, or three or more, or all four of the following conditions (i), (ii), (iii), and (iv) can be met in the plank design:

(i) the ratio of the tongue length TL to the composite sheet overall thickness (CSt) can be, for example, at least about 1.5, or from about 1.5 to about 2.0, or from about 1.7 to about 1.9;

(ii) Tg and Tt can be, for example, within ±24%, or within ±20%, or within ±15%, or within ±10%, or within ±7.5%, or within ±5%, or within ±4%, or within ±3%, or within ±2%, or within ±1%, or within ±0.5%, of each other;

(iii) H and H' can be, for example, within ±7%, or within ±5%, or within ±4%, or within ±3%, or within ±2%, or within ±1%, or within ±0.5%, of each other;

(iv) Tg/Tt' can be, for example, from about 0.32 to about 0.82, or from about 0.44 to about 0.82, or from about 0.50 to about 0.82, or from about 0.60 to about 0.82, or from about 0.65 to about 0.80, or from about 0.70 to about 0.76, or from about 0.72 to about 0.75.

Figure 11:
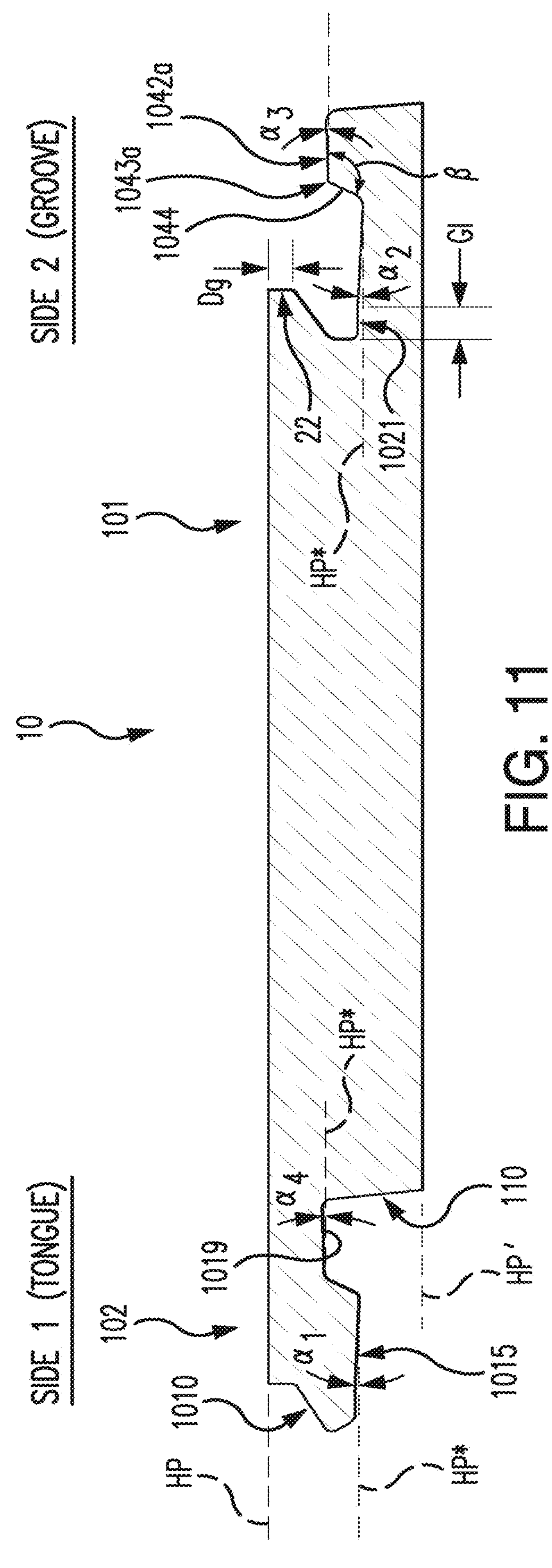
FIG. 11 is an enlarged cross-sectional view of a plank having tongued and grooved edges as shown in FIG. 9.

With reference to FIG. 11, some of the indicated tongue and groove features of the plank 10 (or plank 10') shown in FIGS. 5-10 are discussed further. With respect to the tongued portion 102 of plank 10 (or 10'), the tongue 1010 is elongated for ease of installation and resistance during loading, such as illustrated by the TL values disclosed herein. The sloped or slanted underside 1015 of tongue 1010 (relative to plane HP) can reduce the angle of insertion and can assist in increasing the tongue length (TL) to enhance a firm fit between tongue and groove. The angle of slope or slant between tongue underside 1015 and plane HP (shown in FIG. 11 as a plane HP* that is parallel to plane HP) can be, for example, an angle $\alpha_1$ of from 0.1° to about 5°, or from 0.5° to about 4°, from 1.5° to about 3.5°, from 1.8° to about 3°, from 2° to about 2.5°. As indicated, as an alternative, the tongue underside 1015 can extend parallel to plane HP' without a slope or slant relative thereto. As indicated, the recess wall 1019 of the tongue 1010 can be non-sloped, or sloped or slanted (relative to plane HP). To help accommodate an inclination or slope in the groove landing lip 1042, the recess wall 1019 of the tongue 1010 can be sloped or slanted (relative to plane HP) in a conforming manner relative to groove landing lip 1042*a*. If sloped, the angle of slope or slant of recess wall 1019 and plane HP (shown in FIG. 11 as a plane HP* that is parallel to plane HP) can be, for example, an angle $\alpha_4$ of from about 0.1° to about 5°, or from about 0.5° to about 4°, or from about 1.5° to about 3.5°, or from about 1.8° to about 3°, or from about 2° to about 2.5°. As indicated, as an alternative, the recess wall 1019 can extend parallel to plane HP without a slope or slant relative thereto, wherein angle $\alpha_4$ is 0° for that non-sloped configuration. Tongue channel wall 110 can be setback for expansion.

Figure 48:
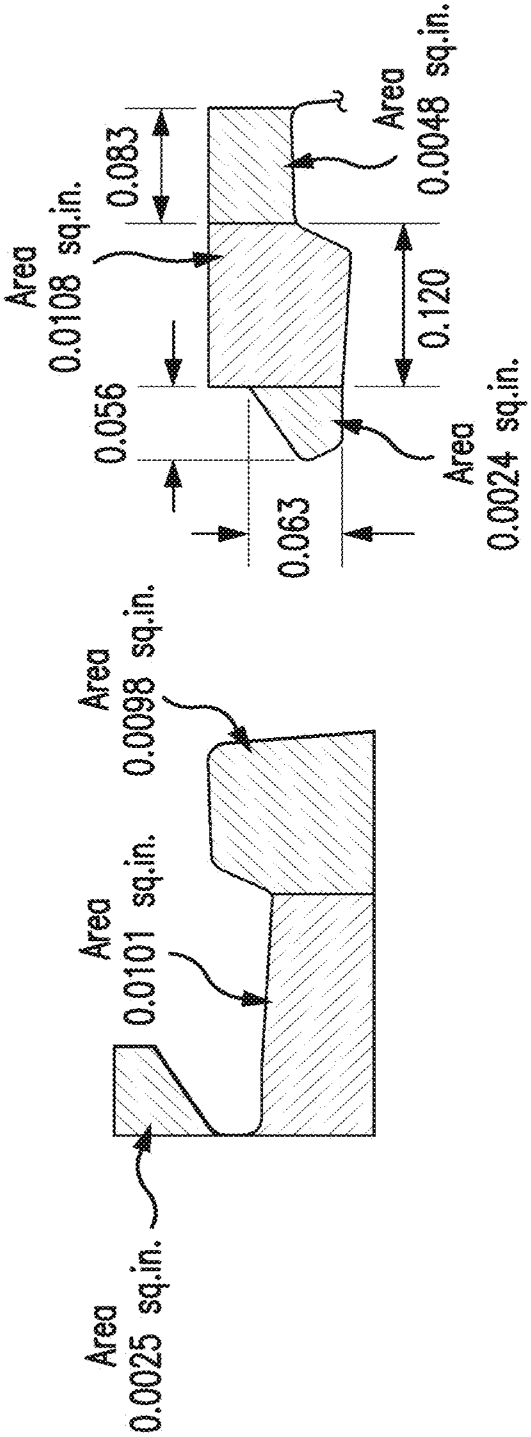

With respect to the grooved portion 101 of the plank 10 (or 10'), the sloped or slanted groove landing 1021 (also considered the lower groove landing or part of the proximal groove lower lip) can provide an enhanced guide to the tongue during locking mode and resistance during a decoupling mode. The angle of slope or slant between groove landing 1021 and plane HP' (shown in FIG. 11 as a plane HP* that is parallel to plane HP') can be, for example, an angle $\alpha_2$ of from about 0.1° to about 7°, or from about 0.5° to about 5°, or from about 1.5° to about 4°, or from about 2° to about 3.5°, or from about 2.5° to about 3°. As indicated, as an alternative, the groove landing 1021 can extend parallel to plane HP' without a slope or slant relative thereto. As indicated, the groove lip landing (e.g., 1042 in FIG. 10) can be non-sloped, or sloped or slanted (relative to plane HP'). If sloped, as shown in FIG. 11, the sloped or slanted groove lip landing 1042*a* (also considered the upper groove landing or part of the distal groove lower lip) can provide an enhanced guide to the tongue during lock and can reduce the angle of insertion. If sloped, the angle of slope or slant between groove lip landing 1042*a* and plane HP' (shown in FIG. 11 as a plane HP* that is parallel to plane HP') can be, for example, an angle $\alpha_3$ of from about 0.1° to about 5°, or from about 0.5° to about 4°, or from about 1.5° to about 3.5°, or from about 1.8° to about 3°, or from about 2° to about 2.5°. As indicated, as an alternative, the lip landing 1042*a* can extend parallel to plane HP' without a slope or slant relative thereto, wherein angle $\alpha_3$ is 0° for that non-sloped configuration. Edge 1043*a* (upper edge) can be "sharp", e.g., form an intersection angle β between lip landing 1042*a* and interference wall 1044 that can be, for example, between about 85° to about 135°, or from about 90° to about 120°, or from about 90° to about 115°, or other angle values, to provide enhanced resistance for making a forced fit between the tongue and groove. The edge 1043*a* can be rounded as an option, for instance, as shown in FIG. 48. The groove deck 22 can provide resistance to the tongue during lock to provide a firm fit and resistance during loading. The deck overhang, for example, can provide resistance to the tip of the tongue when force is applied. Additional deck overhang (e.g., approximately +0.009" or more) on the groove profile can be provided with the present groove and deck design. In addition, a larger overhang can be needed or helpful to provide room for beveling on certain plank products, such as the beveled edge planks illustrated elsewhere herein. The plank product preferably shows no signs of failure after 2,554 cycles under rolling load (the load was 165 lbs on a single caster), wherein the planks were floated over a rough piece of plywood. In addition, the pull strength for these plank designs has been measured in excess of 20 pli. In addition to the performance achievements, the groove deck thickness also can help to provide the resistance for a mild force fit and mild resistance to disengagement.

Further, a significant correlation to joint pull strength has been determined to be associated with providing tongue and groove edge profiles in the present planks of composite sheet structure and designs having a minimum groove thickness (Tg) and minimum tongue tip thickness (Tt) that are substantially similar (e.g., within ±24% or lower values). The tongue and the groove of the present planks, such as illustrated as tongue 1010 and groove 1020 in FIG. 10, can be interlockingly engageable with a corresponding groove or tongue on an adjacent floor plank to have a first pull strength (pli)-to-overall thickness (mm) ratio of at least about 2, or at least about 2.25, or at least about 2.5, or at least about 2.75, or at least about 4, or at least about 5, or at least about 6, or from about 2 to about 6, or from about 2.25 to about 5.25, or from about 2.75 to about 4. For purposes of the present application, pull strength is determined with International Standard test method ISO 24334 ("Laminate floor coverings—Determination of locking strength for mechanically assembled panels"). In one example, the pull strength of the present planks can be from about 5 pli to about 35 pli, or from about 7.5 pli to about 30 pli, or from about 11 pli to 24 pli, or other values.

The tongue and groove edge profiles such as shown for the planks in FIGS. 2-42 are merely illustrative. The resilient planks can be configured at the edge profiles to have other suitable geometries and dimensions, as long as the planks incorporate one or more of the present conditions a), b), c), and d) (or one or more of conditions (i), (ii), (iii), and (iv)). FIGS. 12-15, 16, 19, 22, 24, 26, 28, 30, 32, 34, 35, 37, 38, 39 and 41 show additional exemplary measurements for tongue and groove edge profiles of the present planks. FIGS. 17, 20, 23, 25, 27, 29, 31, 33, and 36 show the tongue and groove edge portions of some of these indicated figures in an interlocked arrangement.

Figure 12:
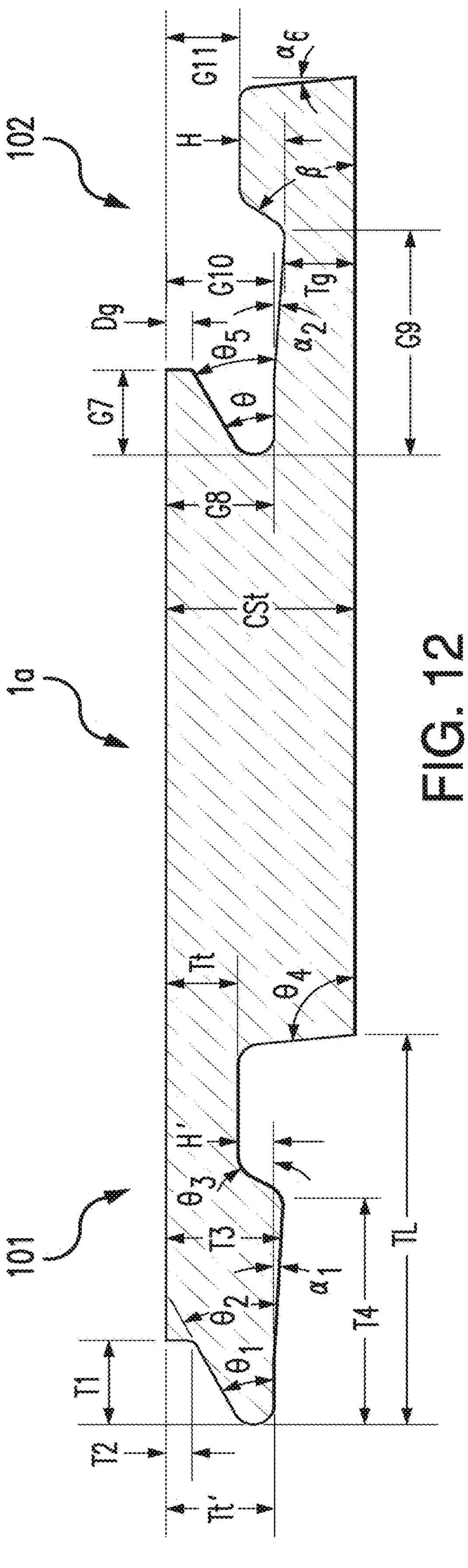
FIG. 12 is an enlarged cross-sectional view of a non-grouted square edge plank or tile having tongued and grooved edges with other illustrative complementary profiles.

FIG. 12 shows a present plank or tile 1*a* having an opposite tongue profile 101 and a groove profile 102. In FIG. 12, the identified dimensions can have the following values: CSt=0.118 inch (3.0 mm), TL=0.272 in., Tg=0.045 in., H=0.028 in., Dg=0.015 in., angle θ=28°, angle $\alpha_2$=3°, angle β=63°, G7=0.058 in., G8=0.067 in., G9=0.157 in., G10=0.073 in., G11=0.045 in., Tt=0.045 in., angle $\alpha_1$=2°, H'=0.028 in., Tt'=0.067 in., angle $\theta_1$=26°, angle $\theta_2$=29°, angle $\theta_3$=63°, angle $\theta_4$=95°, T1=0.058 in., T2=0.016 in., and T4=0.157 in. In FIG. 12, the absolute value of (1−Tt/Tg)=(1−0.045/0.045)=0%. Thus, in this illustration, Tt and Tg are within ±24% of each other. The absolute value of (1−H/H')=1−0.028/0.028=0%. Thus, in the illustration, H and H' are within ±7% of each other. The value of Tg/Tt'=0.045/

0.067=0.67. Thus, the value of Tg/Tt' is in the range of about 0.32 to about 0.82. The value of TL/CSt=2.30. Thus, the value of TL/CSt is at least 1.5. Any one or more of these values in FIG. 12 can be ±5%, ±10%, or ±20% from the values stated herein.

Figure 13:
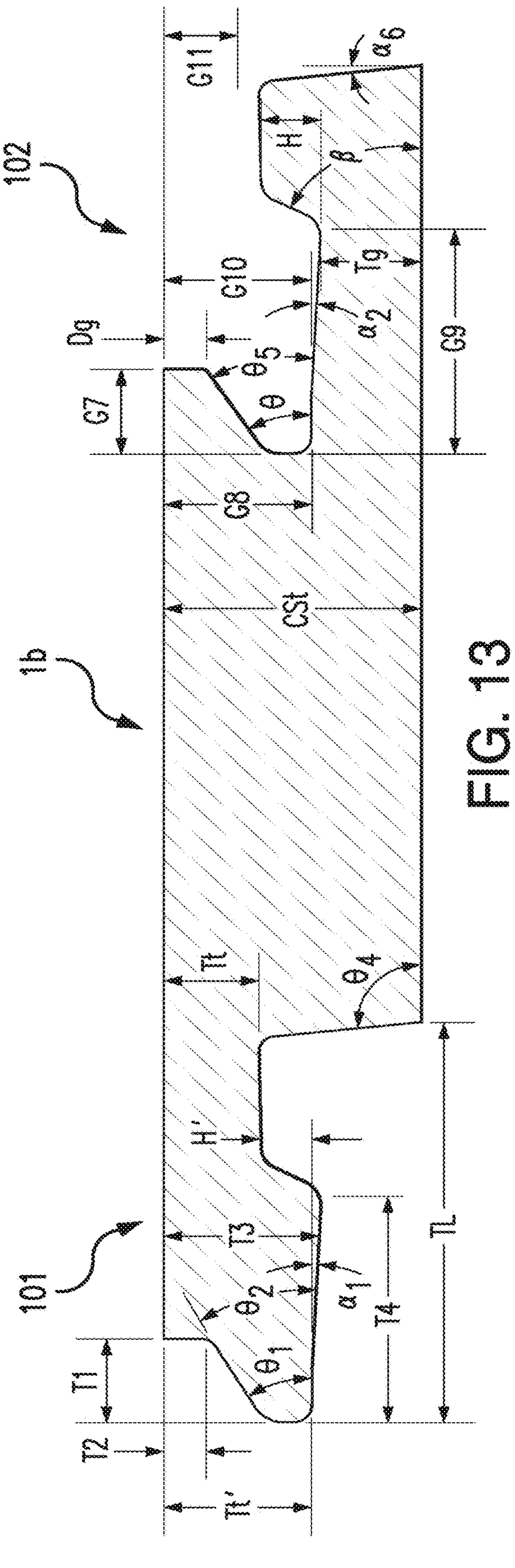
FIG. 13 is an enlarged cross-sectional view of a non-grouted square edge plank or tile having tongued and grooved edges with other illustrative complementary profiles.

FIG. 13 shows a present plank or tile 1*b* having an opposite tongue profile 101 and a groove profile 102. In FIG. 13, the identified dimensions can have the following values: CSt=0.158 inch (4.0 mm), TL=0.272 in., Tg=0.058 in., H=0.028 in., Dg=0.026 in., angle θ=33°, angle $\alpha_2$=3°, angle β=63°, G7=0.058 in., G8=0.093 in., G9=0.157 in., G10=0.099 in., G11=0.060 in., Tt=0.060 in., angle $\alpha_1$=2°, H'=0.028 in., Tt'=0.093 in., angle $\theta_1$=31°, angle $\theta_2$=34°, angle $\theta_3$=63°, angle $\theta_4$=95°, T1=0.058 in., T2=0.027 in., and T4=0.157 in. In FIG. 13, the absolute value of (1−Tt/Tg)=(1−0.060/0.058)=3.4%. Thus, in this illustration, Tt and Tg are within ±24% of each other. The absolute value of (1−H/H')=1−0.028/0.028=0%. Thus, in the illustration, H and H' are within ±7% of each other. The value of Tg/Tt'=0.058/0.093=0.63. Thus, the value of Tg/Tt' is in the range of about 0.32 to about 0.82. The value of TL/CSt=1.72. Thus, the value of TL/CSt is at least 1.5. Any one or more of these values in FIG. 13 can be ±5%, ±10%, or ±20% from the values stated herein.

As indicated, the tongue and groove locking joint designs of the present invention also are applicable to grouted plank and tile, such as grouted LVT laminate planks or tiles (e.g., simulated wood flooring LVT laminates) and grouted VCT planks or tiles, and other present composite sheet materials. The VCT, LVT, or rubber plank or tile material, for example, can include a groove for receiving grout at the upper surface above where the profiled edges are mated. The grout groove width or gap, as defined and measurable when adjoining planks or tiles are mated, is not necessarily limited, as long as the size of the gap does not compromise the viability of the tongue and groove interlock. The groove width or gap can be, for example, from about 0.05 in. to about 1 in., or from about 0.1 in. to about 0.75 in., or from about 0.12 to about 0.6 in, or from about 0.15 in, to about 0.5 in., or from about 0.2 to about 0.4 in., or from about 0.22 in. to about 0.3 in., or other values. The depth of the grout groove in relation to the plank or tile thickness, for example, can be, for example, from about 5% to about 50%, or from about 10% to about 45%, or from about 15% to about 40%, or from about 20% to about 30%, or other values.

Figure 14:
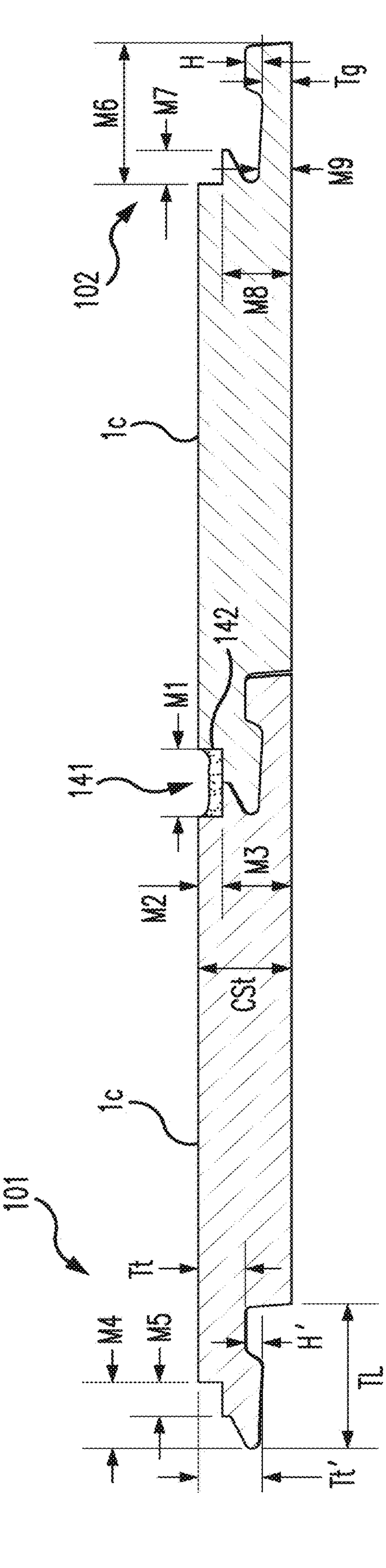
FIG. 14 is an enlarged cross-sectional view through the edge portions of connected grouted planks or tiles having tongued and grooved edges and defining a grout groove according to various options of the present invention.

FIG. 14 shows interlocked grouted planks or tiles 1*c*, each having an opposite tongue profile 101 and a groove profile 102, and a ⅛ in. wide grout groove 141 defined at the mating surfaces. The grout 142 can partially or completely fill the groove 141. The grout can comprise any conventional or other suitable grouting composition, and can be applied in any conventional or suitable manner. In FIG. 14, the identified dimensions can have the following values: CSt=0.158 inch (4.0 mm), M1=0.125 in., Tg=0.049 in., TL=0.272 in., H and H' are within ±7% of each other, Tt=0.081 in, Tt'=0.109 in., M2=0.040 in., M3=0.118 in., M4=0.120 in., M5=0.062 in., M6=0.262 in., M7=0.063 in., M8=0.118 in, and M9=0.055 in. In FIG. 14, the value of Tg/Tt'=0.049/0.109=0.45. The value of TL/CSt=1.72. The absolute value of (1−Tt/Tg)=(1−0.081/0.049)=65%. In this grout option illustration, Tt and Tg are greater than ±24% of each other. Any one or more of these values in FIG. 14 can be ±5%, ±10%, or ±20% from the values stated herein.

Figure 15:
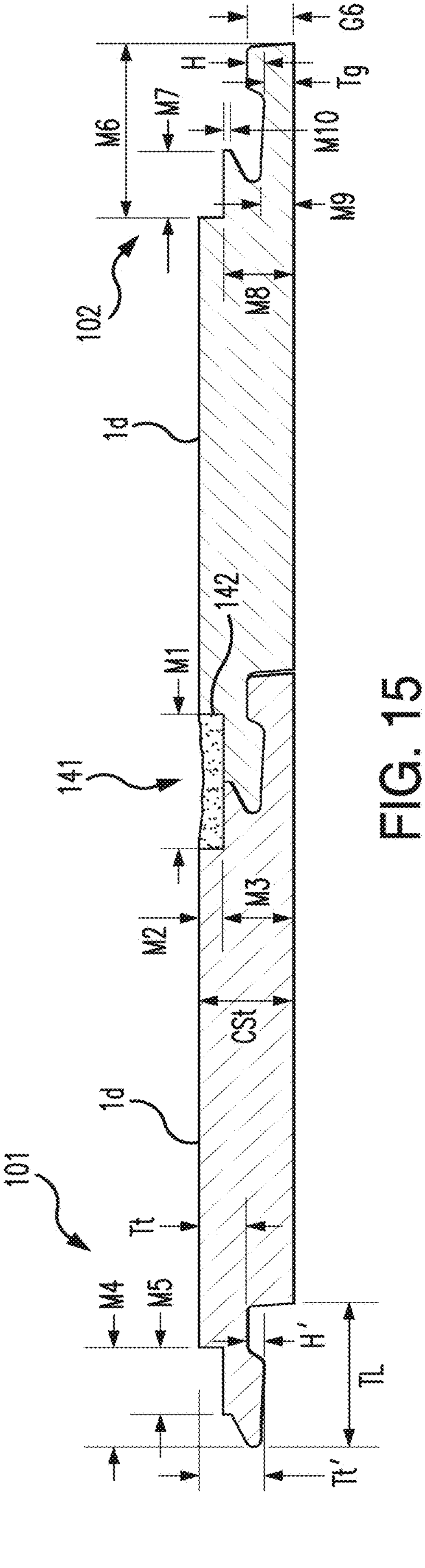
FIG. 15 is an enlarged cross-sectional view through the edge portions of connected grouted planks or tiles having tongued and grooved edges and defining a grout groove according to various options of the present invention.

FIG. 15 shows interlocked grouted planks or tiles 1*d*, each having an opposite tongue profile 101 and a groove profile 102, and a ¼ in. wide grout groove 141 defined at the mating surfaces. The grout 142 can partially or completely fill the groove 141. In FIG. 15, the identified dimensions can have the following values: CSt=0.158 inch (4.0 mm), M1=0.250 in., Tg=0.049 in., TL=0.272 in., H=0.028_in., H' is within ±7% of H, Tt=0.081 in, Tt'=0.109 in., M2=0.040 in., M3=0.118 in., M4=0.183 in., M5=0.125 in., M6=0.324 in., M7=0.125 in., M8=0.118 in, M9=0.055 in., M10=0.011 in., and G6 is 0.077 inch. In FIG. 15, the value of Tg/Tt'=0.049/0.109=0.45. Thus, the value of Tg/Tt' is in the range of about 0.32 to about 0.82. The value of TL/CSt=1.72. The absolute value of (1−Tt/Tg)=(1−0.081/0.049)=65%. In this grout option illustration, Tt and Tg are greater than ±24% of each other. The grouted plank or tile option of the present invention also can meet at least one of the indicated conditions (a)-(d), other than a difference with respect to condition (c) wherein the grouted option does not need to meet the requirement of Tg and Tt being within ±24% of each other, but can meet the other (c) conditions. Thus, the grouted option can meet condition (a), or condition (b), or condition (d), or condition (c) with the above noted modification, or any combination of these conditions. Any one or more of these values in FIG. 15 can be ±5%, ±10%, or ±20% from the values stated herein.

Figure 16:
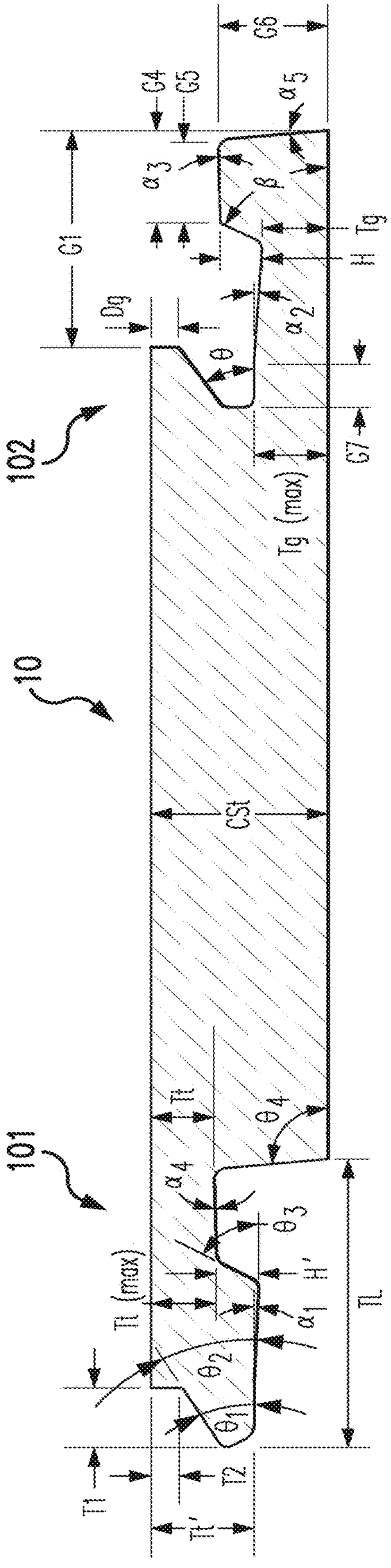
FIG. 16 is an enlarged cross-sectional view of a square edge plank having tongued and grooved edges with other illustrative complementary profiles.
Figure 49:
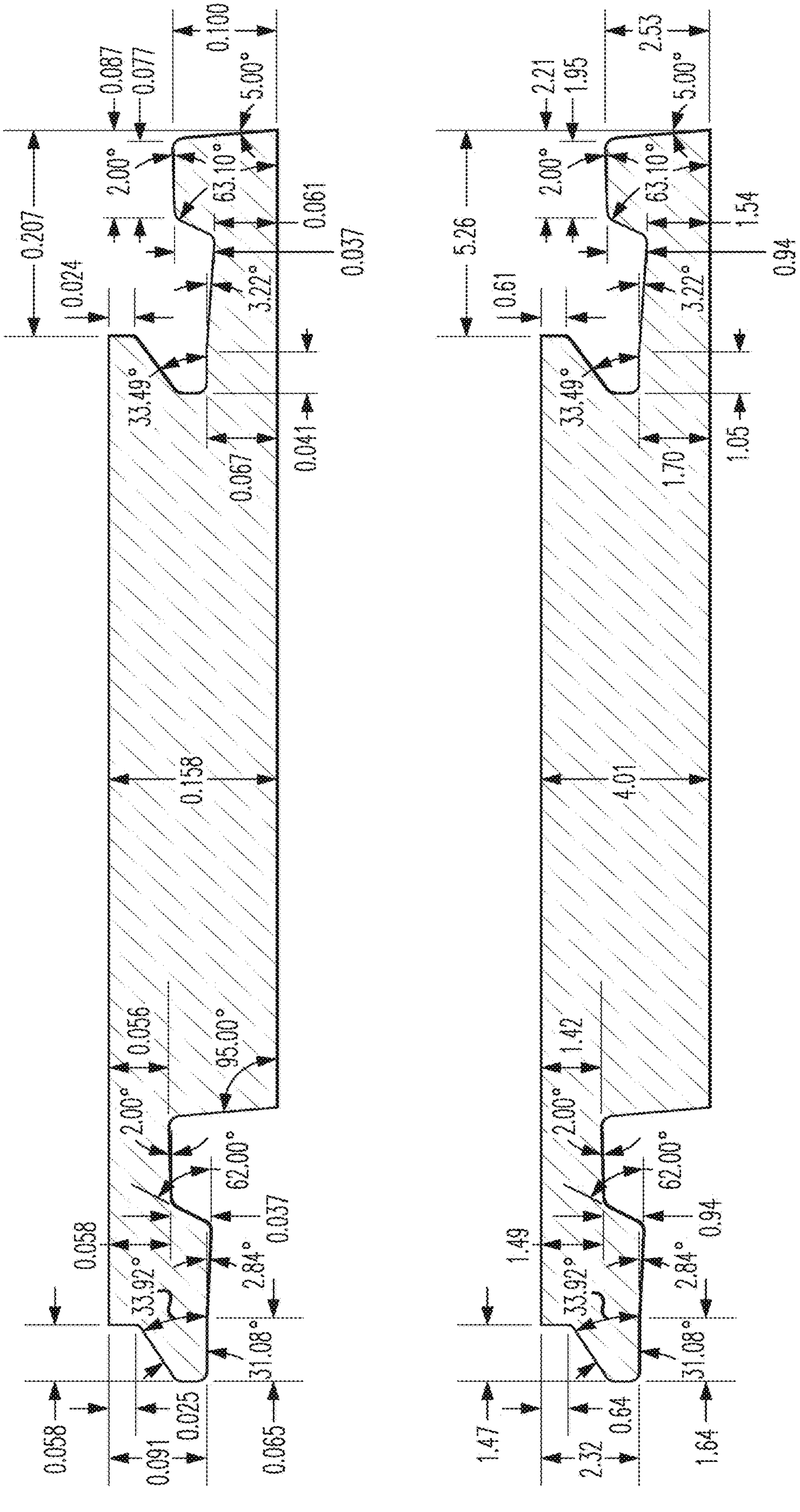
Figure 50:
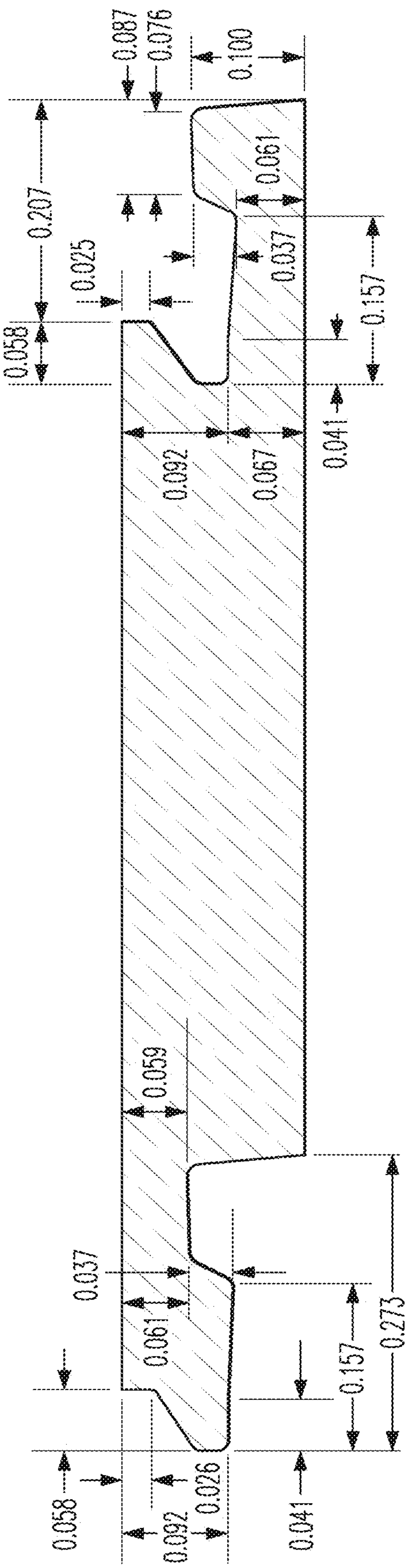
Figure 50:
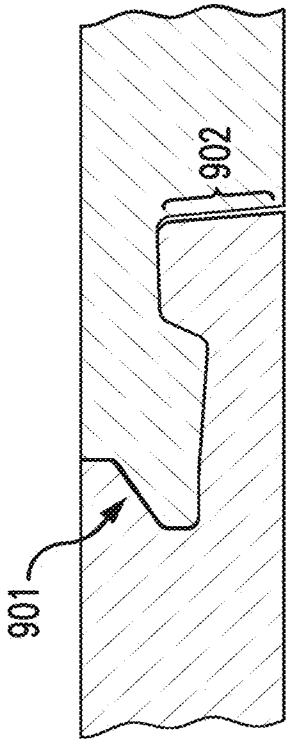

FIG. 16 shows a present plank 10 having an opposite tongue profile 101 and a groove profile 102. In FIG. 16, the identified dimensions can have the following values: CSt=0.158 inch (4.0 mm), Tg=0.061 in., Tg(maximum)=0.067 in., H=0.037 in., Dg=0.024 in., G1=0.207 in., angle θ=33.49°, angle $\alpha_2$=3.22°, angle $\alpha_3$=2.00°, angle $\alpha_5$=5.00°, angle β=63.10°, G4=0.088 in., G5=0.078 in., G6=0.100 in., G7=0.041 in., Tt=0.054 in., Tt (max)=0.057 in., angle $\alpha_4$=1.89°, angle $\alpha_1$=2.00°, H'=0.037 in., Tt'=0.089 in., TL=0.270 in., angle $\theta_1$=33.08°, angle $\theta_2$=31.08°, angle $\theta_3$=63.00°, angle $\theta_4$=95.00°, T1=0.056 in., and T2=0.025 in. In FIG. 16, the value of (1−Tt/Tg)=(1−0.054/0.061)=11.4%. Thus, in this illustration, Tt and Tg are within about 12% of each other. The value of (1−H/H')=1−0.037/0.037=0%. Thus, in the illustration, H and H' are within 0% of each other. The value of Tg/Tt'=0.061/0.089=0.685. The value of TL/CSt=1.71. FIGS. 49 and 50 show examples of other values for these measurements.

Figure 17:
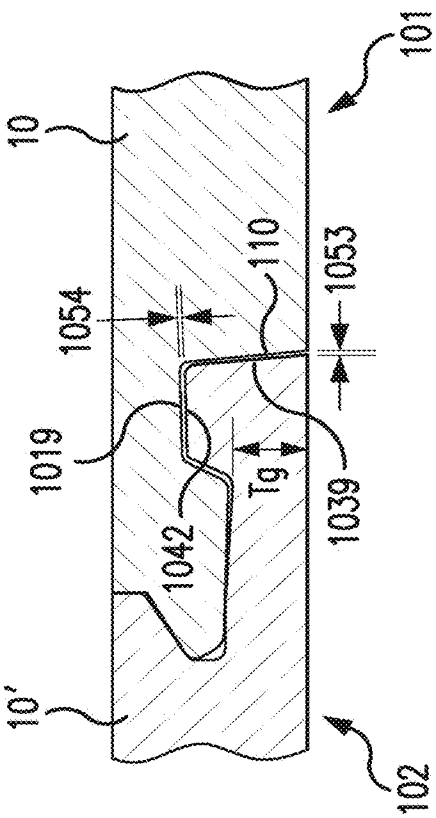
FIG. 17 is an enlarged cross-sectional side view through the edge portions of connected planks of FIG. 16 according to various options of the present invention.

FIG. 17 shows the tongue profile 101 and groove profile 102 of adjacent identical square edge planks 10 and 10' such as illustrated in FIG. 16 in a mechanically interlocked position. The gaps 1053 and 1054 can exist and can be 0.008 in. and 0.002 in. respectively, and Tg is 0.061 in. as indicated. As an example, any one or more of these dimensional and angular measurements or values provided throughout the present application, such as illustrated in (but not limited to) FIGS. 1 to 61 can be (or vary) ±20%, ±15%, ±10%, ±5%, ±3%, ±2%, ±1%, ±0.5%, ±0.1%, from one or more of these particular measurements or values.

In comparing the edge profiling of plank or tile 1*a* of FIG. 12 with plank 10 of FIG. 16, the angled steps on the back-side of the locking joint (i.e., H and H') are reduced in height by 24% from 0.037 inch in the plank or tile of FIGS. 16 to 0.028 inch in the plank or tile of FIG. 12. This reduction can allow for maintenance of more thickness for Tt and Tg. The change also can be made proportional to the overall reduction in thickness and with maintained desired strength to thickness ratio.

Figure 18:
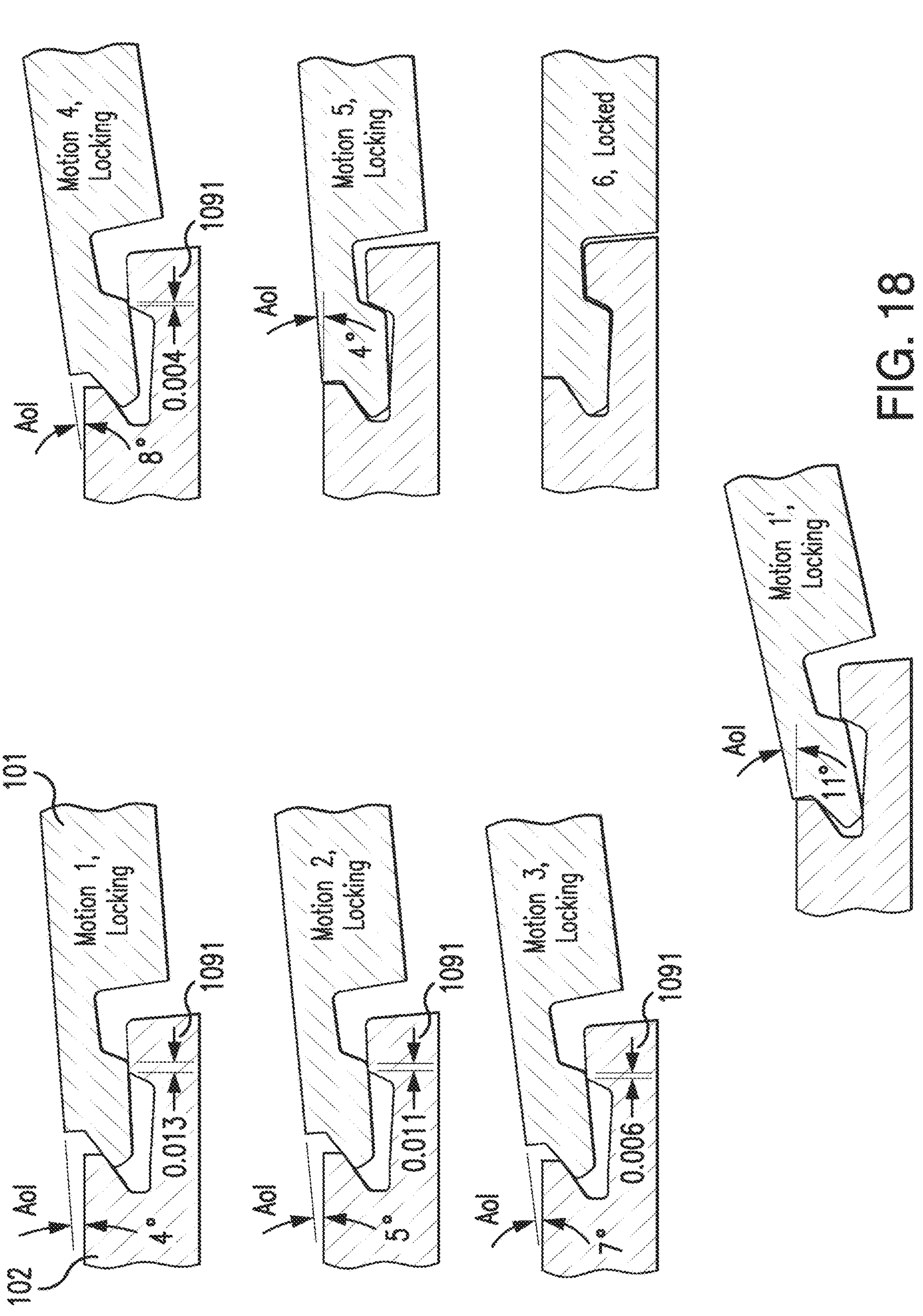
FIG. 18 is enlarged cross-sectional views of a method of installing edges of planks of FIG. 16 for interlocking and unlocking.

FIG. 18 is an enlarged cross-sectional view of a method of installing edges of the square edge planks of FIG. 16 for interlocking and unlocking. Positions 1-5 sequentially show the angle of insertion "AoI" and overlap 1091 of the tongue underside 1015 and groove landing lip 1042 at different stages of the insertion of a tongue of a plank into a groove of an adjacent identical plank until interlocked as shown in position 6. Step 1' illustrates an unlocking AoI in an unlocking mode. These AoI and overlap values are merely illustrative and non-limiting.

Figure 19:
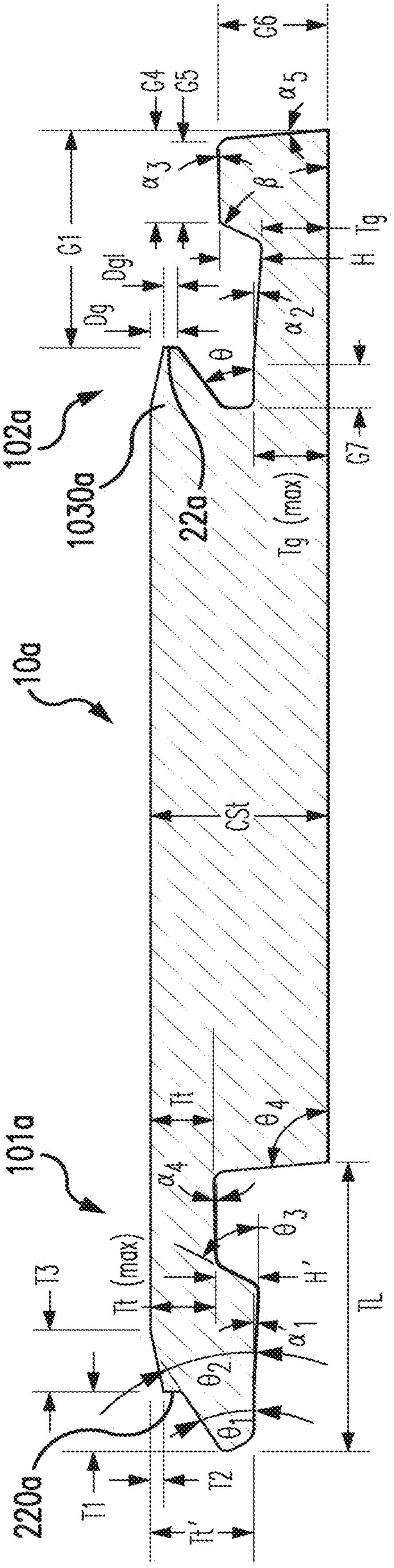
FIG. 19 is enlarged cross-sectional views of a beveled edge plank having tongued and grooved edges with other illustrative complementary profiles.

FIG. 19 shows a present plank 10*a* having an opposite tongue profile 101*a* and a groove profile 102*a*. In this beveled edge plank structure, the flange 1030*a* of the grooved portion 102*a* has a tapered deck 22*a* that narrows to the thickness Dg1. The abutment 220*a* in the tongued portion 101*a* is beveled to slope down a distance T2 over the lateral tongue dimension T3. In FIG. 19, the identified dimensions can have the following values: CSt=0.158 inch (4.0 mm), Tg=0.061 in., Tg(maximum)=0.067 in., H=0.037 in., Dg=0.024 in., Dg1=0.012 in., G1=0.207 in., angle θ=33.49°, angle $\alpha_2$=3.22°, angle $\alpha_3$=2.00°, angle $\alpha_5$=5.00°, angle β=63.10°, G4=0.088 in., G5=0.078 in., G6=0.100 in., G7=0.041 in., Tt=0.054 in., Tt (max)=0.057 in., angle $\alpha_4$=1.89°, angle $\alpha_1$=2.00°, H'=0.037 in., Tt'=0.089 in., TL=0.270 in., angle $\theta_1$=33.08°, angle $\theta_2$=31.08°, angle $\theta_3$=63.00°, angle $\theta_4$=95.00°, T1=0.056 in., T2=0.012 in., T3=0.061 in., Tg/Tt'=0.685, and TL/CSt=1.71. In FIG. 19, Tt, Tg, H, H', CSt, and TL have the same values as in the illustration of FIG. 16, and thus the parameters have similar relationships as indicated for FIG. 16, and reference is made thereto.

Figure 20:
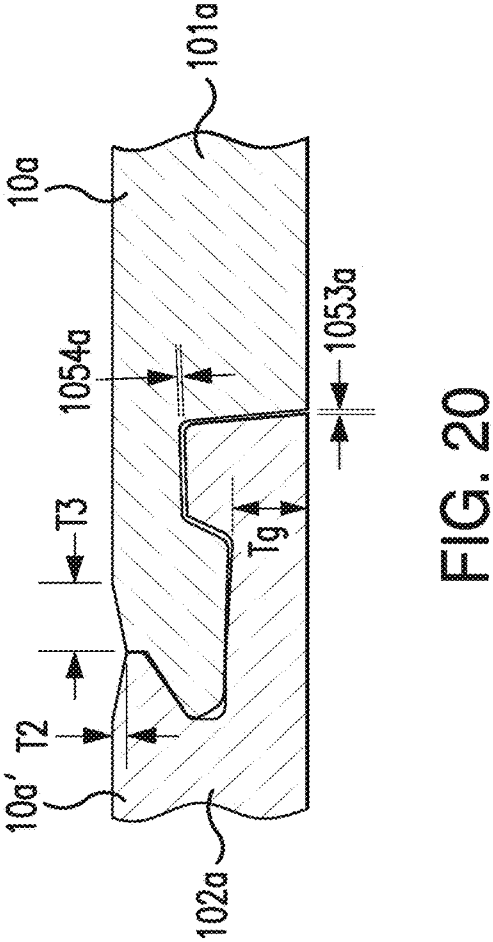
FIG. 20 is an enlarged cross-sectional side view through the edge portions of connected planks of FIG. 19 according to various options of the present invention.

FIG. 20 shows the tongue profile 101*a* and groove profile 102*a* of adjacent identical beveled edge planks 10*a* and 10*a*' such as illustrated in FIG. 19 in a mechanically interlocked position. The gap 1053*a*=0.008 in. and gap 1054*a*=0.002 in., and Tg is 0.061 in. as indicated. As an example, any one or more of these dimensional and angular measurements, such as illustrated in FIGS. 19 and 20 can be (or vary) ±20%, ±15%, ±10%, ±5%, ±3%, ±2%, ±1%, ±0.5%, ±0.1%, from one or more of these particular measurements.

Figure 21:
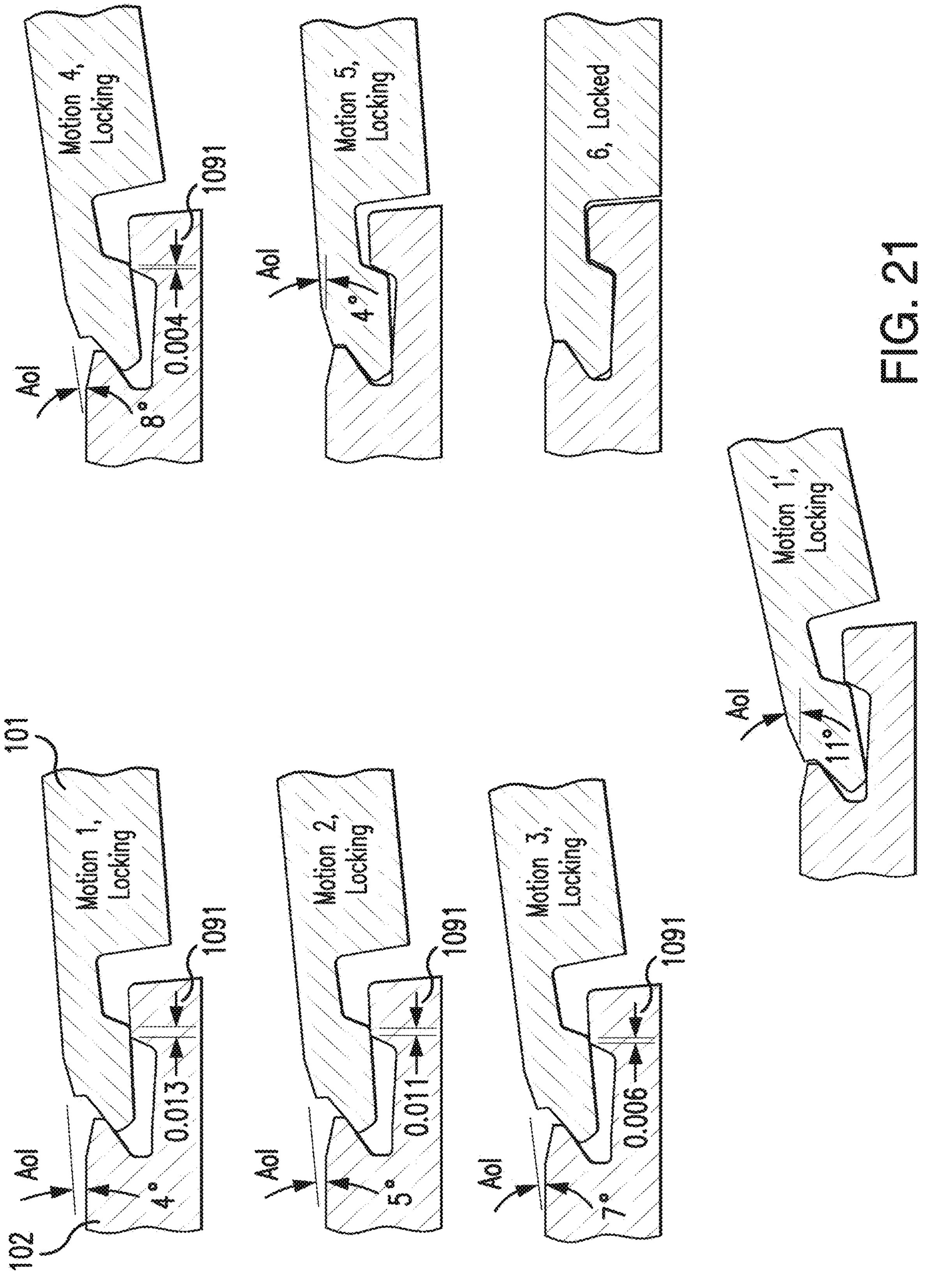
FIG. 21 is enlarged cross-sectional views of a method of installing edges of planks of FIG. 19 for interlocking and unlocking.

FIG. 21 is an enlarged cross-sectional view of a method of installing edges of the beveled edge planks of FIG. 19 for interlocking and unlocking. Positions 1-5 sequentially show the angle of insertion “AoI” and overlap 1091 of the tongue underside 1015 and groove landing lip 1042 at different stages of the insertion of a tongue of a plank into a groove of an adjacent identical plank until interlocked as shown in position 6. Step 1' illustrates an unlocking AoI in an unlocking mode. These AoI and overlap values are merely illustrative and non-limiting.

Figure 22:
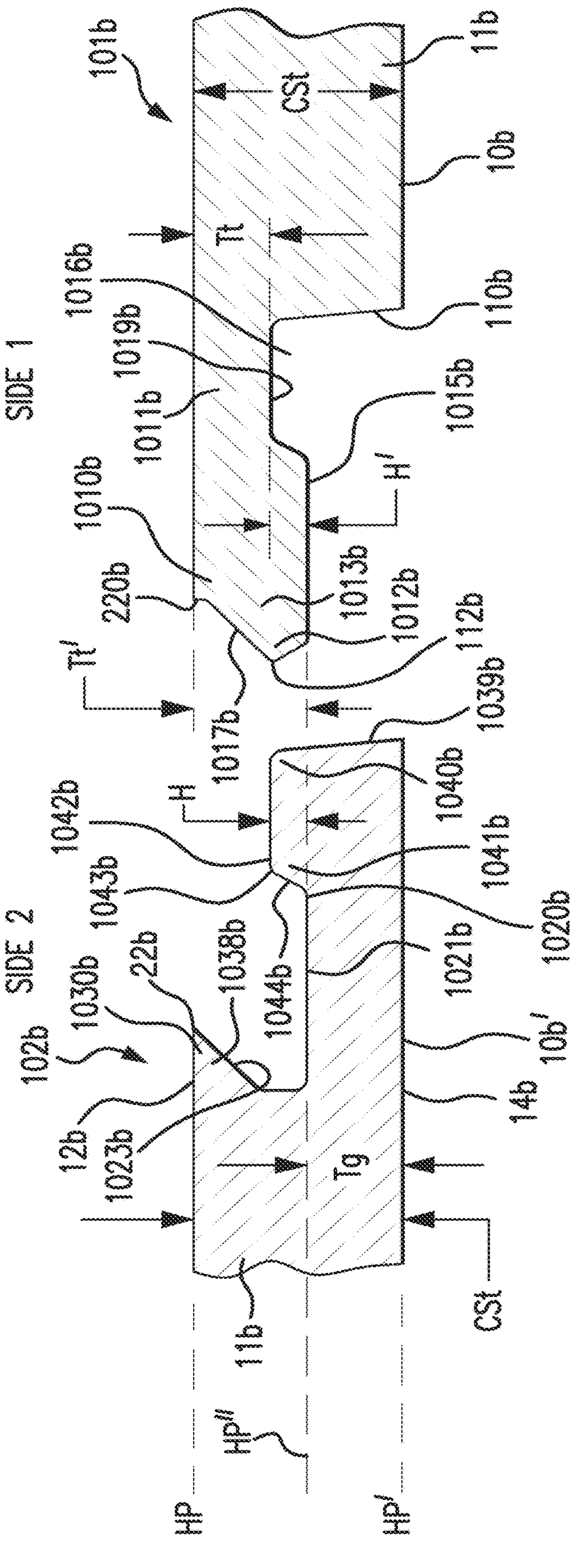
FIG. 22 is an enlarged cross-sectional side view of adjacent tongued and grooved edges of adjacent planks prior to installation with other illustrative complementary profiles.
Figure 23:
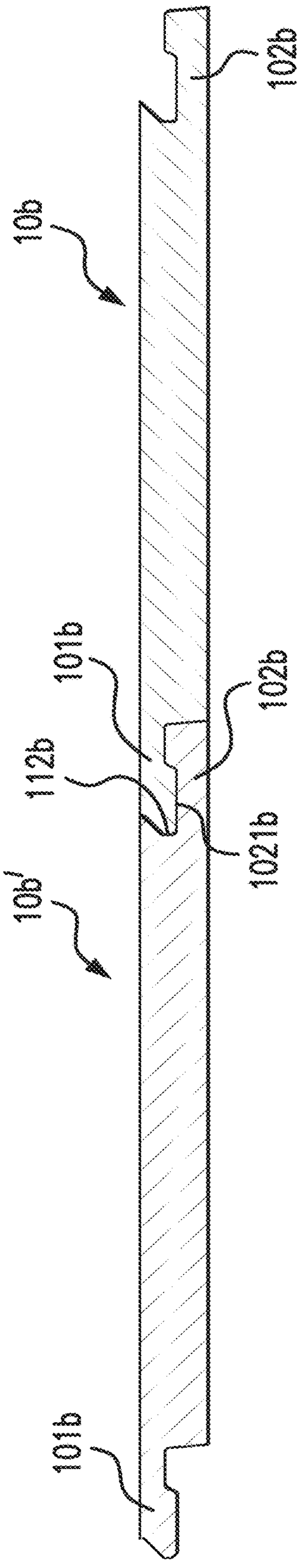
FIG. 23 is an enlarged cross-sectional side view through connected planks having tongue and groove portions as shown in FIG. 22 according to various options of the present invention.

FIG. 22 is an enlarged cross-sectional view of adjacent tongue and groove portions 101*b* and 102*b* of adjacent interlockable planks 10*b* and 10*b*' as shown in FIG. 23 showing some tongue 101*b* and groove 102*b* features thereof in more detail. As indicated, these planks 10*b* and 10*b*' also are composite sheet structures, such as illustrated herein but not limited thereto. With respect to the grooved portion 102*b* of plank 10*b*', the groove 1020*b* on side 2 of plank 10*b*' is defined in part by a groove landing or bottom portion 1021*b* located between flange 1030*b* extending along a first edge 1038*b* and a flange 1040*b* extending along an opposite edge 1039*b* of the plank 10*b*'. A groove wall 1023*b* extends upwardly between the groove landing 1021*b* and a deck 22*b*. The groove wall 1023*b* is curved, slanted, or both at least in part relative to plane HP. The groove landing 1021*b* extends parallel relative to plane HP' (or HP) in this illustration. A minimum groove thickness (Tg) is defined as the shortest vertical distance between the groove landing 1021*b* and the horizontal plane HP' of the lower surface 14*b* of the plank 10*b*'. The flange 1040*b* comprises an interference 1041*b* having a height (H) that projects in a direction toward the horizontal plane HP of the upper surface 12*b* of the plank 10*b*'. The flange 1040*b* has a lip landing 1042*b* defining its upper surface. The lip landing 1042*b* extends parallel relative to plane HP' (or HP) in this illustration. Interference height (H) is defined as the shortest vertical distance between lip landing 1042*b* and a horizontal plane HP" parallel to plane HP' that coincides with minimum groove thickness (Tg). The lip landing 1042*b* forms an edge 1043*b* with sloped or slanted wall 1044*b* of interference 1041*b* that in part defines groove 1020*b*. With respect to the tongued portion 101*b* of plank 10*b*, the tongue 1010*b* comprises a member 1011*b* protruding from side 110*b* of the plank 10*b*. The tongue 1010*b* has a minimum thickness (Tt) located in a downward facing recess 1016*b* defined by a recess wall 1019*b*, wherein the minimum thickness (Tt) is defined as the shortest vertical distance between the recess wall 1019*b* and the horizontal plane HP of the upper surface 12*b* of the plank 10*b*. A distal end portion 1012*b* of the tongue 1010*b* includes distal tip 112*b* and a downward extending projection 1013*b* of height (H') from the member 1011*b*. The underside 1015*b* of the tongue distal end portion 1012*b* extends parallel relative to plane HP in this illustration. A tongue tip thickness (Tt') is defined as a shortest vertical distance between the horizontal plane HP of the upper surface 12*b* of the composite sheet 11*b* and the tongue underside 1015*b*. Tongue underside 1015*b* and recess wall 1019*b* are not sloped and extend parallel to plane HP in this illustration, wherein Tt and H' have respective constant values and those values in combination correspond to the shortest vertical distance between plane HP and tongue underside 1015*b* to define the tongue tip thickness (Tt'). The tongue 1010*b* of plank 10*b* also includes a forward vertical abutment 220*b*, which can abut or come into close proximity to opposing deck edge 22*b* of groove portion 102*b* of plank 10*b*' when the tongue and groove portions of the planks are interlocked. The tongue distal end portion 1012*b* also has an upper slanted or sloped surface 1017*b* (relative to plane HP) that extends between abutment 220*b* and tip 112*b*. With respect to FIG. 22, Tg, Tt, H, H', Tt', CSt, and TL can have similar relationships as indicated for the plank design of FIG. 10, and reference is made thereto.

FIGS. 24-38 show illustrations of variations on the plank design of FIG. 22 where at least one or more of the groove landing, groove lip landing, tongue underside, and tongue recess wall, extend parallel to the horizontal plane of the upper or lower surface of the plank.

Figure 24:
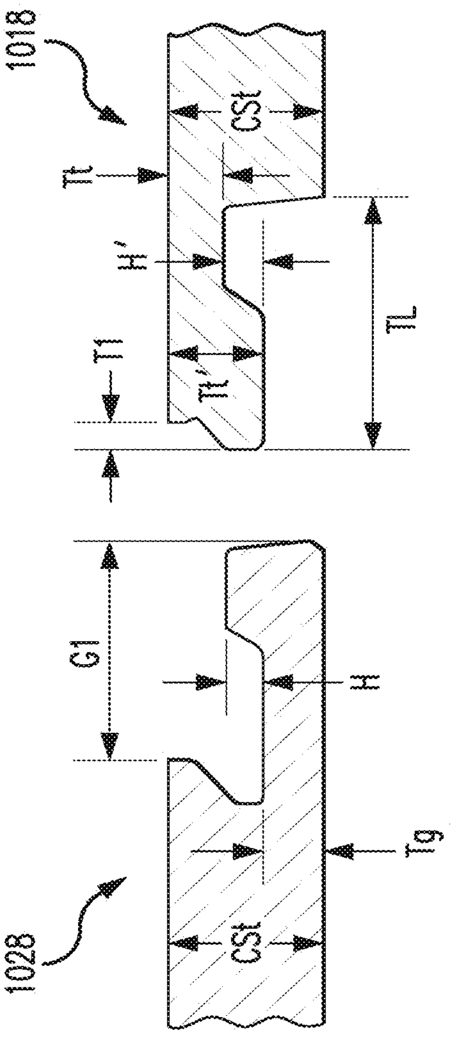
FIGS. 24 and 26 are enlarged cross-sectional views of adjacent tongued and grooved edges of adjacent planks prior to installation with other illustrative complementary profiles.
Figure 25:
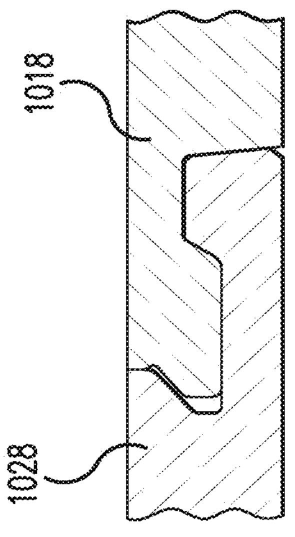
FIGS. 25 and 27 are enlarged cross-sectional side views through the edge portions of connected planks of FIGS. 24 and 26, respectively, according to various options of the present invention.

FIG. 24 shows a tongue profile 1018 and a groove profile 1028 of adjacent identical planks, similar to planks 10 and 10' such as shown in FIG. 22 with a different embodiment of the edge profiles and before engagement of the adjacent edges. In FIG. 24, the identified dimensions can have the following values: CSt=0.176 inch (4.5 mm), Tg=0.065 in., H=0.043 in., G1=0.263 in., Tt=0.065 in., H'=0.044 in., Tt'=0.109 in., Tg/Tt'=0.60, TL=0.304 in., TL/CSt=1.73, and T1=0.036 in. FIG. 24 shows the tongue profile 1018 and groove profile 1028 of adjacent identical planks in a mechanically interlocked position.

Figure 26:
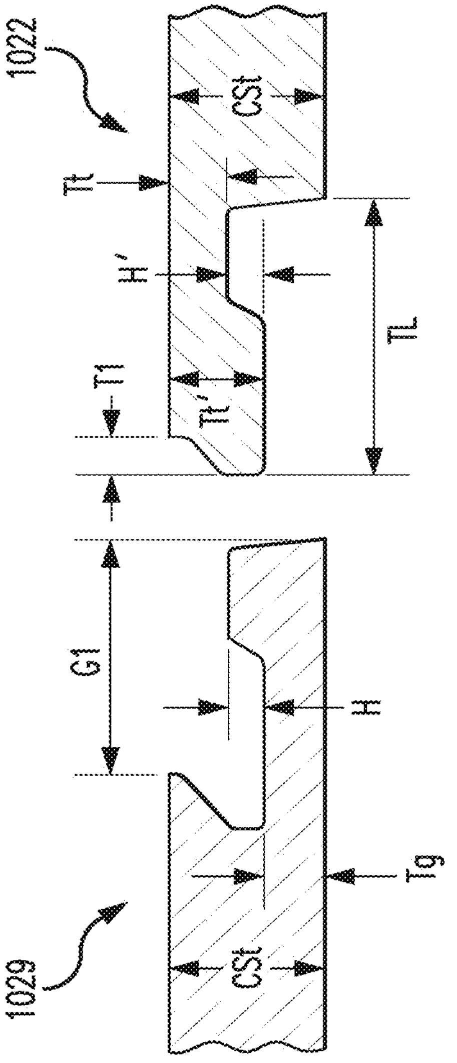
Figure 27:
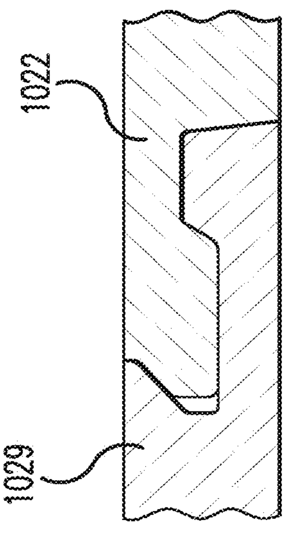

FIG. 26 shows a tongue profile 1022 and a groove profile 1029 of adjacent identical planks, similar to planks 10 and 10' such as shown in FIG. 22 with a different embodiment of the edge profiles and before engagement of the adjacent edges. In FIG. 26, the identified dimensions can have the following values: CSt=0.158 inch (4.0 mm), Tg=0.060 in., H=0.038 in., G1=0.252 in., Tt=0.057 in., H'=0.038 in., Tt'=0.095 in., Tg/Tt'=0.63, TL=0.299 in., TL/CSt=1.89, and T1=0.044 in. FIG. 27 shows the tongue profile 1022 and groove profile 1029 of adjacent identical planks in a mechanically interlocked position.

Figure 29:
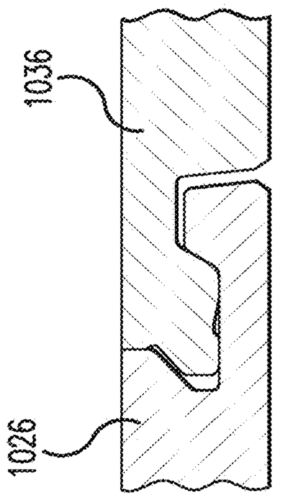
FIG. 29 is enlarged cross-sectional side view through the edge portions of connected planks of FIG. 28, according to various options of the present invention.
Figure 28:
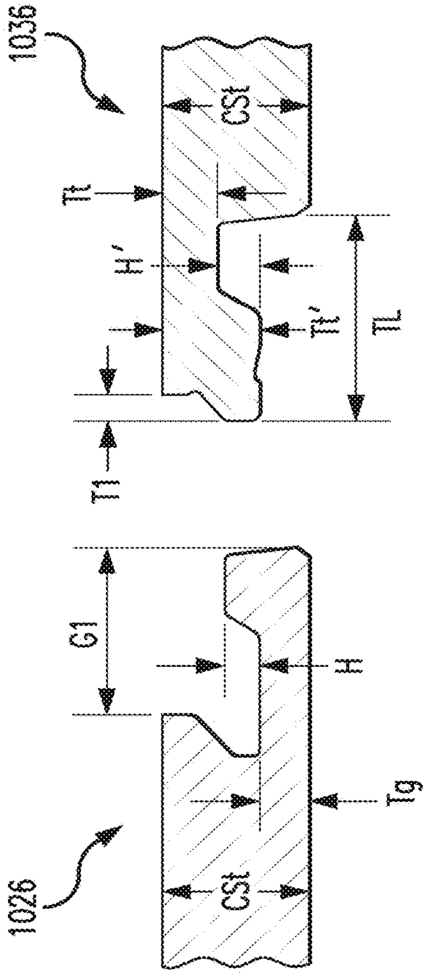
FIG. 28 is an enlarged cross-sectional view of adjacent tongued and grooved edges of adjacent planks prior to installation with other illustrative complementary profiles.

FIG. 28 shows a tongue profile 1036 and a groove profile 1026 of adjacent identical planks, similar to planks 10 and 10' such as shown in FIG. 22 with a different embodiment of the edge profiles and before engagement of the adjacent edges. In FIG. 28, the identified dimensions can have the following values: CSt=0.197 inch (5.0 mm), Tg=0.066 in., H=0.048 in., G1=0.243 in., Tt=0.074 in., Tt'=0.131 in., Tg/Tt'=0.50, H'=0.057 in., TL=0.301 in., TL/CSt=1.53, and T1=0.040 in. FIG. 29 shows the tongue profile 1036 and groove profile 1026 of adjacent identical planks in a mechanically interlocked position.

Figure 30:
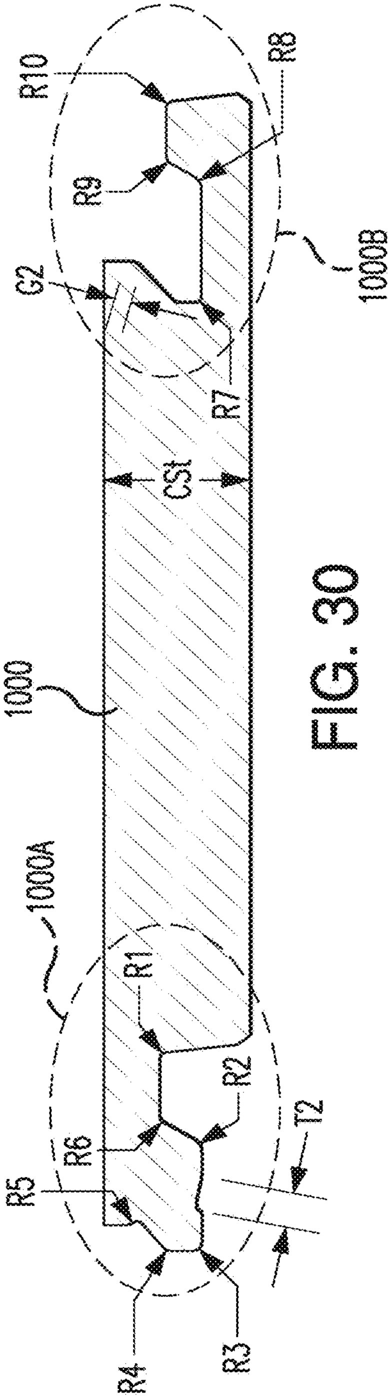
FIG. 30 is an enlarged cross-sectional view of a plank having tongued and grooved edges with other illustrative complementary profiles.
Figure 31:
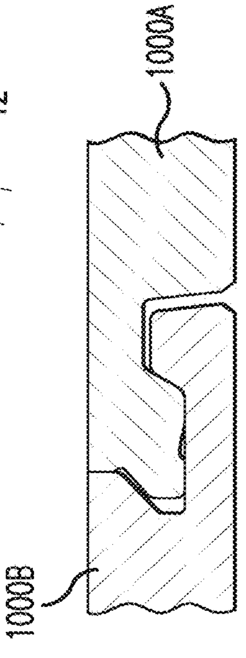
FIG. 31 is an enlarged cross-sectional side view through the edge portions of connected planks of FIG. 30 according to various options of the present invention.

FIG. 30 shows a present plank 1000 having an opposite tongue profile 1000A and groove profile 1000B. In FIG. 30, the identified dimensions can have the following values: CSt=0.197 inch (5.0 mm), T2=0.044 in., R1=0.010 in., R2=0.030 in., R3=0.018 in., R4=0.010 in., R5=0.010 in., R6=0.010 in., G2=0.015 in., R7=0.006 in., R8=0.021 in., R9=0.010 in., and R10=0.010 in. FIG. 31 shows a tongue profile 1000A and groove profile 1000B of adjacent identical planks 1000 in a mechanically interlocked position.

Figure 32:
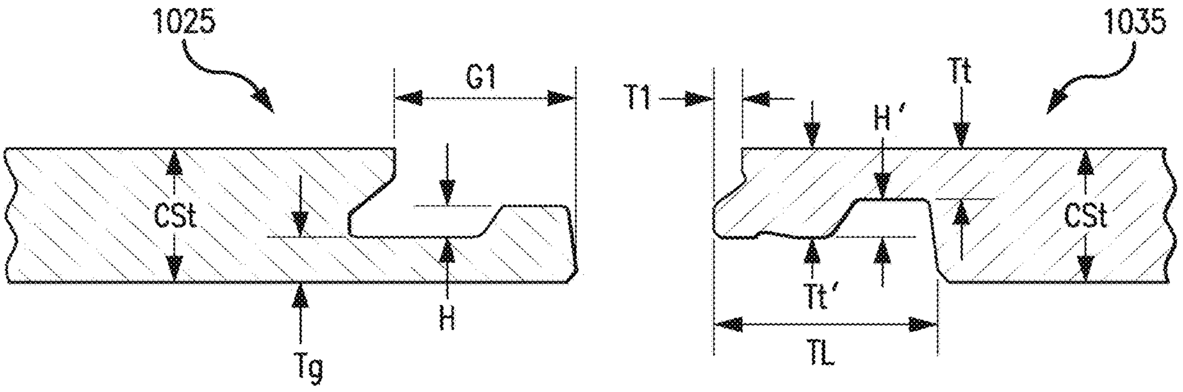
FIG. 32 is an enlarged cross-sectional view of adjacent tongued and grooved edges of adjacent planks prior to installation with other illustrative complementary profiles.
Figure 33:
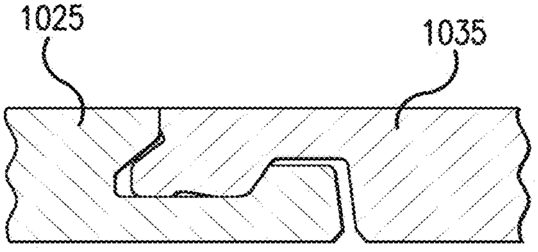
FIG. 33 is an enlarged cross-sectional side view through the edge portions of connected planks of FIG. 32 according to various options of the present invention.

FIG. 32 shows a tongue profile 1035 and a groove profile 1025 of adjacent identical planks, similar to planks 10 and 10' such as shown in FIG. 22 with a different embodiment of the edge profiles and before engagement of the adjacent edges. In FIG. 32, the identified dimensions can have the following values: CSt=0.197 inch (5.0 mm), Tg=0.066 in., H=0.131 in., G1=0.243 in., Tt=0.074 in., Tt'=0.131, Tg/Tt'=0.50, H'=0.057 in., TL=0.301 in., TL/CSt=1.53, and T1=0.040 in. FIG. 33 shows the tongue profile 1035 and groove profile 1025 of adjacent identical planks in a mechanically interlocked position.

Figure 34:
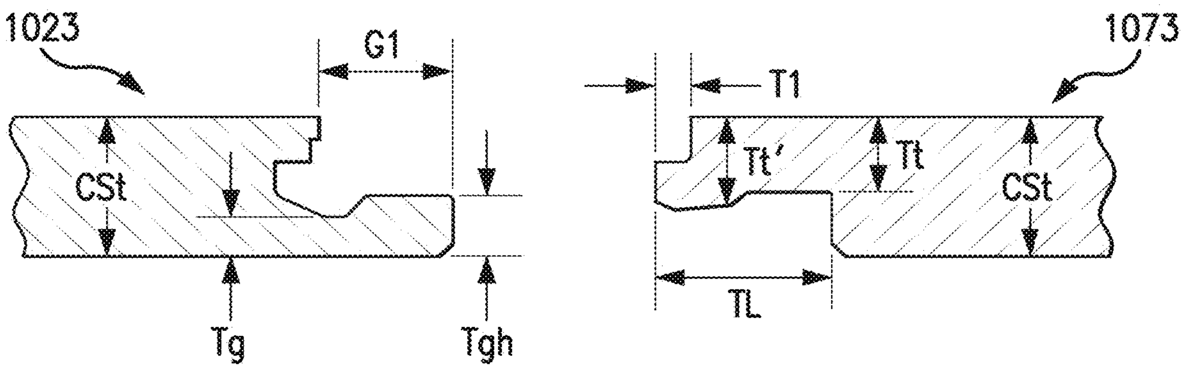
FIGS. 34 and 36 are enlarged cross-sectional views of adjacent tongued and grooved edges of adjacent planks prior to installation with other illustrative complementary profiles.
Figure 35:
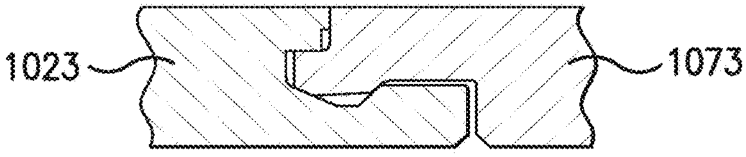
FIG. 35 is an enlarged cross-sectional side view through the edge portions of connected planks of FIG. 34 according to various options of the present invention.

FIG. 34 shows a tongue profile 1073 and a groove profile 1023 of adjacent identical planks, similar to planks 10 and 10' such as shown in FIG. 22 with a different embodiment of the edge profiles and before engagement of the adjacent edges. In FIG. 34, the identified dimensions can have the following values: CSt=0.197 inch (5.0 mm), Tg=0.055 in., Tgh=0.086 in., H (Tgh-Tg)=0.031 in., Tt=0.105 in., Tt'=0.123, Tg/Tt'=0.45, TL=0.222 in., TL/CSt=1.13, G1=0.167 in., and T1=0.044 in. FIG. 35 shows the tongue profile 1073 and groove profile 1023 of adjacent identical planks in a mechanically interlocked position.

Figure 36:
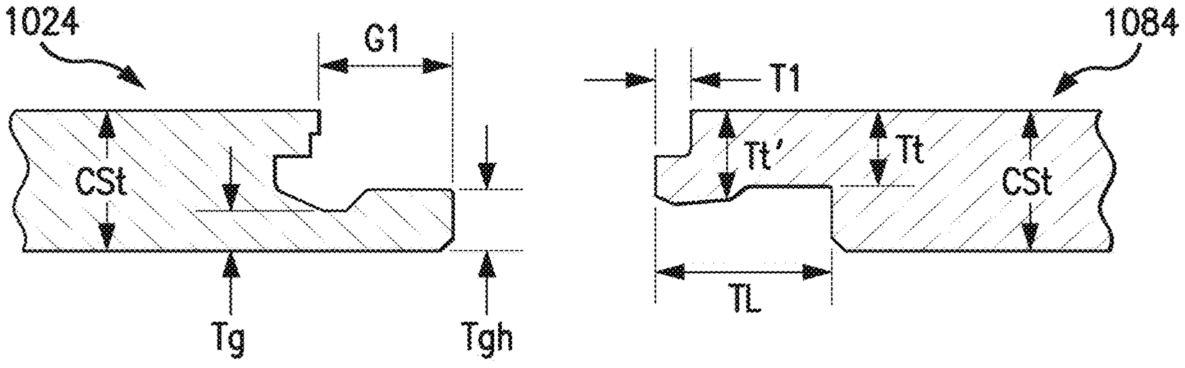

FIG. 36 shows a tongue profile 1084 and a groove profile 1024 of adjacent identical planks, similar to planks 10 and 10' such as shown in FIG. 22 with a different embodiment of the edge profiles and before engagement of the adjacent edges. In FIG. 36, the identified dimensions can have the following values: CSt=0.177 inch (4.5 mm), Tg=0.049 in., Tgh=0.077 in., H (Tgh-Tg)=0.028 in., Tt=0.094 in., Tt'=0.111, Tg/Tt'=0.44, TL=0.200 in., TL/CSt=1.13, G1=0.150 in., and T1=0.040 in.

Figure 37:
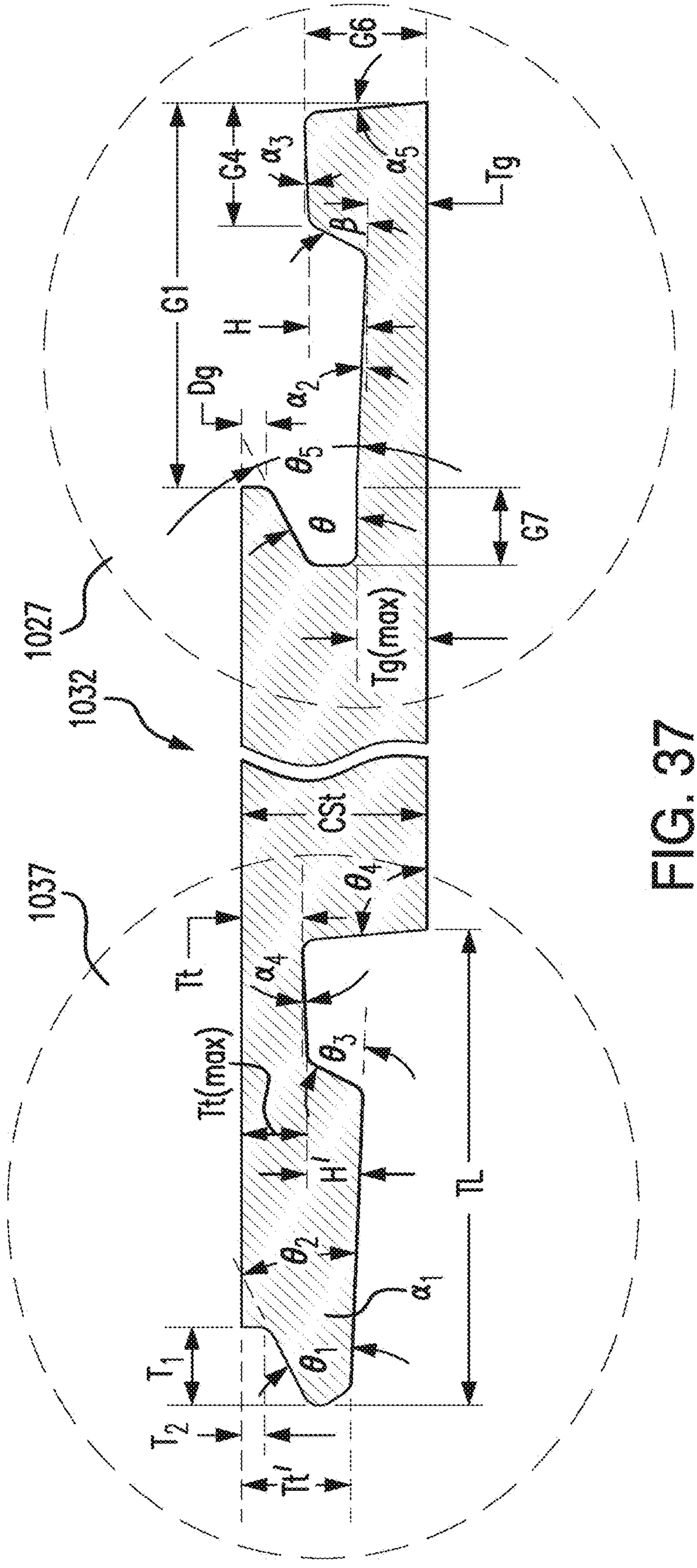
FIG. 37 is an enlarged cross-sectional view of a plank having tongued and grooved edges with other illustrative complementary profiles.
Figure 38:
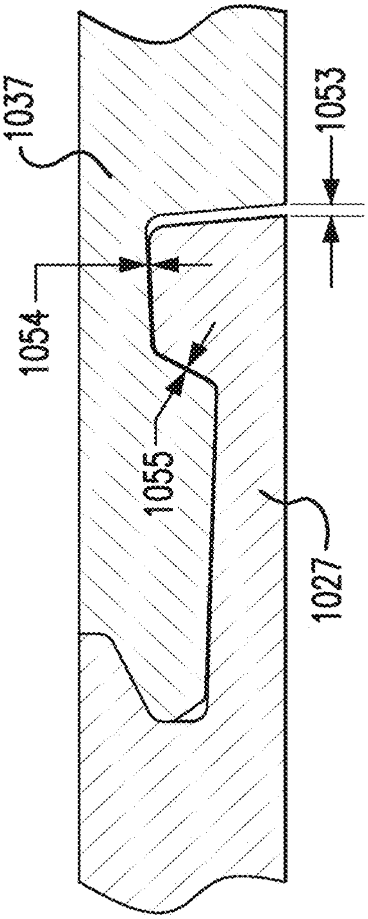
FIG. 38 is an enlarged cross-sectional side view through the edge portions of connected planks of FIG. 37, according to various options of the present invention.

FIG. 37 shows a present plank 1032 having an opposite tongue profile 1037 and groove profile 1027 for a VCT plank 10 with a different edge profile and before engagement of the adjacent edges of similar planks having these opposite edge profiles. In FIG. 37, the identified dimensions can have the following values: CSt=0.122 inch (3.1 mm), Tg=0.041 in., Tg(maximum)=0.048 in., H=0.037 in., Dg=0.015 in., angle $\theta$=28°, $\theta_5$=30.29°, angle $\alpha_2$=2.29°, angle $\alpha_3$=2.00°, angle $\alpha_5$=5.00°, angle $\beta$=63.10°, G1=0.274 in., G4=0.085 in., G6=0.080 in., G7=0.052 in., H=0.037 in., Tt=0.040 in., Tt'=0.073 in., Tg/Tt'=0.56, H'=0.037 in., TL=0.337 in., TL/CSt=2.76, T1=0.055 in., T2=0.015 in., Tt (max)=0.042 in., $\alpha_4$=2.00°, $\alpha_1$=2.00°, angle $\theta_1$=27.59°, angle $\theta_2$=25.59°, angle $\theta_3$=62.00°, and angle $\theta_4$=95.00°. FIG. 38 shows the tongue profile 1037 and groove profile 1027 of adjacent identical planks 1032 such as illustrated in FIG. 37 in a mechanically interlocked position. The gaps 1053, 1054, and 1055 are 0.008 in., 0.002 in., and 0.0001 in., respectively, in this illustration.

Any one or more of these dimensional and angular measurements, herein or in the figures, such as illustrated in FIGS. 24-38 can be (or vary) ±20%, ±15%, ±10%, ±5%, ±3%, ±2%, ±1%, ±0.5%, ±0.1%, from one or more of these particular measurements.

The various planks designs illustrated in FIGS. 10-36, for example, can be implemented in resilient composite structures, such as LVT, or other resilient composite structures. In one example, the planks of FIGS. 37-38 can be used in VCT composite structures, or other resilient structures.

In the present planks comprising composite sheets, such as illustrated in FIGS. 37 and 38, where the plank can be a VCT-based construction, or other construction, at least one, or two or more, or three or more, or all four of the following conditions (1), (2), (3), and (4) can be met in the plank design:

(1) the ratio of the tongue length TL to the composite sheet overall thickness (CSt) can be, for example, at least about 2.0, or at least about 2.5, or at least about 2.8, or from about 2.0 to about 4.0, or from about 2.0 to about 3.5, or from about 2.7 to about 3.2;

(2) Tg and Tt can be, for example, within ±5%, or within ±4%, or within ±3%, or within ±2%, or within ±1%, or within ±0.5%, of each other;

(3) H and H' can be, for example, within ±5%, or within ±4%, or within ±3%, or within ±2%, or within ±1%, or within ±0.5%, of each other;

(4) Tg/Tt' can be, for example, from about 0.35 to about 0.62, or from about 0.38 to about 0.50, or from about 0.42 to about 0.48.

Figure 39:
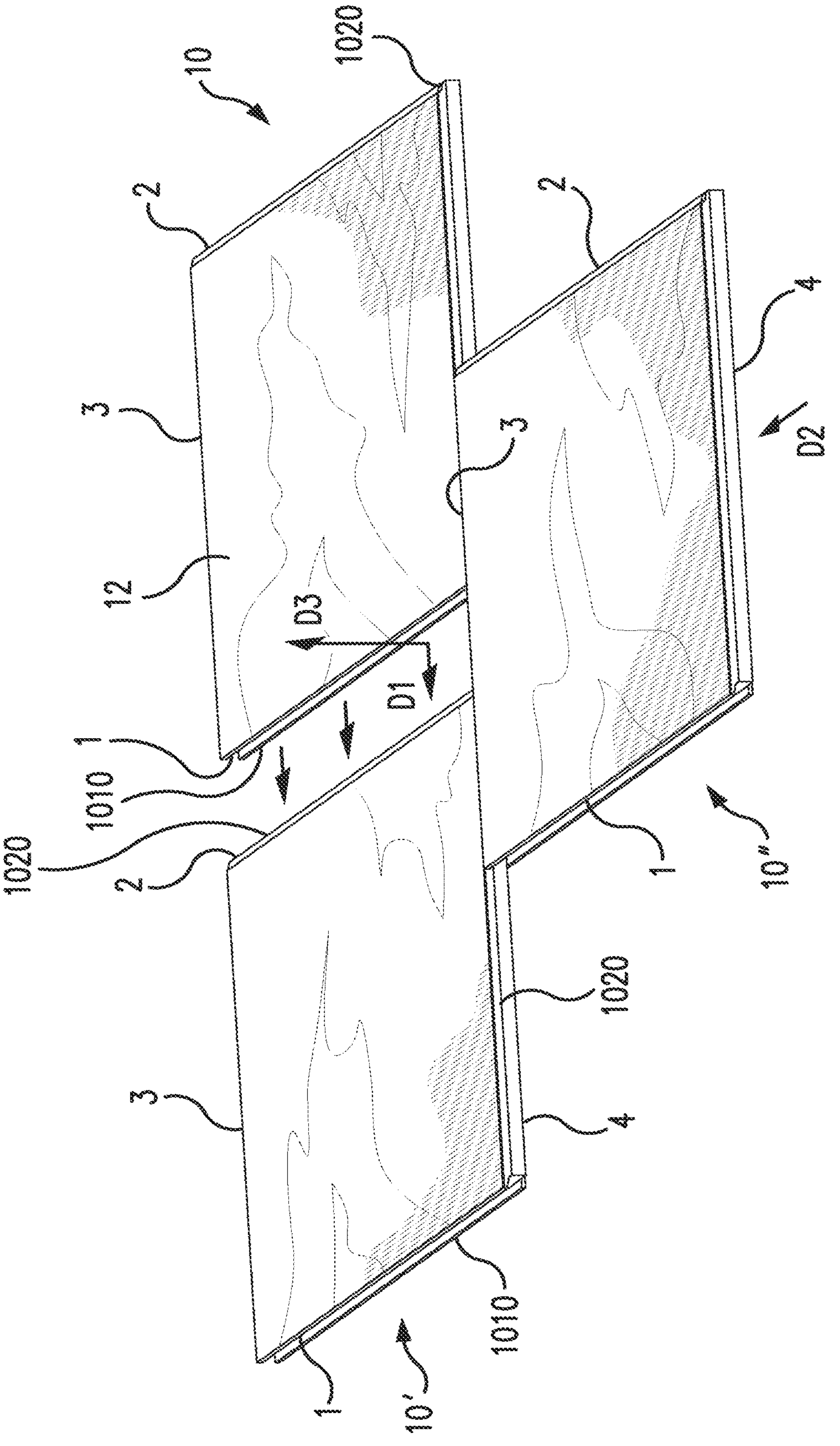
FIG. 39 is a perspective view of a surface covering system according to various options of the present invention.

In FIG. 39, an exemplary surface covering system according to the present invention is illustrated with three planks 10, 10', and 10" that can be joined to one another along their ends and edges to form a surface covering system, for example, a flooring system. Planks 10, 10', and 10" can have edge profiles such as illustrated in any of the preceding figures, although they are not limited thereto. Three planks are merely shown for sake of simplifying the illustration, as the process can be repeated to assemble additional planks together. Each of planks 10, 10', and 10" can have the same rectangular shape with similar opposing tongued and grooved sides 1, 2, 3, and 4. Sides 1-4 can have tongue and groove profiles as indicated herein. The tongue 1010 can extend substantially the entire longitudinal sides 3 and 4 of the planks, such as at least 90%, or at least 95%, or at least 97%, of each entire longitudinal side. The groove 1020 can extend substantially the entire width of sides 1 and 2 of the planks, such as at least 90%, or at least 95%, or at least 97%, of each entire width side.

As illustrated, the planks, as mentioned above, can have tongues and grooves having a complimentary shape to each other so as to be interlockingly engageable with corresponding grooves and tongues on an adjacent floor plank(s). Interlockingly engageable can be a mechanical interlock between adjacent floor planks, such as to prevent horizontal movement of the floor plank in two directions that are perpendicular to each other and wherein the two directions are parallel to the plane of the upper surface of the floor plank. This can be shown, for instance, in FIG. 39. In FIG. 39, an example of horizontal movement of the floor planks in two directions that are perpendicular to each other would be the directions indicated as "D1" and "D2" in FIG. 39, which are two directions that are perpendicular to each other and these directions are parallel to the plane of the upper joined surfaces of the three planks shown. The direction "D3" is simply shown to represent the vertical surface, which would be perpendicular to the directions "D1" and "D2". The planks 10, 10', and 10", when mechanically interlocked at the tongue and grooved edges thereof, resist disengagement or displacement from each other in the horizontal directions D1 and D2, and the vertical direction D3, especially under normal use conditions. Nonetheless, the interfitted planks can be disassembled, if desired.

As an option, each groove of the planks can define a surface area and each tongue can define a surface area, wherein these groove and tongue surface areas are the same or nearly the same, such as, for example, within +/−5%, or within +/−1%, or within +/−0.5%, or within +/−0.1% of each other. In the alternative, the groove can have a surface area that is larger than the surface area defined by the tongue. For instance, the surface area defined by the groove can be, for example, from 1% to 10% larger than the surface area defined by the tongue or it can be from 1% to 5% larger than the surface area defined by the tongue. When the groove has a larger surface area than the tongue, this permits forgiveness when the tongue is interlocked into the groove, since it will not require an exact alignment in order for the projection to fit into the recess, which makes the installation much easier. Thus, this larger surface area of the groove, compared to the tongue, is not only related to machine tolerance, but can also be optionally related to simply building an additional tolerance just for ease of installation. Even with this slightly larger surface area in the groove compared to the tongue, a relatively tight fit can be achieved to prevent horizontal movement of the floor plank as described above and provide a mechanical locking of the floor planks when connected together.

Also, in rectangular planks, as long as at least one pair of side edges of a plank includes one or more of conditions (a)-(d) and/or other characteristics mentioned herein, such as the shorter sides or longer sides, the other pair of side edges can also meet this condition or have other geometrical shapes that would permit the floor planks to be interlocking at those edges to form a mechanical interlock and, preferably, to prevent horizontal movement of the floor plank in two directions that are perpendicular to each other, wherein the two directions are parallel to the plane of the upper surface of the floor plank as explained previously and as shown in FIG. 39. Examples of floor panel designs, shapes, and the like that can be used herein in this respect for a pair of edges include, but are not limited to, the floor panels described in U.S. Pat. Application. No. 2009/0223162 and publications listed therein in this respect, and all are incorporated in their entirety by reference herein. Also, as an option, a pair of edges of the plank other than those having at least one of indicated conditions (a)-(d) and/or other characteristics mentioned herein, or particularly the indicated conditions (i)-(iv) or (1)-(4), can be straight or bevel. The edges can be tapered or beveled so that when two cores are brought together for attachment, a valley or V-shaped valley is formed. The tapered or beveled edges can be at an angle of from about 5° to about 55°, and, more preferably, at about a 15°-45° angle. Also, the length of the beveled or tapered edge can be from about 1.0 mm to about 7.0 mm on each core piece. As another option, a separate spline or snap connector can be used as a separate piece when a groove is present on two, opposite sides or edges of the plank. The snap or tongue piece can be inserted into one groove and is long enough to extend outside the groove and fit into a respective groove of another plank in order to connect the two pieces together. As also indicated, both the shorter and longer sides of the plank can have tongue and groove profiles that meet one or more of indicated conditions (a)-(d). Although illustrated herein as rectangular shaped, the dimensions of the plank can practically be any shape (e.g., square, rectangle, curved, and the like) or size as long as such material can be formed as one piece or multiple pieces.

Figure 40:
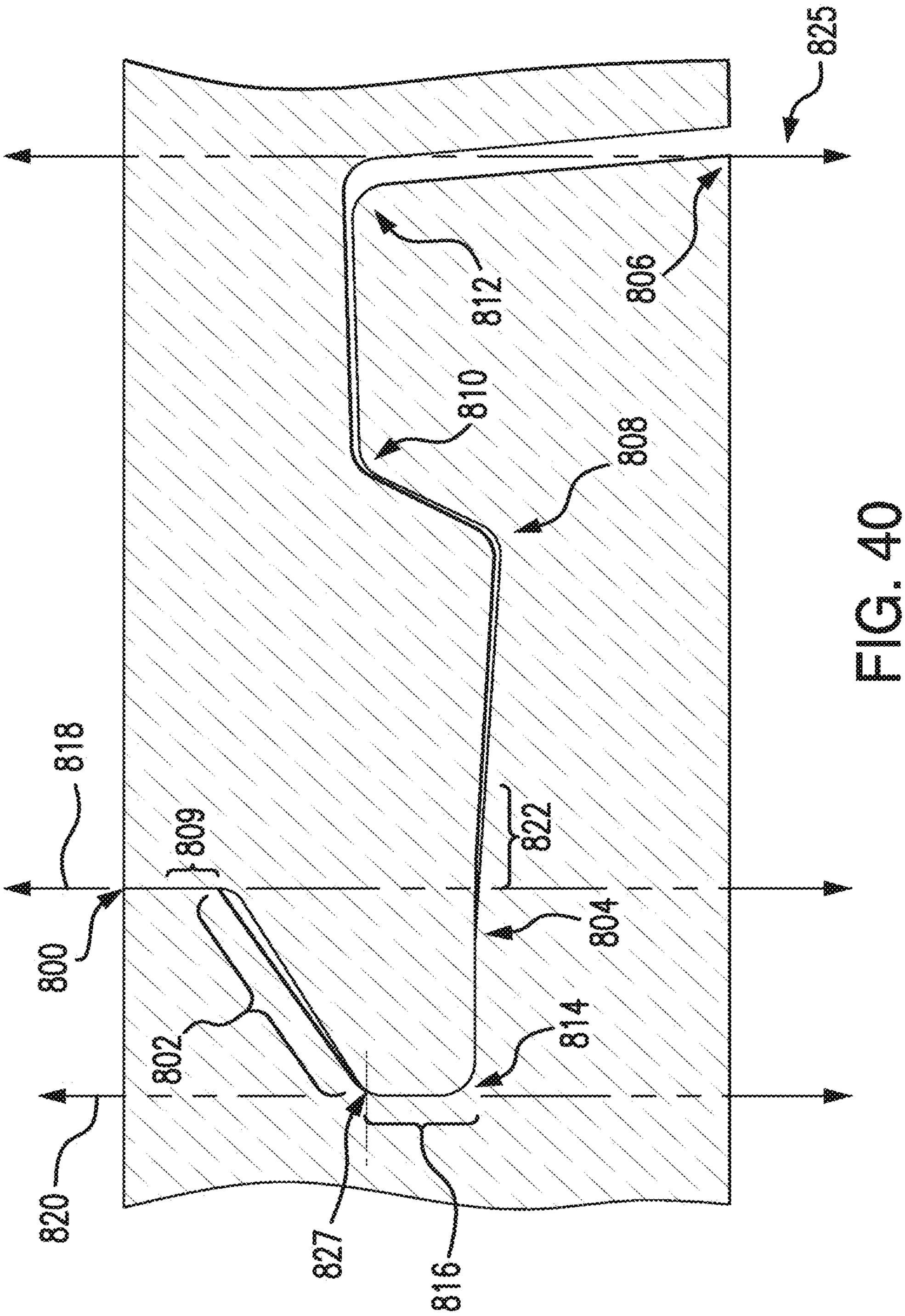
FIGS. 40-60 are enlarged cross-sectional side views of tongue and/or groove profiles of the present invention.

In the present invention, any of the tongue/groove profiles can have none or one or more clearance areas when the tongue of one panel is joined to the groove of an adjoining panel. FIG. 40 is an enlarged, blown-up view of a tongue inserted into a corresponding groove in one design of the present application. It is to be understood that for purposes of the present invention, FIG. 40 is simply one example of the clearances that may exist in the tongue/groove profiles of the present invention and, further, it is to be understood that the other tongue/groove profiles not shown in FIG. 40 can have similar, if not the same, or different clearance locations. In more detail and referring to FIG. 40, FIG. 40 shows two clearances, one is at the groove deck/tongue tip area identified as area 802 in FIG. 40. The clearance can be limited to this particular vicinity of 802 or can be shorter in distance or longer in distance. The particular clearance area 802 can encompass the entire or almost the entire top surface of the tongue (essentially area 802). The clearance can be where the tongue top upper surface slants and can begin at approximately the vertical plane that is perpendicular to the horizontal floor surface, identified as line 818, and/or end at the outer most edge of the tongue (e.g., where lines 820 and 827 intersect). As can be seen, the beginning of the region identified as 802 begins at the line 818, which signifies the vertical line of the joint seam at point 800 and ends at or prior to the line 820, which is an imaginary line that is a vertical line perpendicular to the floor surface. The clearance identified by area 802 can be non-uniform with respect to the spacing of the clearance from line 818 to line 820. The clearance can be larger closer to line 818 as opposed to line 820. A clearance can also be present or only be present beginning at point 804 and ending at point 806 as shown in FIG. 40. This clearance shown at point 804 to point 806 can be one continuous clearance or it can be an intermittent clearance, wherein the tongue optionally contacts the groove at one or more points between 804 and 806. For instance, there can be, as an option, a contact point between the tongue and groove at point 808 or in that general vicinity, and/or it can have a contact point at point 810 or in that general vicinity, and/or it can have a contact point at point 812 or in that general vicinity, and/or it can have a contact point between point 812 and 806. The ending of the clearance at point 804 can be extended to be closer to point 814, such as beginning at point 814 or at any location between 814 and 804. In addition, in the tongue and groove profile shown in FIG. 40, the beginning of the clearance 804 occurs at a point left of line 818 representing the joint seam vertical plane. As an option, the clearance can begin at exactly line 818 or begin at a point to the right of line 818, for instance, at a point signified by the area 822. As an option, there can be one or more clearances in the area identified as 816 and/or in the area identified as 809.

Figure 41:
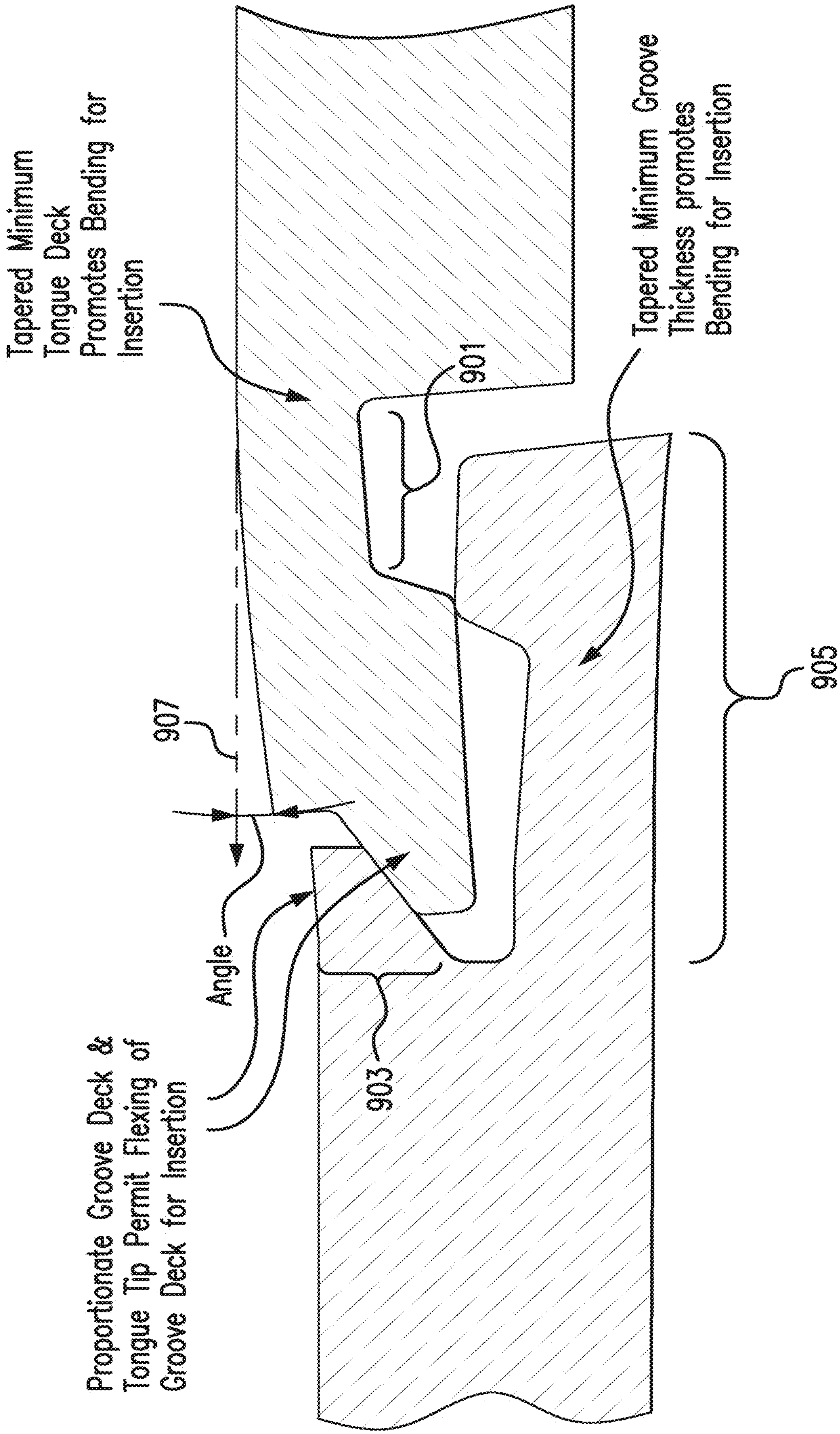
Figure 42:
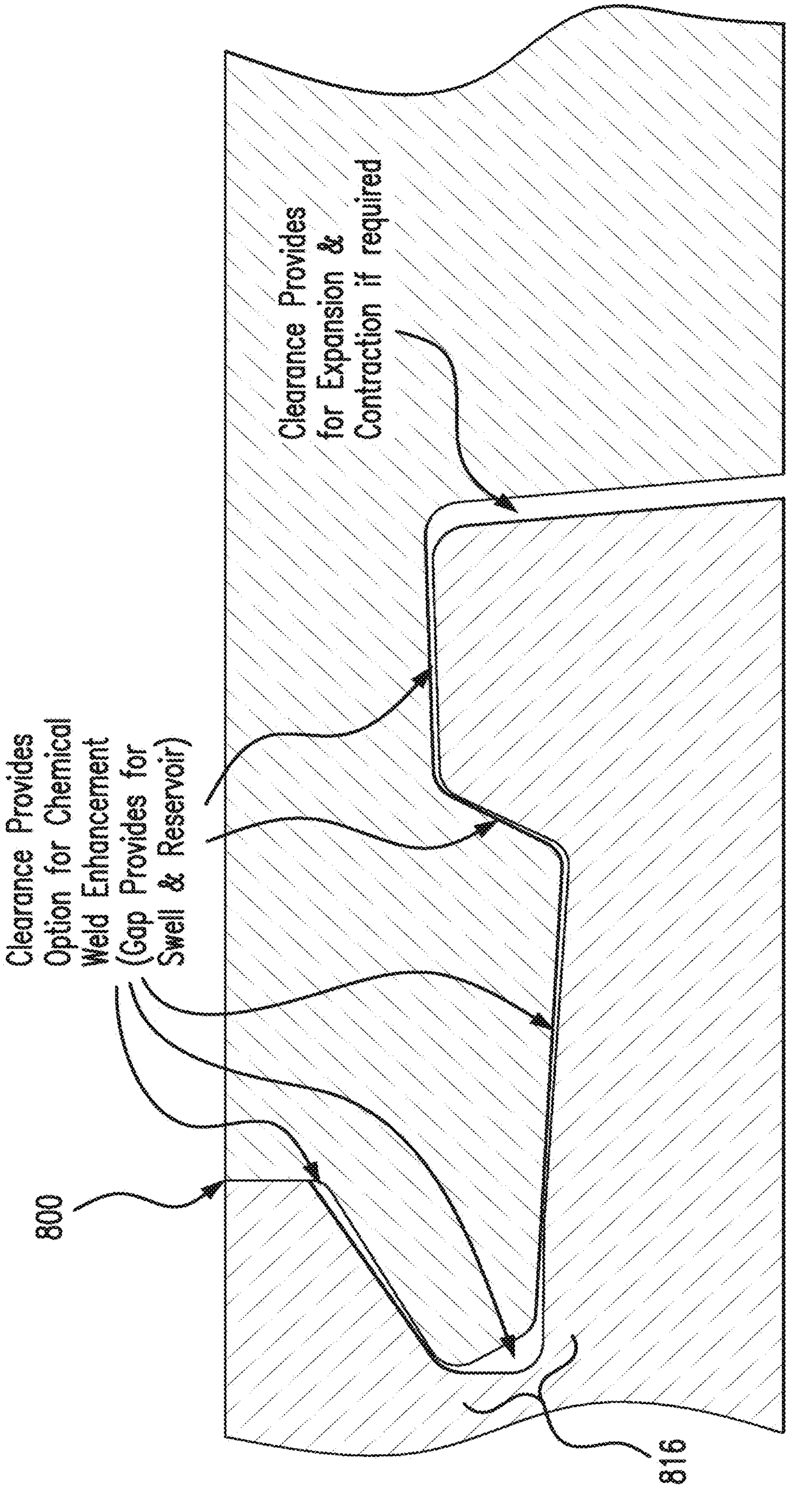
Figure 46:
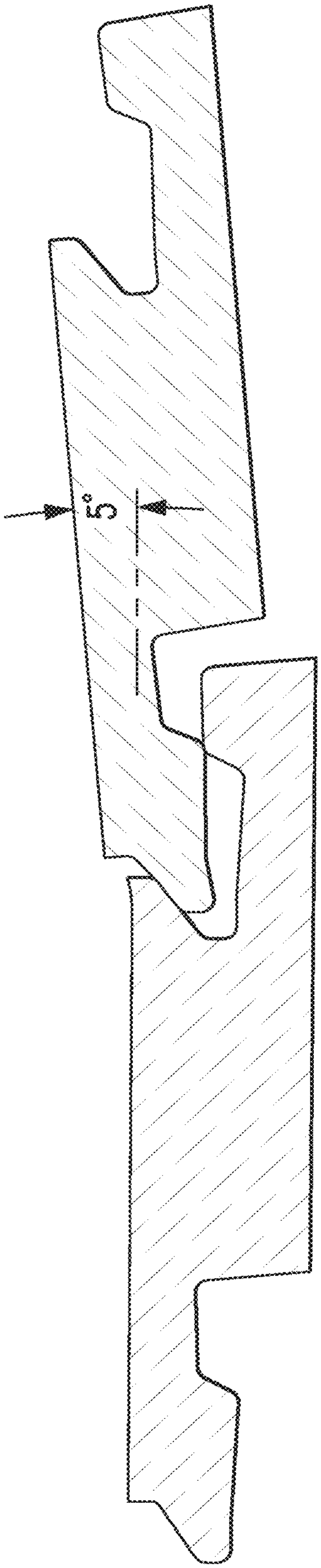

With the present invention, various parts of the tongue and/or groove are flexible to permit, as an option, easier insertion of the tongue into the groove or groove into the tongue. As shown, for instance, in FIG. 41, the groove deck identified by the region 903 can flex in order to easily promote the insertion of the tongue tip into the groove opening. As shown in FIG. 41, the groove deck can flex such that a portion of the groove deck will not be parallel with the remaining planar surface of the floor panel. Put another way, the groove deck will flex upward and is resilient enough to be restored to its normal original position after the tongue reaches its final location in the opening of the groove. As an option, the tongue can also flex, for instance, in the region 901, wherein due to this flexibility, the overall tongue can flex downwardly during insertion into the groove opening. As an option, during insertion of the tongue into the groove or groove into the tongue, the lower part of the groove identified by the region 905 in FIG. 41 can flex downwardly during insertion of the tongue into the groove and vice versa. Any one or more of these flexible points can be present in the panels of the present invention. As shown in FIG. 41, the degree of flexibility for any one of these regions 903, 901, and/or 905 can be from 1° to 15°, such as from 2° to 10°, or from 3° to 8°, or from 4° to 7°, or even higher than 15° of flexibility during insertion of the tongue into the groove or groove into the tongue, wherein these degrees are based on the number of degrees angled away from the normal horizontal surface, for instance, as shown in FIG. 41 with respect to line 907 and the angle shown between line 907 and the bending tongue surface. This same manner of calculating the degree of bending can be used for each of the flexing locations shown in FIG. 41. Preferably, the tongue and groove of the present invention has all three flexibility regions identified in FIG. 41, but can have two of the three or one of the three or none of the three flexing locations, wherein this can be controlled based on the thicknesses of the groove deck area, the area identified by 901 and/or area 905, as well as the material used to form the tongue and groove with respect to the type of thermoplastic used and/or amount of plasticizer present and/or the amount of overall thickness of the floor panel. As a further example, FIG. 46 of the present application shows a 5° flexing of the tongue as it is inserted into the groove opening. As indicated, this percent angle can vary based on the ranges set forth above.

Figure 43:
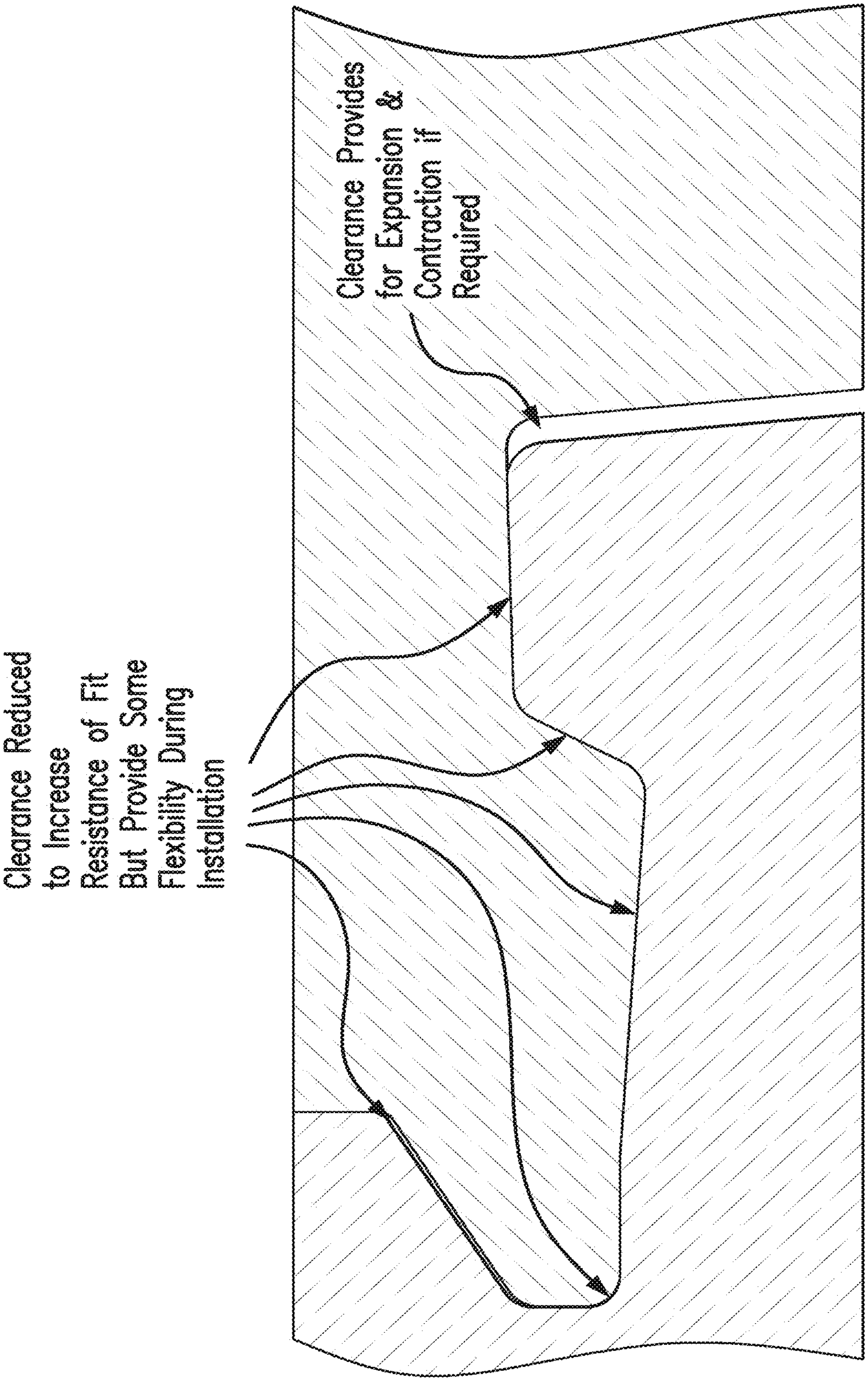
Figure 44:
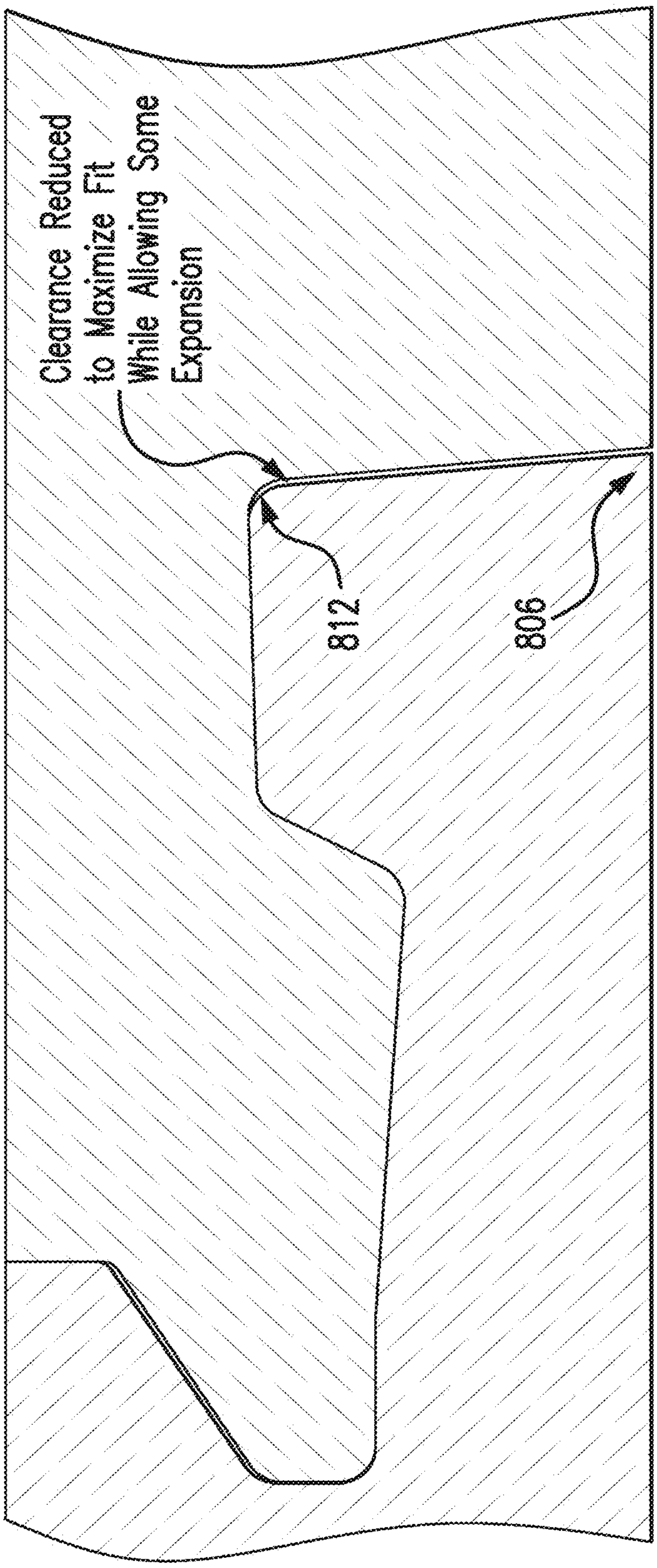
Figure 45:
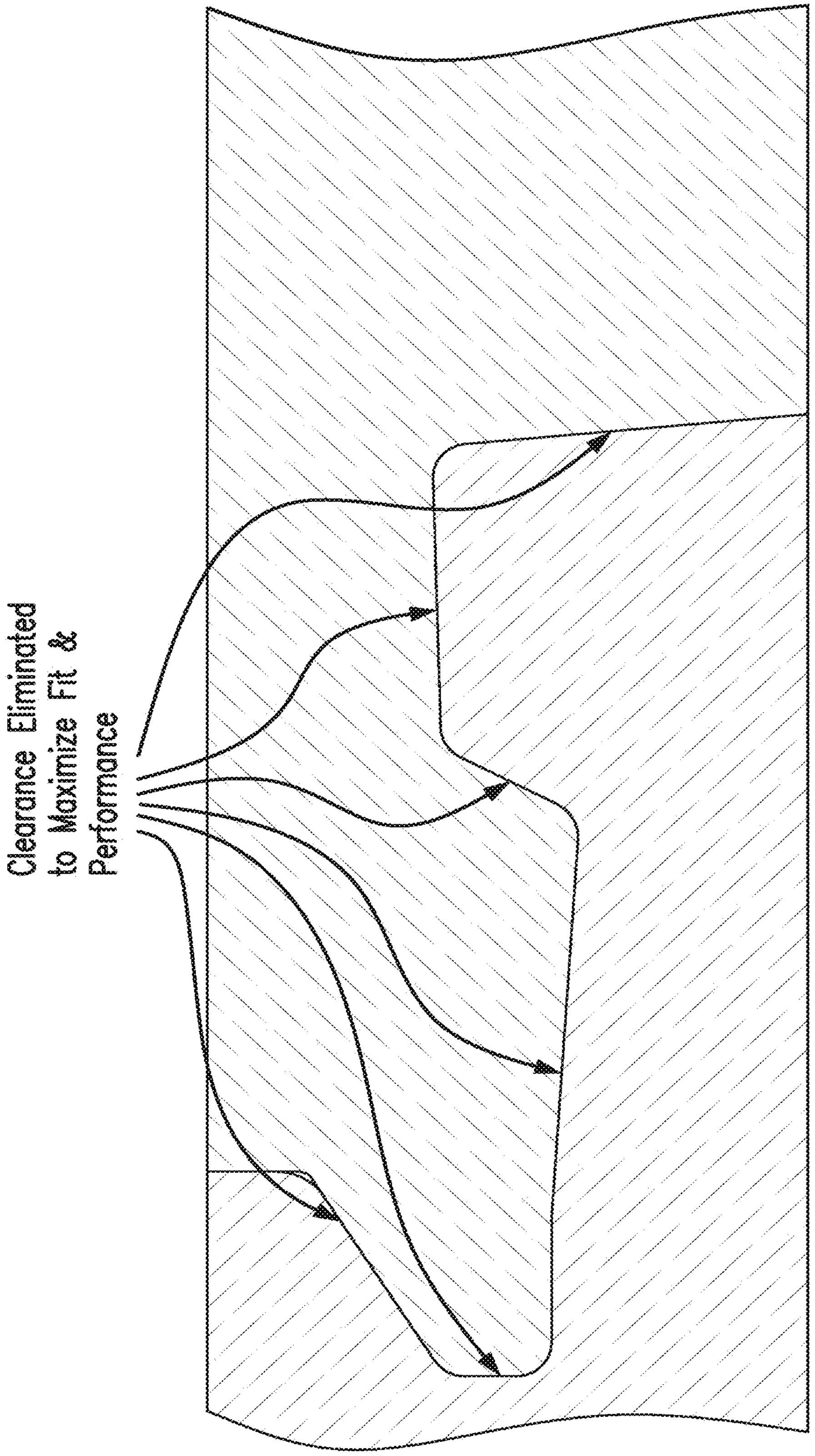

FIGS. 42-45 show various options with respect to the location of clearances and the degree of clearance. Particularly, FIG. 42, as an example, shows large clearance areas that can be continuous and can include an opening in the area of 816, which is the tip of the tongue profile. FIG. 43 shows an option of narrowing the clearances throughout the tongue and groove locations. FIG. 44 shows a further reduction of the clearances especially at the clearance between point 812 and point 806. FIG. 45 shows the ability to have no clearances between the tongue and groove when joined, and this is possible due to the ability of the tongue and/or groove to flex in one or more locations as shown in FIG. 41 and due to the fact that high tolerances can be achieved with respect to forming the groove and forming the tongue to precise dimensions.

Figure 47:
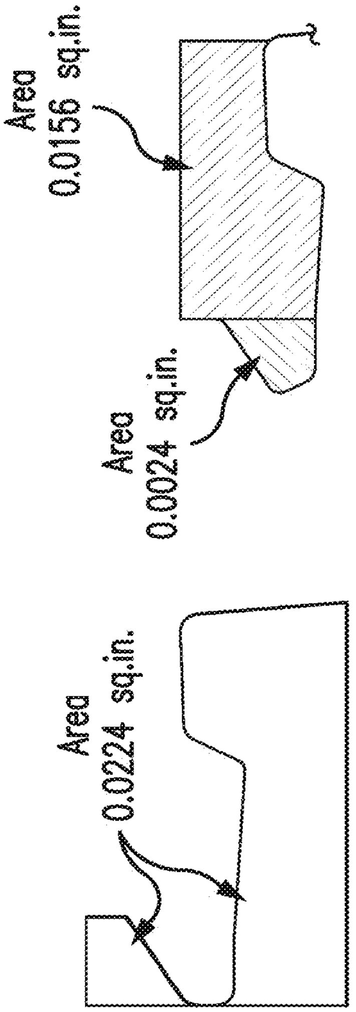

As another option, in the tongue/groove profiles of the present invention, the tongue tip area is identified as the portion of the tongue that extends distally beyond the joint seam (identified as line 818 in FIG. 40), (referring to FIG. 40, the tongue tip area would be the portion of the tongue left of line of 818 in FIG. 40). This tongue tip area, as an option in the present invention, can comprise from 8% to 20% of the cross-sectional area of the tongue profile, wherein it is understood that the entire tongue profile is the area from the edge of the outer tongue, for instance, shown in FIG. 40 as area 816 (or line 820), to where the tongue extending from the panel is aligned to the lower edge of the groove, for instance, shown in FIG. 40 as line 825. In the present invention, the tongue tip area, namely the area between line 820 and 818 in FIG. 40, comprises from 8% to 20%, or from about 10% to about 15%, or from about 10% to about 18% of the overall tongue cross-sectional area, which is the tongue cross-sectional area between line 820 and 825 in FIG. 40. Again, this is with respect to the cross-sectional area of the tongue. As an option, in the present invention, the groove deck is that portion of the groove located between lines 820 and 818 and above line 827 in FIG. 40. Essentially, line 827 in FIG. 40 signifies the point where the outer tip of the tongue and the groove in that location meet as, for instance, shown in FIG. 40. The cross-sectional area of the groove deck reflected by this area is within 15%, or within 10%, or within 5%, or within 4%, 3%, 2%, or within 1% of the cross-sectional area of the tongue tip area as previously defined. The fact that the groove deck cross-sectional area and the tongue tip cross-sectional area are about equal or within this percent difference is an important characteristic of various profiles of the present invention since this close relationship in cross-sectional area between the groove deck and tongue tip area permits sufficient joint strength between the tongue and groove once connected, especially with respect to resilient-type flooring, such as luxury vinyl tile. It must be remembered that when dealing with products like resilient flooring, which can have a small overall thickness and are made from materials which are not rigid, creates additional challenges to overcome. A mechanical locking floating resilient floor surface (which is not adhered to any sub-floor) having sufficient joint strength from the mechanical locks, cannot generally be achieved using the same tongue and groove strategy adapted by the laminate flooring designs using particle board or similar wood substrates. It is noted that in the designs set forth in U.S. Pat. No. 4,426,820, the groove deck area and the tongue tip area are not similar to each other with respect to cross-sectional area and, further, the tongue tip area is significantly smaller than the overall tongue cross-sectional area. Such designs would not have achieved sufficient joint strength, nor other advantages that are achieved with the present invention. FIG. 47 and FIG. 48 provide one example of the type of cross-sectional areas of the tongue tip area and groove deck area achieved with the present invention.

FIG. 49 shows another example of the tongue and groove profiles of the present invention. The various measurements shown with respect to FIG. 49 would have the same meaning as in FIGS. 10, 12, and 16.

In the present invention, the tongue and groove profiles of the present invention permit any order of connecting of adjoining planks. For instance, for discussion purposes, assuming a plank that has two short edges and two long edges, with the present invention, short ends can be attached first to an adjoining short edge plank and then the long edge can then be connected to an adjoining panel. As an option, the long edge of a panel can be attached to an adjoining long edge of a plank and then the short edge can be attached to a second adjoining panel. As an option, the groove can be inserted into the tongue or the tongue can be inserted into the groove. It is to be understood that this is a significant difference from many types of flooring, where the tongue profile must be inserted into a groove panel that has been previously mechanically connected. With the present invention, essentially any manner of insertion is possible. With the present invention, the tongue or groove can be inserted into an adjoining plank at an angle or can be laterally adjoined to an adjoining panel. In other words, the panel can be rested on the subfloor and pushed into an adjoining previously connected panel and connected in that manner without any angling of the plank during insertion. The angle of insertion can be any degree, such as from 0° to 10°, or 1° to 5°, and the like. Thus, the present invention permits an immense amount of flexibility with respect to the installation process since it does not matter whether the short edge is connected first, or whether the long edge is connected first, or whether the tongue is inserted into the groove, or vice versa. When installing panels, this permits an immense amount of ease with respect to installing panels since there are times when it would make installation much easier if the groove of one panel could be inserted into a tongue section of a previously-installed panel.

As an option, there is no pre-tension of the tongue or groove once the tongue and groove are connected together in a locked position. Pre-tension can exist as an option. As an option, there is no play between the tongue and groove once the tongue and groove are connected together in a locked position. The connected tongue and groove can have play as an option.

FIG. 50 is an example of various dimensions of the tongue and groove profiles, as well as an example of the fit that occurs when the tongue is locked into the groove. In this example, there are two clearances that are occurring, one in location 901 and one in location 902.

Figure 51:
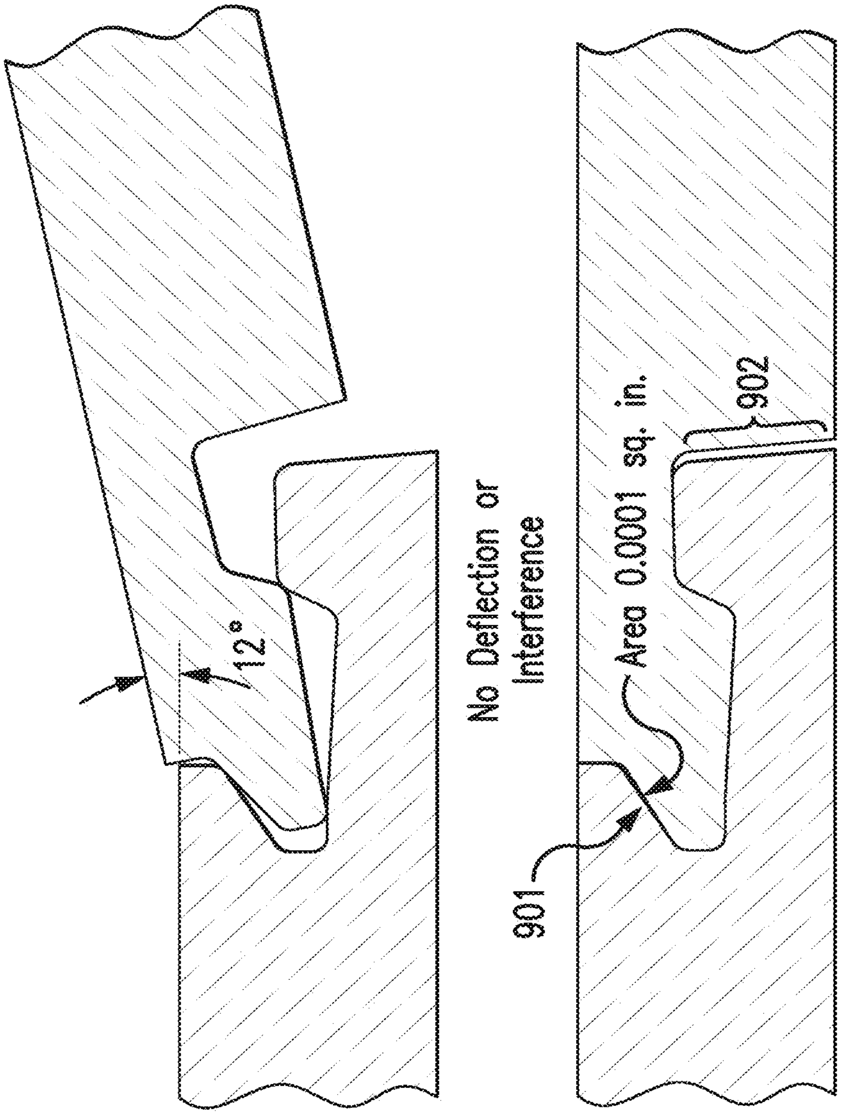
Figure 52:
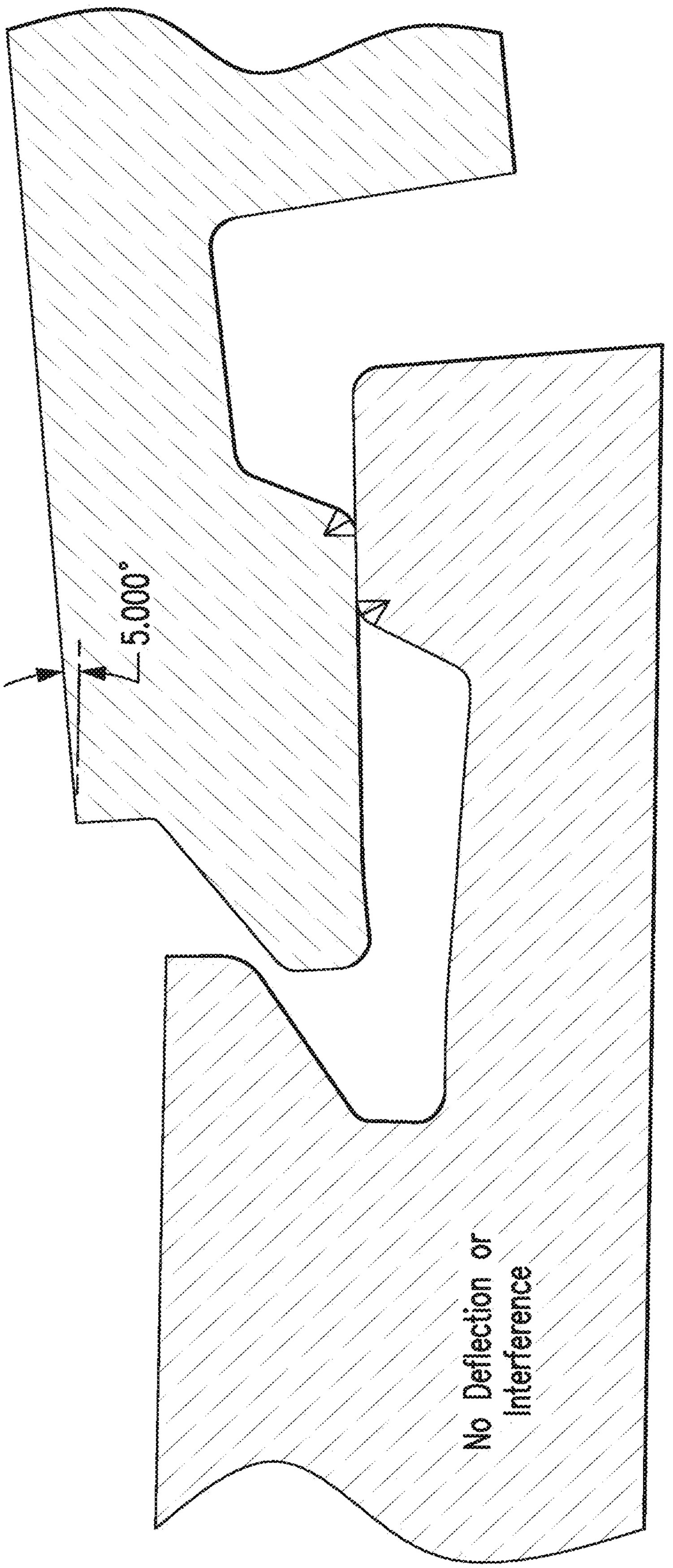
Figure 53:
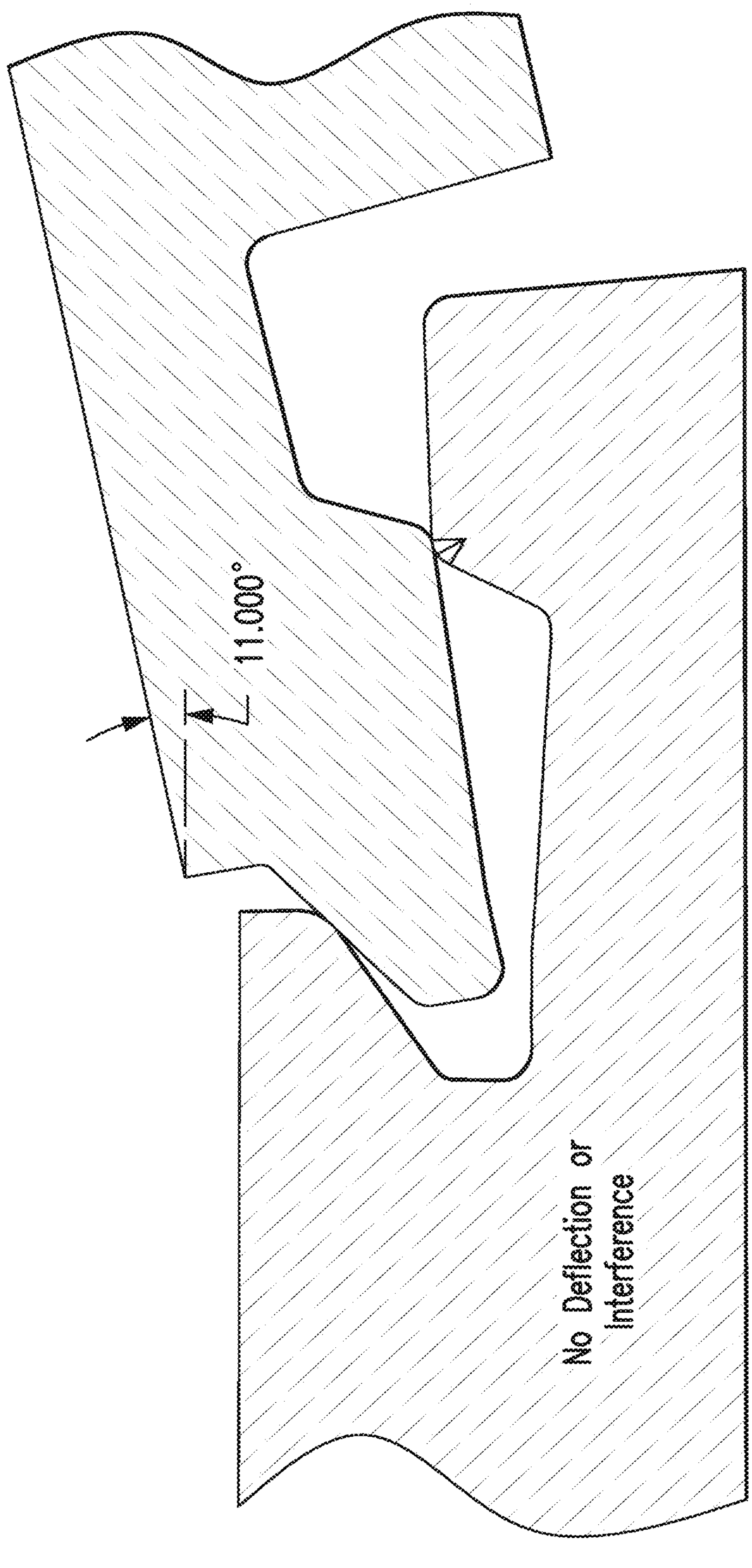
Figure 54:
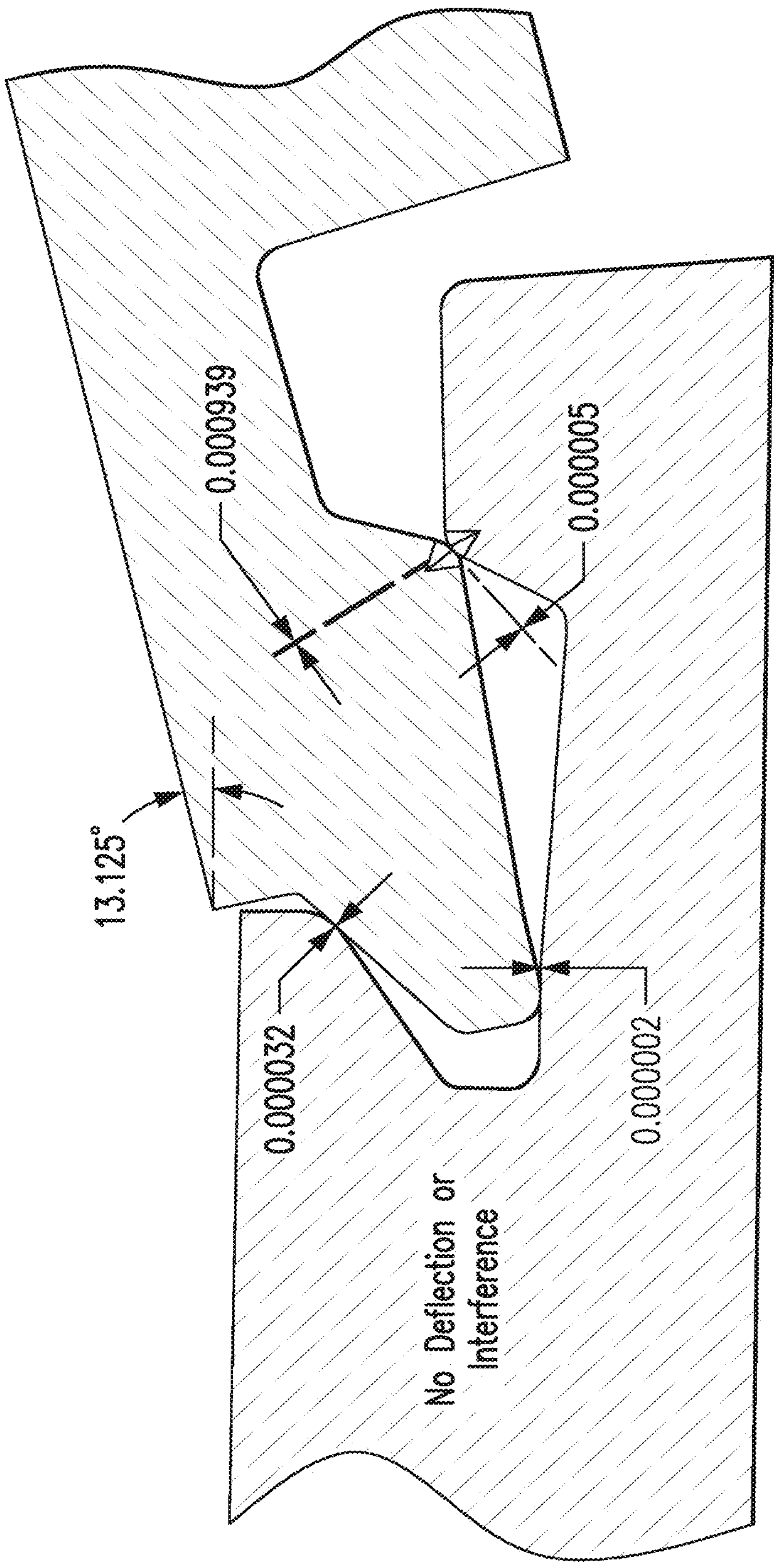
Figure 55:
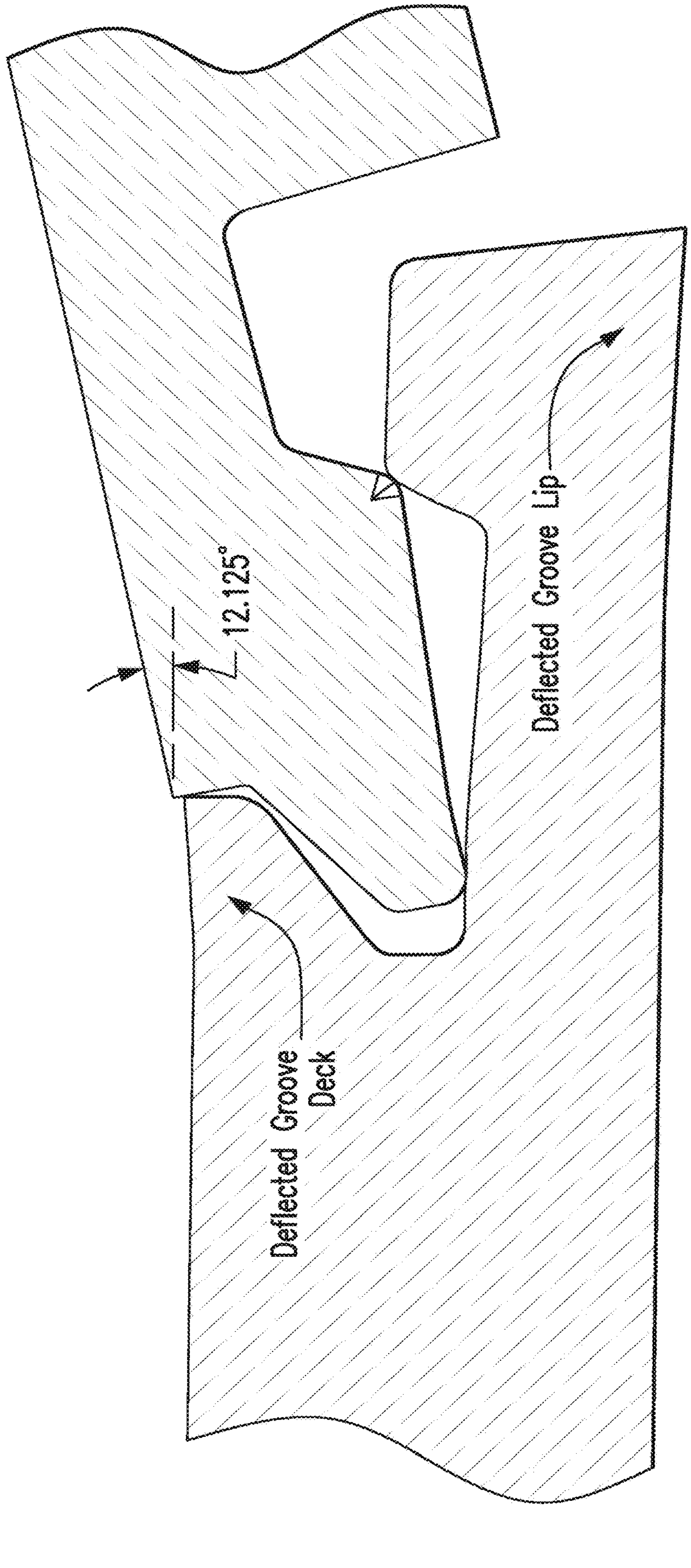
Figure 56:
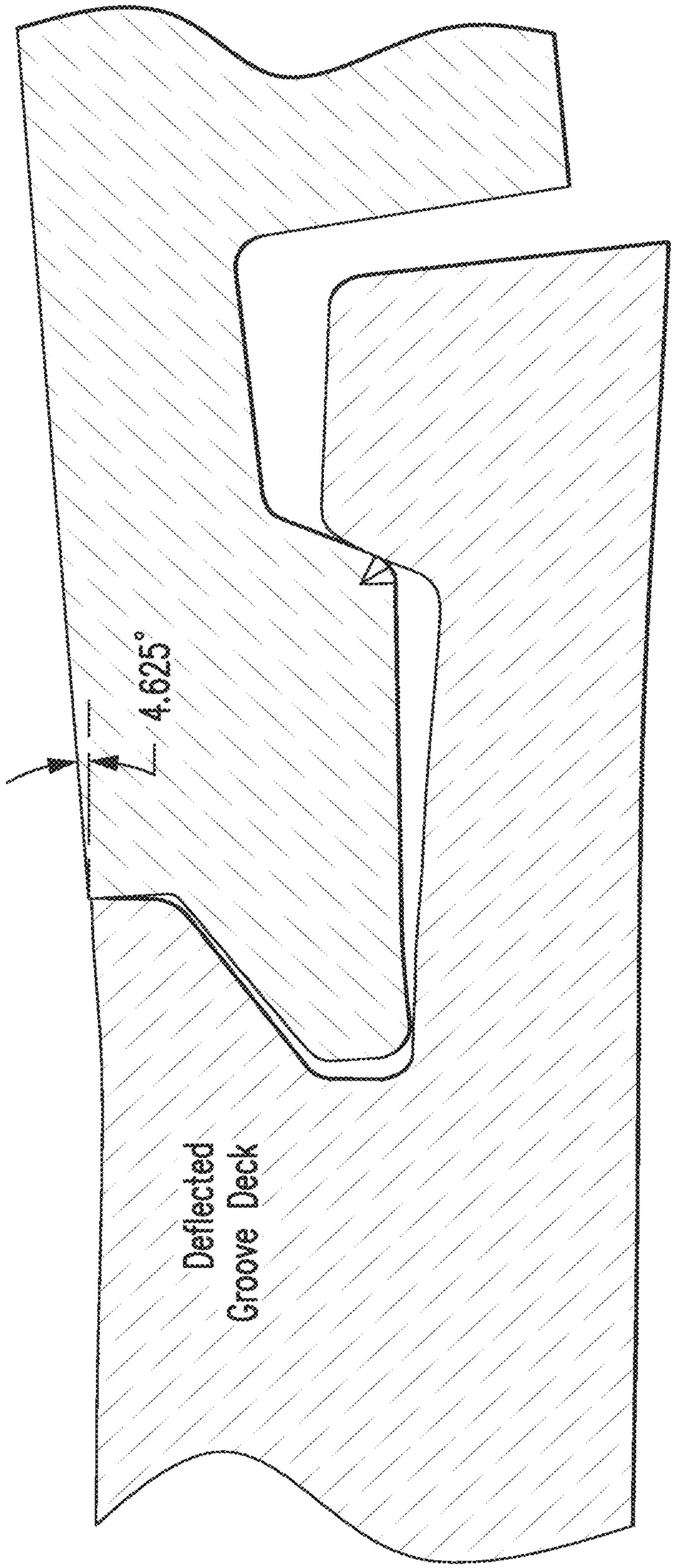
Figure 57:
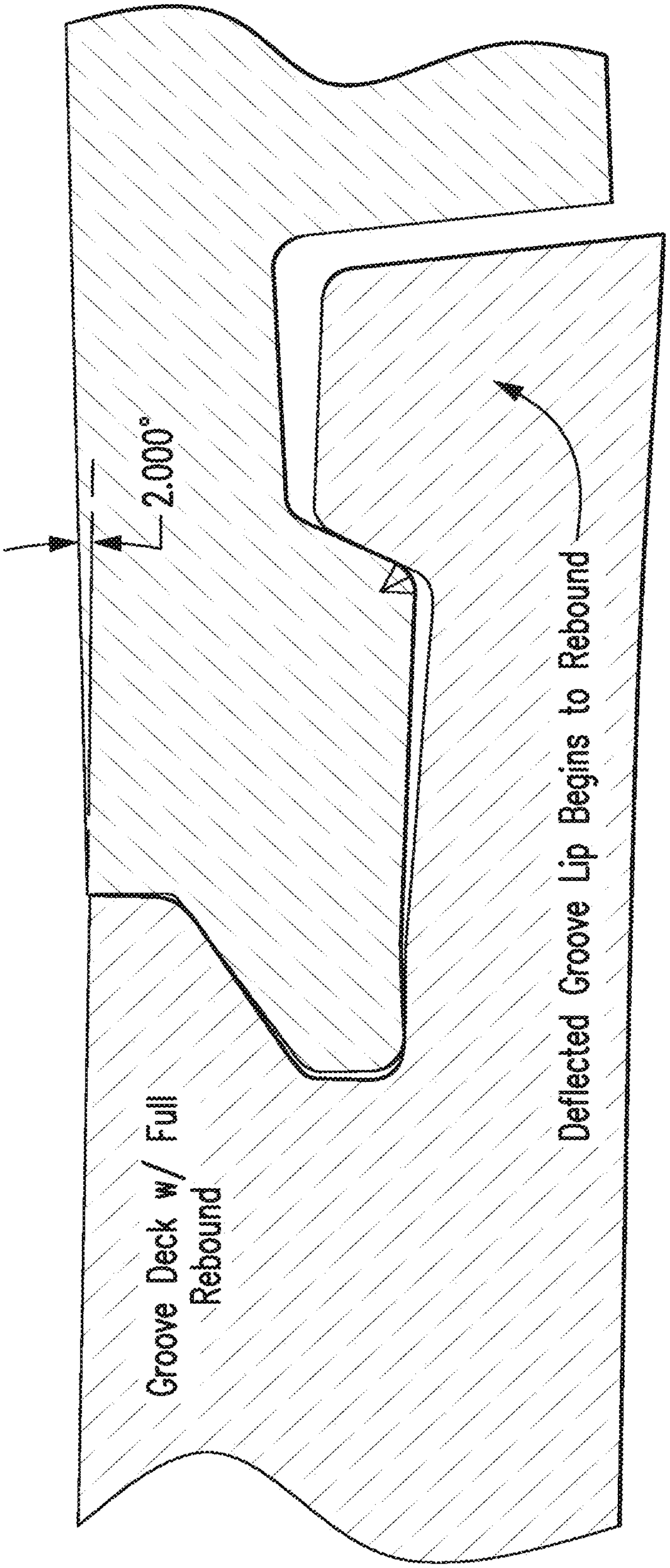
Figure 58:
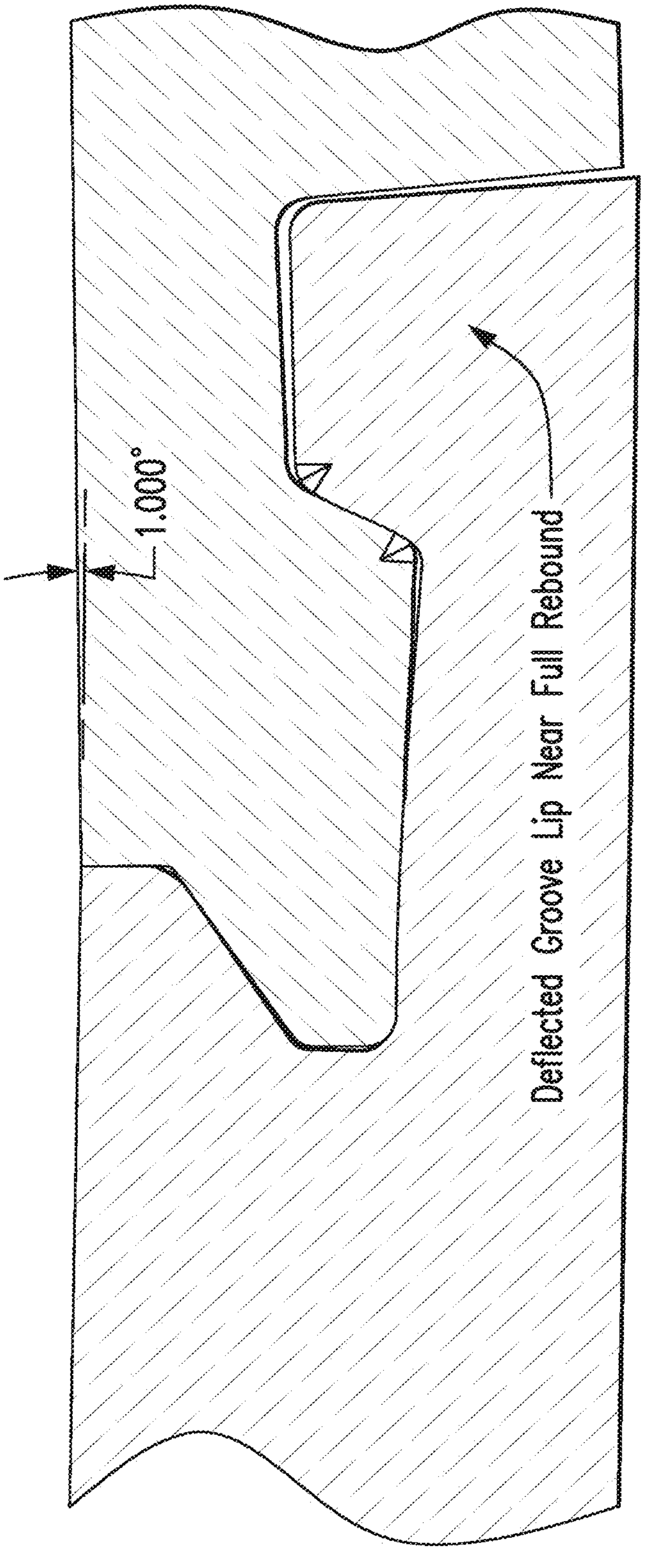
Figure 59:
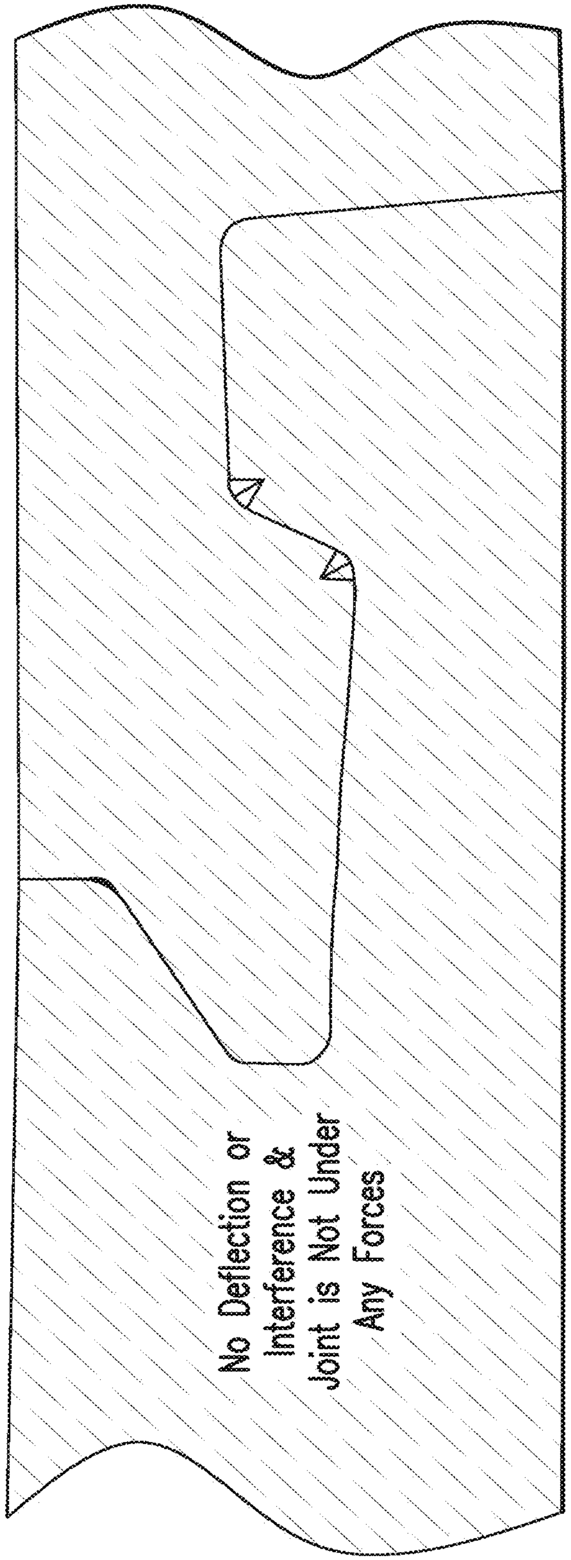

FIG. 51 is an example of the type of angle that can be used to insert the tongue into a groove profile. As shown in FIG. 51, the angle of insertion is about 12°. This angle of insertion can be lower or higher than 12°, such as from 2° to 20°, or from 5° to 15°, and the like. In this example, no flexing of the groove or tongue occurs in order to have the tongue lock into the groove.

Figure 60:
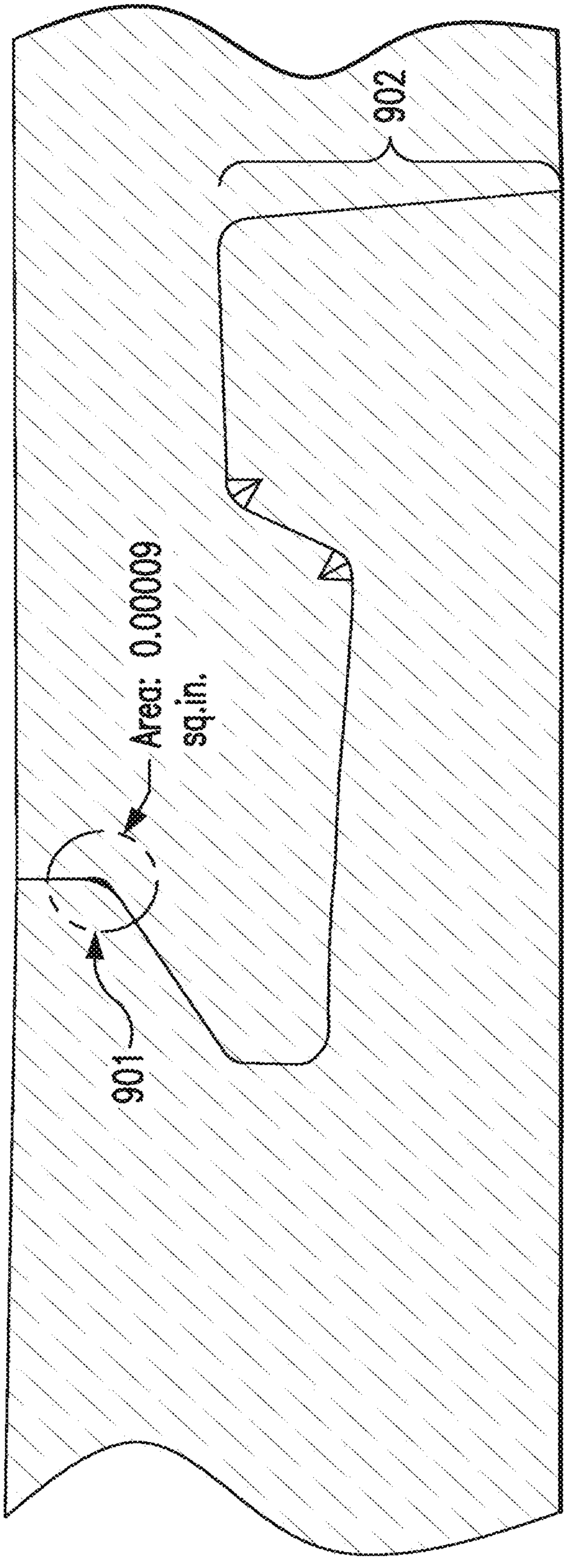

FIGS. 52-60 are a series of figures showing one example of the insertion of the tongue into the groove through a sequence of movements. The angle of insertion at each stage is shown in these figures, as well as when optional flexing of the tongue and/or groove occurs. The particular angles of insertion shown in these series of figures are simply exemplary and other degrees of insertion above and below (e.g., ±25%, ±15% of these angles) these amounts can be used as indicated. FIG. 60 shows the type of cross-sectional area of one clearance. Note that in FIG. 60, no clearance is shown in area 902 since the presence of any of the clearances in any of the locations is optional.

The present invention can have or include the following characteristics. The surface covering plank can comprise a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and said first groove is defined by a) at least a groove landing lip that has rounded corners, b) a groove interference wall having an upper edge and lower edged that are rounded, and said first tongue is defined by a) tongue distal end that has an underside that is slanted or sloped relative to the planar upper surface, b) by a tongue recess wall that is sloped or slanted relative to the planar upper surface and having rounded corners, c) by said tongue distal end have an upperside that is slanted or sloped relative to the planar upper surface wherein the upperside and underside are separated by a tongue distal edge surface that has an upper and lower rounded corners, and wherein upperside has an angle of slope that is 25 to 50 times greater than an angle of slope for said underside.

The surface covering plank can comprise a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove having a groove deck on the opposite second side, wherein the first tongue and first groove have complementary shape to each other to be interlockingly engageable with a corresponding groove or tongue on an adjacent floor plank, and wherein when said first tongue is interlockingly engaged with said corresponding groove on said adjacent floor plank, a first clearance exists between i) a tongue distal end having an upperside that is slanted or sloped relative to the planar upper surface and ii) a groove deck of said corresponding groove, and a second clearance exists between i) a distal edge of the lower lip of said corresponding groove and the tongue channel wall. The second clearance can extend to at least a portion of the underside of the tongue distal end. The second clearance can extend to a groove interference wall. A third clearance (or more than one third clearance) can be located between said first clearance and said second clearance.

The surface covering plank can comprise a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and wherein said tongue and said groove each have at least one flexible portion that flexes during mechanical locking into a respective corresponding groove or tongue on said adjacent floor plank. The flexible portion can be located at a groove deck of said groove and located at said tongue at the downward facing recess. The flexible portion can be located at the groove landing. A flexible portion can additionally be located at the groove landing besides the other one or more flexible portions.

The surface covering plank can comprise a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and wherein said tongue has a tongue tip cross-sectional area that is from 8% to 20% of the entire cross-sectional area of said tongue.

The surface covering plank can comprise a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and wherein said tongue has a tongue tip cross-sectional area and said groove has a groove deck cross-sectional area, wherein the tongue tip cross-sectional area and said groove deck cross-sectional area is within 15% of each other.

The plank can be water resistant. In other words, the plank can be used indoors or outdoors. Further, the planks are resistant to various chemicals and detergents and, therefore, can even be used in industrial, recreational, or garage environments. For instance, the planks are water resistant such that they will not swell by immersing the material in the water for about 24 hours or longer.

The planks are also resilient and are not rigid. In other words, the plank bends or bows significantly if the plank is held at one edge. This flexibility is quite advantageous when installing the planks, since it will conform to any imperfections in the sub-floor or floor that it is being installed upon. The plank can have one or more of the following mechanical properties:

1. Flexural Force @ 0.3" (pli)—Modified ASTM D790: 1+/−0.35;
2. Pull Strength—modified ISO 24334: at least 2 pli per overall thickness (mm) ratio;
3. Tensile strength (psi)—ASTM D638: 750 psi+/−55 psi;
4. Elongation (%)—ASTM D638: 34+/−9;
5. Break Load (pli)—ASTM D638: 31+/−1.5;
6. Pneumatic Indentation at 3000 psi (inch)—<0.005; and/or
7. Residual Indentation at 750 psi (inch)—ASTM F-970: <0.002.

The plank can have, for example, one, two or more, three or more, four or more, five or more, six or more, or all seven of these parameters, in any combination.

If the plank has a laminate construction, the plank can have one or more of the following de-lamination properties: a de-lamination force between layer and layer based on modified ASTM D3164 having a value; 10 (pli) +/−2.5. Preferably, the floor plank has both of these de-lamination properties.

The floor plank also can have one or more of the following surface properties:

a. Taber Abrasion—NAFLA 33.13 LF01-2003-Wear 3.7: >350 cycles;
b. Scratch resistance by fine steel wool—not visible;
c. Scuff by sneaker sole—no scuff mark;
d. Stain property—Modified ASTM 925:0-3 (no stain-strong stain):
    i. Food stainants: 0
    ii. Asphalt sealer: 0
    iii. Oil dye: 1
    iv. Shoe Polish: 1
    v. Blue Sharpie Marker: 1
    vi. Fertilizer: 0
    vii. Iodine: 3;
e. Heat & light stability—ASTM 1514 & 1515: Delta E<3; and/or
f. C.O.F. (dry neolite sole)—ASTM C1028: >0.5.

The plank can have at least one of these properties, or at least two of these properties, or at least three of these properties, or at least four of these properties, or at least five of these properties, or all six of these properties, in any combination. The plank can have any combination of the properties, as well as other parameters. The plank can have each of the mechanical properties, de-lamination properties, joint strength properties, surface properties, or one, two, or three of these properties in any combination. Thus, the plank can selectively have various properties. As indicated, references herein to a plank, including mechanical and surface properties thereof, can also be applied to tiles.

The tongues and grooves can be unitary with the composite sheet that forms the plank body. In other words, the tongues can be part of the overall composite sheet and can be formed by cutting out the desired shapes of the tongues and grooves. Cutting out of the tongue and groove profiles in the edges of the plank typically can be done after the composite sheet is formed including all layers, such as any top layer (e.g., printed design and wear layer) in LVT construction, or any inlaid chips in VCT construction. For carpet tiles, cutting out of the tongue and groove profiles in the edges of the tile typically can be done after the substrate component comprising the polymeric material and filler is formed, and before the carpet layer is affixed to the substrate. The cutting out of the tongue and groove shapes can be done, for example, by milling, such as by using shaper tools. Milling equipment that can be adapted for forming the tongue and groove profiles of the present planks, include profiling (milling) machines of Homag AG and Tenoner. The starting plank can have a rectangular shape that can be slightly oversized to help accommodate the edge milling operations. It is possible that the composite sheet can be formed in a mold, such as when it has a VCT construction without inlaid chips. Molding of the VCT or other filled polymer material can be done, for example, by extrusion or injection molding, so that no milling is necessary. For example, U.S. Patent Application Publication No. 2007/0022694 relates in part to a method of forming edge profiles in planks with extrusion and use of a die, which can be adapted for use herein in this respect and is incorporated in its entirety by reference herein. As an option, the tongues or grooves or both can be separately attached (adhesively, mechanically, or both) components to the sides of the composite sheet or to another part of the floor plank to provide the tongues and grooves on the sides of the plank.

The present planks are formed as a resilient composite sheet, or include a substrate comprised of the resilient composite sheet (e.g., a carpet tile). The composite sheet may be a base layer portion comprising a homogenous layer(ing) of polymer and filler, a laminate including such a base layer portion, or other variations thereon. Portions 21 and 31 in FIGS. 3-4 show examples of such base layer portions. The base layer portion of the composite sheets comprises a polymeric binder and filler that provide a resilient material. As indicated, LVT-, VCT-, and rubber based plank constructions are illustrative, and other resilient composite sheet constructions also can be used in the present planks.

The polymer (polymeric binder) can be any one or more polymers. For instance, the polymer can be a thermoplastic or thermoset polymer. The polymer can be any polymer, including natural products and synthetic products. Generally, any polymeric material, combinations thereof, alloys thereof, or mixtures of two or more polymers can be used to form the base layer portion. The polymeric material can be, for example, a thermoplastic polymer, a thermosetting polymer, a rubber (elastomer), or any combinations thereof. Further, the polymer can be, for example, any type of polymer, such as a homopolymer, random polymer, alternating polymer, graft polymer, block polymer, star-like polymer, comb-like polymer, crosslinked polymer, and/or vulcanized polymer. The polymer can be one or more polyblends. The polymer can be, for example, a thermoplastic elastomer (TPE), an interpenetrating polymer network (IPN); simultaneous interpenetrating polymer network (SIN); or interpenetrating elastomeric network (IEN).

The polymer can be, for example, a silicone-containing polymer, for instance, polydimethyl siloxane, fluorosilicones, silicone-organic polymers, or silicone-organic hybrid polymers. Other examples of polymers include, but are not limited to, olefin-containing, diene-containing and butene-containing polymers and copolymers. Particular examples include elastomers such as solution styrene-butadiene rubber (SBR), natural rubber, emulsion SBR, polybutadiene, polyisobutadiene, polyisoprene, polychloroprene, NBR, EPDM, EPM, isobutene elastomers, and their functionalized or modified derivatives or blends thereof. Other examples of polymers include, but are not limited to, linear and nonlinear polymers such as polyethylene, poly(vinylchloride), polyisobutylene, polystyrene(s), polycaprolactam (nylon), polyisoprene, and the like. Other general classes of polymers include polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), cellulose acetate, ethylene-vinyl acetate, polyacrylonitrile, fluoropolymers and fluoroplastics, ionomeric polymers, polymers containing ketone group(s), polyketone, liquid crystal polymers, polyamide-imides, polyaryletherketone, polymers containing olefinic double bond(s) (such as polybutadiene, polydicyclopentadiene), polyphenylene oxides, polyurethanes, thermoplastic elastomers, polyolefins (such as polyethylene, 1-butene, polypropylene, 1-hexene, 1-octene, 4-methyl-1-pentene, substituted alpha-olefins, and the like), polyolefin copolymers (such as copolymers of: ethylene, 1-butene, propylene, 1-hexene, 1-octene, 4-methyl-1-pentene and substituted alpha-olefins and the like), polyolefin terpolymers, polycarbonates, silicone polymers, alkyd, epoxy, unsaturated polyester, vinyl ester, urea-, melamine-, or phenol-formaldehyde resins, and the like. Other examples of the polymer can be an acrylic polymer, a methacrylic polymer, or a styrenic polymer or silicone polymer. The polymer present in the polymeric product of the present invention can be a polyolefin. The molecular weight of the polymer can be, for example, from 10,000 to 1,000,000, or from 50,000 to 500,000, or from 100,000 to 200,000, or other values, based on weight average molecular weight.

In one particular example, the polymeric material is a thermoplastic polymer that includes, but is not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as acetyl, polycarbonate, polyimide, polysulfone, and polyphenylene oxide and sulfide resins and the like. One or more conductive polymers can be used to form the plank, which has applications in conductive flooring and the like. The thermoplastic polymers set forth in Kirk Othmer ($3^{rd}$ Edition, 1981) at pp. 328 to 848 of Vol. 18 and pp. 385-498 of Vol. 16, (incorporated in their entirety by reference herein) can also be used as long as the resulting plank has sufficient strength for its intended purpose.

The thermoplastic material can be, for example, a rigid polyvinyl chloride and/or semi-rigid or flexible polyvinyl chloride. In general, for the present invention, the flexibility of the thermoplastic material and/or any polymer used herein for any plank/tile can be imparted by using at least one liquid or solid plasticizer which is preferably present in an amount of about 1% to 30% by weight of the layer, such as less than 25% by weight (e.g., from 1% to 10% by weight or from 4 wt % to 15 wt %, or from 5 wt % to 25 wt %). A typical compound used in the present planks to form the base layer portion can include, but is not limited to, polymer(s), plasticizer(s), pigments, impact modifiers, stabilizers, processing aids, lubricants, fillers, and/or wood flours, and/or other conventional additives, and the like.

The thermoplastic polymer compound to be processed can be in powder, liquid, cubed, pelletized form and/or any other extrudable form. Also, the thermoplastic polymer can be virgin, recycled, or a mixture of both. Furthermore, the thermoplastic material can be incorporated with a blowing agent(s) or a mechanically injected gas during the extrusion process to make a cellular foam structure core.

The thermoplastic material used to form the base layer portion, which can be polyvinyl chloride, can be a suspension grade or mass polymerization grade homopolymer resin having a preferred molecular weight as reflected by an inherent viscosity of from about 0.88 to about 1.0 inherent viscosity. In general, a higher molecular weight polymer is preferred from the standpoint of processing stability and preferably the molecular weight distribution and particle size distribution are narrow in order to provide a good balance between processability and properties. Also, high porosity and uniform porosity of the resin particles are preferred to optimize compounding and processing aspects, including the fast and uniform absorption of any stabilizer that is present as well as other ingredients during compounding. A thermoplastic material used to form the base layer portion can be a PVC powder compound that has good impact strength, ease of processing, high extrusion rate, good surface properties, excellent dimensional stability, and indentation resistance.

In one example, the polymer can comprise a vinyl chloride homopolymer and a vinyl copolymer, such as a vinyl chloride-vinyl acetate copolymer, wherein the vinyl chloride homopolymer can be present in the composition in an amount from about 1 wt % to greater than 50% by weight of the combined amount of vinyl chloride homopolymer and a vinyl copolymer, such as vinyl chloride-vinyl acetate copolymer (e.g., from about 1 wt % to about 20 wt %, from about 20 wt % to about 40 wt %, from about 40 wt % to about 60 wt %, from about 60 wt % or greater, about 65 wt % or greater, about 70 wt % or greater; or from about 75 wt % to about 99 wt %). As a non-limiting example, the amount of vinyl chloride homopolymer in the virgin polymer can be from about 80% to about 99 wt % by weight of the combined amount of vinyl chloride homopolymer and vinyl chloride-vinyl acetate copolymer, or may be from about 70%-99% (or more) by weight of the combined amount of vinyl chloride homopolymer and vinyl chloride-vinyl acetate copolymer or may be from about 80%-90% by weight of the combined amount of vinyl chloride homopolymer and vinyl chloride-vinyl acetate copolymer. The vinyl chloride copolymer and homopolymer can have any K-value or molecular weight. Additional properties of the vinyl chloride homopolymer and a vinyl copolymer are shown, for example, in U.S. Patent Application Publication No. 2009/0226662, which is incorporated in its entirety by reference herein.

The base layer portion can comprise at least one polymer, such as a polyvinyl chloride, and also at least one plasticizer, at least one filler or filler source such as post-industrial recycled or post-consumer recycled materials such as gypsum, glass, energy by-products, wood, plastic, carpet, or parts thereof, PVC, VCT recycled, and the like, or all of these. The base layer portion also can include at least one heat stabilizer. Other ingredients (for instance, in conventional amounts used in LVT or VCT tile formulations) can be present in the base layer or other layers of the composite sheet, such as flame retardants, UV stabilizers, antistatic agents, wear resistant particles, antimicrobial additives, pigments, processing aids, dispersion additives, lubricants, colorants, modifying resins, cross-linking agents, antioxidants, foaming agents, tackifiers, and/or other conventional organic or inorganic additives commonly used in polymers (e.g., vinyl) used in tile or sheet surface coverings.

The filler can be any filler, including any conventional filler, which can be used in solid vinyl or vinyl composition tiles, and/or rubber compositions. The filler can be natural filler or synthetic filler. The filler can be in the form of particles, short fibers, flakes, and other discrete forms. In a plank or tile having a base layer or base layers comprising LVT material or VCT material, inorganic filler can be used. Examples of inorganic filler can include, but are not limited to, hydrated alumina, magnesium carbonate, calcium sulfate, silica, precipitated silica, fumed silica, fly ash, cement dust, glass, clay, talc, calcium carbonate, barium sulfate, silicates, aluminum trihydrate, talc, clay, kaolin, wollastonite, gypsum, solid or hollow glass microspheres, and the like. Inorganic fillers can be, for example, mineral fillers. The filler also can be non-mineral or organic filler such as carbon black, wood flour, cellulose-derived materials, ground rice hulls, solid or hollow temperature resistant polymer microspheres or microbeads (e.g., phenolic microspheres), and the like. Carbon black, for example, can be used as filler in rubber-based base layers, or other types of base layers, of planks or tiles. The inorganic and organic fillers can be used in combinations in the base layers, or either type can comprise the sole type of filler used in the base layers.

As indicated, an inorganic filler can be used in a base layer or base layers comprising LVT material or VCT material. This inorganic filler can include, for example, any conventional filler, which can be used in solid vinyl or vinyl composition tiles. The filler can be recycled from any source. An inorganic filler typically provides dimensional stability and reduced elasticity to a vinyl composition tile, and may provide properties of fire resistance. As a non-limiting example, limestone (e.g., calcium carbonate with magnesium carbonate) may be used as the filler. A specific non-limiting example is dolomitic limestone (which can be screened), such as supplied by Specialty Minerals, Inc. under the product code DF-5025 and having a top mesh size of about 50 and a percent passing a 200 mesh sieve of about 25 wt %. Other inorganic fillers that can be used include clay, talc, silicates, or aluminates. Freshly added or supplemental filler may be in any physical form that allows it to be mixed or blended with the other ingredients to form a vinyl composition tile formulation that can be processed into a vinyl composition tile. Typically, added filler is in the form of particles. As a non-limiting example, an inorganic filler can be used for the full amount of filler described for a base layer formulation herein (e.g., the LVT or VCT based layers), or other proportions (e.g., at least about 50 wt %, or at least about 60 wt %, or at least about 70 wt %, or at least about 80 wt %, or at least about 90 wt %, or at least about 99 wt %, up to 100 wt % of all filler). As another non-limiting example, a mineral filler, such as a particulate mineral filler, can be used for the full amount of inorganic filler described for a base layer formulation herein, or other proportions (e.g., at least about 50 wt %, or at least about 60 wt %, or at least about 70 wt %, or at least about 80 wt %, or at least about 90 wt %, or at least about 99 wt %, up to 100 wt % of all inorganic filler). In other examples, such as for some rubber-based base layers, an organic or non-mineral filler such as carbon black can be used for the full amount of filler described for a base layer formulation herein, or other proportions (e.g., at least about 50 wt %, or at least about 60 wt %, or at least about 70 wt %, or at least about 80 wt %, or at least about 90 wt %, or at least about 99 wt %, up to 100 wt % of all filler).

A stabilizer typically provides heat stability and/or UV light stability to a vinyl chloride polymer formulation. The stabilizer according to the present invention can be selected for effectiveness with the particular polymer used and may be a calcium-zinc stabilizer. A calcium-zinc stabilizer containing about 5.5 wt % or more zinc may be used, such as about 6.0 wt % to about 10.0 wt % zinc. Specific non-limiting examples of zinc-calcium stabilizers are supplied by Chemson, Inc. under the product codes of PTP113 (5.8% zinc, 10.5% calcium by weight). Other examples of stabilizers include, but are not limited to, barium-cadmium stabilizers, barium-zinc stabilizers, organotin stabilizers, epoxidized soybean oils, and the like.

The plasticizer may be any plasticizer, including any conventional plasticizer, that can be used in vinyl resins. Examples include, but are not limited to, processing oils, polyesters, polyethers, polyether esters, and/or mixtures thereof. The plasticizer can be in the form of an oily liquid that softens vinyl and adds flexibility to a composition containing a vinyl resin. For example, the plasticizer may be a phthalic diester or a mixture of phthalic diesters, such as a mixture of diisononyl phthalate (DINP) and butyl benzyl phthalate. A suitable plasticizer containing about 10 wt % diisononyl phthalate and about 90 wt % butyl benzyl phthalate, for example, is provided by Ferro Corp. designated with a product code of Santicizer-160 (S-160). Other examples of plasticizers include, but are not limited to, di(2-ethylhexyl) phthalate (DOP), diisooctyl phthalate (DIOP), ditridecyl phthalate (DTDP), dihexyl phthalate (DHP) and diiosdectyl phthalate (DIDP), and the like. The selection criteria of plasticizers can be to enhance flexibility, resiliency, and/or melt flow.

As an option, one or more coupling agents can be present in a vinyl formulation, such as a maleic anhydride. The coupling agent(s) is especially preferred when 1% or less by weight of vinyl copolymer is present. Generally, the coupling agent can be present in an amount sufficient to permit sufficient coupling of the homopolymer and/or other components. Amounts can be, for instance, from about 5% by weight or less (e.g., about 0.1 wt % to 4 wt %) based on the weight of a homopolymer and vinyl copolymer present. Other amounts can be used.

The base layer portion formulation may be in any physical form suitable for storage and/or for use to form a base layer. For example, all of the ingredients except the plasticizer are typically solid ingredients and are typically in powder or pellet form. Accordingly, these ingredients can be mixed in any order and by any method known in the art for combining powder, and the plasticizer, which is typically a liquid, may be blended into the resulting mixture. The base layer formulation may be premixed and stored for a period of time prior to use, or may be mixed just before, or even during, a process for manufacturing the base layer. The components, additional layers and/or methods of U.S. Pat. Nos. 5,112,671; 4,614,680; 4,187,131; 4,172,169, 4,423,178; 4,313,866; and 5,380,794 can be used in the present application and these patents are incorporated in their entirety be reference herein.

In one example, the present plank can include, for example, at least one base layer comprising polyvinyl chloride, at least one plasticizer, at least one inorganic filler, and at least one stabilizer. For VCT, the at least one base layer can comprise inorganic filler in a predominant amount. The amount of filler can be, for example, from about 50 wt % to about 98 wt %, from about 51 wt % to about 98 wt %, from about 55 wt % to about 95 wt %, from about 60 wt % to about 90 wt %, from about 65 wt % to about 85 wt %, from about 70 wt % to about 80 wt %, from about 75 wt % to about 80 wt %, and any amount within one of these ranges, based on the wt % of the overall composition. For example, the at least one base layer can comprise from about 15 wt % to about 30 wt % polyvinyl chloride, from about 4 wt % to about 10 wt % plasticizer, from about 50 wt % to about 80 wt % filler, and from about 1 wt % to about 5 wt % stabilizer. In one example, the at least one base layer, or multiple base layers, or all the base layers used in a plank or tile construction, can comprise from about 22 wt % to about 30 wt % polyvinyl chloride, or from about 24 wt % to about 29 wt % polyvinyl chloride, or from about 25 wt % to about 28 wt % polyvinyl chloride. The amount of plasticizer can be increased, such as proportionally, relative to an increased amount of polyvinyl chloride, and the amount of filler can be decreased, such as proportionally, relative to increased amounts of polyvinyl chloride and plasticizer. Other ingredients can be used, for example, in the above-indicated amounts. The increased amount of polyvinyl chloride, such as to about 22 wt % to about 30 wt % polyvinyl chloride, can impart, for example, greater flexibility in the product plank or tile made with the composition.

In another example, the at least one base layer can comprise a multiple base layer construction, such as including a first base layer comprising polyvinyl chloride, plasticizer, inorganic filler, and stabilizer, and a second base layer attached to a lower surface of the first base layer, and so forth. FIG. 3 illustrates such a base layer portion construction. These different base layers can have the same or different compositions. These different base layers can be co-extruded or extruded or molded separately prior to being consolidated together into a unitary base portion by lamination or adhesion, or other method.

In one example, at least first and second base layers are included in the base layer portion where one base layer has a lower wt % polyvinyl chloride, plasticizer, and stabilizer and higher inorganic filler than another base layer. For example, one base layer can comprise, for example, from 15 wt % to 30 wt % polymer, such as polyvinyl chloride, from 4 wt % to 10 wt % plasticizer, from 50 wt % to 80 wt % filler, and/or from about 1 wt % to 5 wt % stabilizer, based on the weight of the base layer, and another base layer can comprise from 25 wt % to 40 wt % polymer, such as polyvinyl chloride, from 7 wt % to 15 wt % plasticizer, from 40 wt % to 60 wt % filler, and from 2 wt % to 10 wt % stabilizer, based on the weight of this base layer. A third base layer also may be included, or more, having a composition that is the same or different from the other two base layers. These base layers can comprise other optional ingredients and can contain more than one component in each category, such as more than one polymer, more than one plasticizer, more than one filler, and/or more than one stabilizer. That is, the one base layer can be located adjoining and adhered to the other base layer. The multiple base layers can be bonded or otherwise adhered to each other through pressure and/or heat.

As indicated, some present planks can have a laminate construction, such as an LVT laminate structure. In the laminate designs, the plank contains a base layer portion, which in this embodiment can be referenced as a laminate core, and this core has a top surface, such as shown as feature 310 in FIG. 3, and located or affixed on the top surface of the core is a print layer (35). The print layer has a top surface and a bottom surface. Affixed onto the top surface of the print layer is an overlay or wear layer having a top surface and a bottom surface. An underlay layer optionally can be located and affixed between the bottom surface of the print layer and the top surface of the core. The present planks do not require a backing layer, but can optionally have a backing layer.

The print layer can be, for example, PVC film or an aminoplast resin impregnated printed paper. The print layer can be, for example, a printed design, such as to simulate various wood grains. The printed design can be any design which is capable of being printed onto the print layer. The print layer is also known as a decor print layer. Generally, the print layer can be prepared by rotogravure printing techniques or other printing means such as digital printing. Once the paper has the design printed on it, the paper is then impregnated with an aminoplast resin or mixtures thereof. The aminoplast resin can be, for example, a blend of a urea formaldehyde and a melamine formaldehyde.

A print paper, if used, also known as the décor paper, can have the ability to have liquids penetrate the paper such as a melamine liquid penetrating in about 3 to 4 seconds and also maintain a wet strength and even fiber orientation to provide good reinforcement in all directions. The resin used for the impregnation can be, for example, a mixture of urea formaldehyde and melamine formaldehyde resins. Urea formaldehyde can contribute to the cloudiness of the film that is formed and thus is not preferred for dark colors and the melamine resin imparts transparency, high hardness, scratch resistance, chemical resistance, and good formation, but may have high shrinkage values. Combining urea resins with melamine resins in a mixture or using a double impregnation (i.e., applying one resin after another sequentially) provides a positive interaction in controlling shrinkage and reducing cloudiness. The type of paper used can be, for example, a 75 g/m weight and having a thickness of about 0.16 mm. The saturation of the coating can be, for example, about 64 $g/m^2$. For purposes of the present invention, the print layer can be a design printed directly onto a layer, such as directly on a base layer or other layer, using digital ink jet printing or other direct printing methods.

Located optionally on the top surface of the print layer is an overlay, which is also referred to as a wear layer. The wear layer can be made of any suitable material known in the art for producing such wear layers, such as a polymeric film or overlay paper. The wear layer can be, for example, a transparent poly (vinyl chloride) layer. The dry film thickness of this PVC wear layer is not critical, and it is preferably from about 5 mils to about 50 mils, and more preferably from about 10 mils to about 20 mils. Other examples of this wear layer include, but are not limited to, acrylic polymers, polyolefins, and the like. The wear layer can be a plasticized or a rigid polyvinyl chloride composition and/or other polymers, such as clear polymers. The wear layer topcoat can be a thermoset layer or a thermoplastic layer. Examples of such wear layers can be found in, for example, U.S. Pat. No. 4,333,987 to Kwart et al., U.S. Pat. No. 4,180,615 to Bettoli, U.S. Pat. No. 4,393,187 to Boba et al., and U.S. Pat. No. 4,507,188 to Chu. The wear layer top coat can be a hard, thermoset, radiation-curable acrylate monomers and/or oligomers having a glass transition temperature (Tg) of greater than 50° C.

With respect to the overlay, the amount of aminoplast resin (or other resin(s)) can be from about 60 to about 140 $g/m^2$, such as from about 100 to about 120 $g/m^2$.

As an option, an underlay can be located and affixed between the bottom surface of the print layer and the top surface of the base layer. The underlay can be present and can be a paper impregnated with a resin(s), such as an aminoplast resin as described above. The underlay can be Kraft paper impregnated with a resin(s) such as aminoplast resins or phenolics, like phenolic formaldehyde resin or melamine formaldehyde resin. The resin(s) can be present in an amount of from about 60 $g/m^2$ to about 145 $g/m^2$, such as from about 100 $g/m^2$ to about 120 $g/m^2$ paper. The type of paper used can be from about 100 to about 200 $g/m^2$, such as about 145 $g/m^2$, and having a thickness of from about 0.1 to about 0.4 mm, such as about 0.25 mm. The underlay can be used when extra impact strength resistance is required. As an option, the underlay can be a film or sheet (such as a polymeric film or sheet using or comprising one or more of the polymers mentioned above for the base layer or other polymers, optionally with other additives, such as fillers, plasticizers, stabilizers, and the like).

The wear layer can comprise multiple layers, such as a wear layer and a wear layer top coat (or top coat layer). The wear layer top coat, (e.g. radiation curable acrylates) can have a glass transition temperature of greater than about 50° C., such as at least about 67° C. The thickness of the wear layer top coat, once cured, can be from about 0.1 mil to about 2.5 mil, such as from about 0.75 mil to about 1.1 mil.

To achieve excellent scuff, scratch and abrasive wear resistance property, the combined wear layer base coat plus wear layer top coat dry film thickness can be, for example, at least about 10 mil. The dry film thickness (DFT) is the thickness after curing. Additionally, to achieve excellent scuff, scratch and wear resistance, the wear layer top coats can have two layers of coating, both layers can be thermoset. The bottom wear layer and the outmost wear layer top coat possessing thermoset characteristics are due to sufficient cross-linking within the bottom of the respective wear layer and the outmost wear layer top coat polymeric networks. The wear layer and/or wear layer top coat can be each cross-linked sufficiently to be insoluble in methyl ethyl ketone, isopropyl alcohol, and tetrahydrofuran.

The wear layer top coat can be, for example, a water based, solvent based, radiation-curable, non-radiation curable, UV-curable, or non-UV curable system. For example, the wear layer top coat can be comprised of acrylics, acrylates, urethanes, epoxies, other type vinyls, other type polymers, and blends thereof, as long as the composition when cured, results in a resilient, thermoset coating with adequate cross-link density.

Optionally, besides the layers discussed above, one or more additional layers can be present, such as the layers described in U.S. Pat. No. 5,458,953, incorporated in its entirety by reference herein. Such additional layers include strengthening layers, additional foamable layers, and one or more wear layer base coat(s). The composition of these layers is described in U.S. Pat. No. 5,458,953 and can be used in the surface covering of the present invention.

In the present invention, one or more layers can contain wear resistant particles, such as a wear layer and/or wear top coat layer (e.g., protective layer). One example is at least one layer containing aluminum oxide. The aluminum oxide used in the present invention is also known as alumina or $Al_2O_3$. The aluminum oxide can be fused or calcined. The refractive index can be from about 1.4 to about 1.7.

A sufficient amount of the aluminum oxide and/or other wear resistant particles can be present in at least one layer of the surface covering to provide improved wear and/or stain resistance to a surface covering as compared to no aluminum oxide being present. From about 2 $g/m^2$ to about 50 $g/m^2$, or from about 4 $g/m^2$ to about 20 $g/m^2$ of alumina, for example, can be present in at least one layer of the surface covering. Alternatively, from about 1% by weight to about 40% by weight of alumina can be present in at least one layer of the surface covering. Also, while any source of aluminum oxide can be used, the aluminum oxide can have the following characteristics: fused or calcined and having a hardness of from about 6 to about 9 on a Moh's scale, and most preferably about 9 on a Moh's scale. The particle size of the aluminum oxide can be, for example, from about 10 microns to about to about 70 microns, or from about 20 microns to about 50 microns. Sources of aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc., Birmingham, Ala. The aluminum oxide, which can be part of at least one layer of the surface covering, can be added in any manner known to those skilled in the art for adding particles to a layer. The aluminum oxide can be mixed into a wet coating or scattered on top of a wet coating. The aluminum oxide can be, for example, applied by a pellet dispenser, which applies or sprinkles aluminum oxide on top of a layer which is still "wet" or uncured. By the layer being "wet" or uncured, the aluminum oxide "sticks" or adheres to the "wet" layer and at least a portion of the aluminum oxide "sinks" into the layer and thus is not exposed to the environment. Instead of alumina, other metal oxides or ceramics can be used.

The mixing of alumina (and/or other hard particles) with a formulation that forms the wet coating generally requires constant mixing of the coating with alumina to preferably keep the alumina suspended in the coating. Surface treatments of the alumina and the use of other anti-settling agents help in minimizing the settling. Once the aluminum oxide is applied to the layer which is "wet" or uncured, the surface covering containing this layer is cured by means known to those skilled in the art, such as radiation curing, UV, electron beam, thermal and/or moisture curing, and the like. The aluminum oxide can be present in the outermost layer of a surface covering which is the layer subjected to the environment including foot traffic and other objects coming in contact with the surface covering. Generally, this outermost layer is known as the top coat layer or wear layer top coat or protective layer. This wear layer top coat can be a polymeric layer, such as a thermoset or thermoplastic, and can be made of urethane or acrylic, melamine, polyvinylchloride, or polyolefins, and the like.

Acrylics, alkyd resins, melamines, conventional clear coats, polyvinyl chloride, polycarbonates, kevlar, epoxy coatings, polyester, polyester acrylates, vinyl-ether-functionalized urethane, epoxysiloxanes, epoxysilicones, multifunctional amine terminated acrylates, acrylate melamines, polyethylene and diene copolymers, and the like, can be used in place of the urethane based acrylates described above. Basically, the wear resistance of any surface or coating can be improved by the incorporation of hard particles such as fused alumina.

For instance, the laminate forms of the present planks can be coated, for example, with about 0.3 to about 2.5 mil of acrylated urethane based UV-curable top coat or other top coat formulations. On the wet coat in a typical application, about 5-15 g/m$^2$ of fused alumina with average particle size in the range of about 25-40 microns can be applied to this top coat by a modified Christy Machine or by a Schilling scattering machine and then the top coat can be cured by UV-light (or other radiation curable source) employing either a direct or differential cure mechanism. Depending on the product specification, the amount of alumina and the thickness of the coating can be varied. Also, for example, from about 15 to about 35 g/m$^2$ of alumina (in a layer) in the particle size range of about 50 to about 150 microns could be used in the production of non-slip coverings. Carborundum, quartz, silica (sand), glass, glass beads, glass spheres (hollow and/or filled), plastic grits, silicon carbide, diamond dust (glass), hard plastics, reinforced polymers, and organics, etc., may be substituted for all or part of the alumina. The techniques and formulations described in U.S. Pat. No. 6,291,078 can be used herein and this patent is incorporated in its entirety by reference.

As indicated, the overlay or wear layer can also be an overlay paper. An overlay paper that can be used, includes, for example, an overlay paper, which upon being affixed onto the print layer, is clear in appearance. Types of overlap paper or other wear layers that can be used, include those as described in U.S. Patent Application Publication Nos. 2006/0032175; 2007/0196624; and 2009/0031662, which are incorporated in their entireties herein by reference.

The present planks can be formed using a variety of methods. For instance, the composite sheet that comprises the floor plank can be formed by individually pre-forming the base layer or layers and/or any print layer that contains the print design. The wear layer can be present as an overlay wear layer or can be formed afterwards. The wear layer can include a protective layer, strengthening layer, and the like. Each of the base layers can be individually formed by calendar rolling, extrusion or other techniques once the formulation for each of the base layers are prepared. Then, the layers that constitute the entire composite sheet or a part thereof can be placed on top of each other in a stack in their correct order and subjected to hot pressing using a hydraulic press to form a plank body that can be milled to form the tongue and groove edge profiles. In one example, the composite sheet of the plank is manufactured as multiple individual pressed sheets, which are consolidated into a unitary composite sheet forming the plank body. In one example, a sheet layup including one or more base layers, a print layer, and optionally a wear layer, are stacked in their correct order and subjected to hot pressing using a hydraulic press to form a sheet. For instance, the temperature can range, for example, from about 125° C. to about 135° C. or other temperatures above or below this range. The pressure can be, for example, from about 4 MPa to about 18 MPa or other pressures above or below this range. Generally, the time that the pressure can be applied, for example, is from about 30 seconds to about 2 minutes, such as from about 1 minute or any time above or below these ranges. The consolidation to form the sheet can be a large sheet that can be punched or cut up into desired final dimensions of the plank (or multiple planks). For instance, during this hot pressing, the overall sheets can be about 1 meter×1 meter or larger or smaller. Once the hot pressing to form the consolidated sheet is achieved, the sheet can be then annealed to remove stress and achieve dimensional stability. The annealing can occur in an oven or other heating device. The annealing can occur at a temperature of from about 125° C. to about 135° C. This annealing can be done on a conveyor belt, through an infrared oven or conventional air impinged oven, the speed can be any suitable speed depending upon the length of the oven and the temperature setting. For instance, the speed of the conveyor belt can be about 3 meters per minute to about 10 meters per minute, such as about 3.5 meters per minute to about 8 meters per minute. Afterwards, the sheet can be aged at ambient conditions, such as about 25° C., for various hours, such as about 1 day (about 24 hrs.), about 2 days (about 48 hrs.), about 3 days (about 72 hrs.), or more. Afterwards, the sheet can be cut or punched out to plank sizes. As an option, a top coat layer or protective layer, like a UV protective layer, optionally containing wear resistant particles, such as aluminum oxide or other wear resistant particles can be applied, such as by means of a spray coating operation, roller coating operation, or air knife coater or, curtain coater and the like. The cold pressing operation can use various pressures, such as from about 10 to about 100 kg or more, and for a time, such as about 1 hour to about 3 days, such as about 24 hours. Then, the sides of the resulting planks can be profiled by cutting (e.g., milling) to impart the desired tongue and groove profiles.

A present plank also can comprise, for example, the same plank described above but, in lieu of a top layer on top of the plank, a design is printed directly on the top surface of the plank using any number of printing techniques such as gravure printing, transfer printing, digital printing, flexo printing, and the like. Or, a printed thermoplastic film (e.g., PVC) or a wood veneer and the like can be laminated to a thermoplastic plank. A protective coating can then be placed on top of the printed design. Any type of protective coating or wear layer can be used, such as a polyurethane type coating with or without wear resistant particles in the coating. Thus, a plank would have a core, where the core has a top surface and bottom surface as well as opposing sides and a printed design directly on the top surface of the plank and optionally at least one protective coating on top of the printed design. The top surface of the plank as described earlier can have a textured surface as described above.

This type of plank can be made by extruding a material containing at least one polymeric material into the shape of the core and then printing a design directly on the top surface of the plank and then, optionally, applying at least one protective coating on top of the printed design and curing the protective coating. The protective coating can be applied by conventional techniques, such as with a curtain coater, direct roll coater, vacuum coater, differential roll coater, air knife coater, or spray apparatus.

In another embodiment of the present invention, a plank for surface coverings, such as flooring, has a core and an extruded layer on the top surface of the core, wherein the extruded layer includes at least one thermoplastic material with one or more pigmented compounds. The extruded layer on top of the extruded core can simulate various designs such as wood grain and the like.

Figure 61:
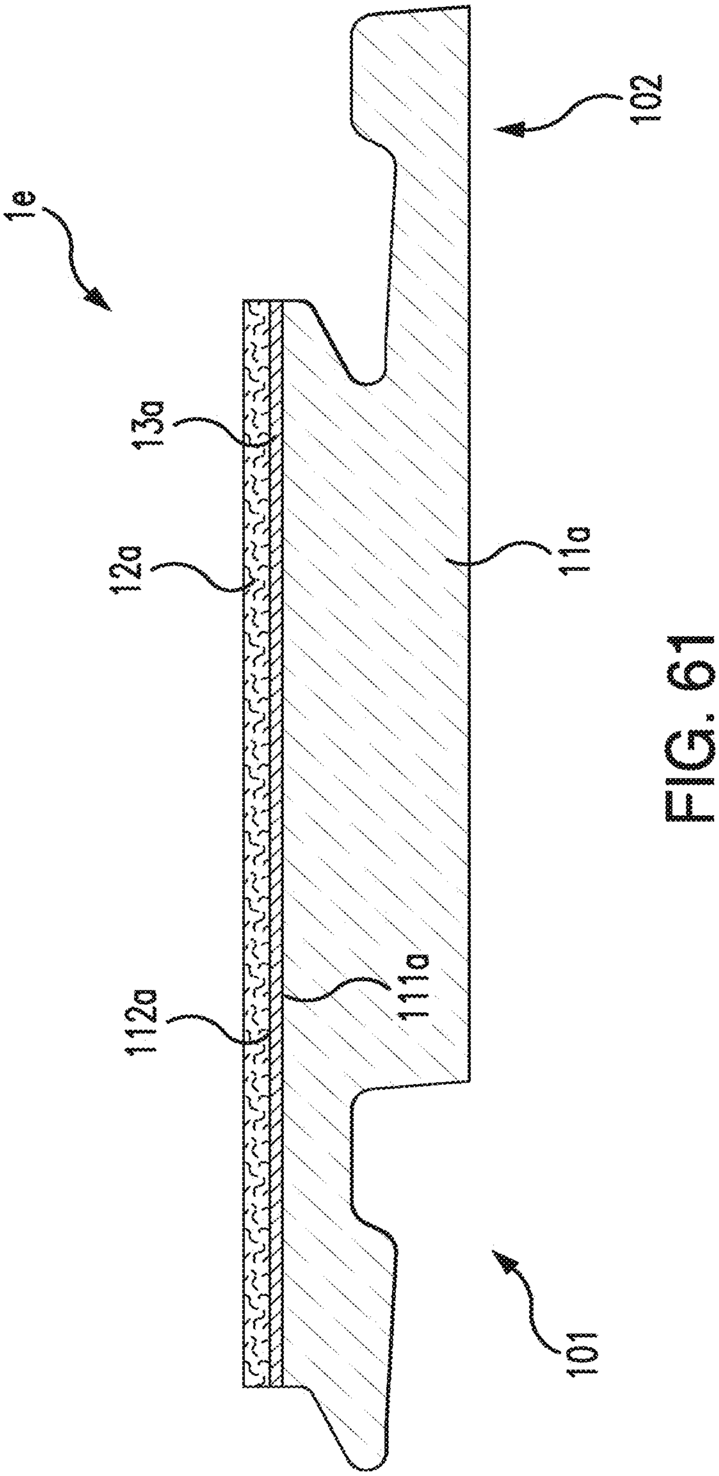
FIG. 61 is an enlarged cross-sectional view of a carpet tile having tongued and grooved edges according to various options of the present invention.

Referring to FIG. 61, a carpet tile **1*e* is shown which illustrates another example of a surface covering the present invention. Carpet tile 1*e* can be a laminate structure. Carpet tile 1*e* has a carpet layer 12*a*** which is attached to a substrate 11*a* with an intervening bonding layer 13*a*. The substrate 11*a* can comprise a composite sheet material formed of one or more of the base layers of VCT, LVT, or rubber material, such as indicated herein. The substrate 11*a* can have at least two opposite tongue and groove sides 101 and 102, which can have any of the indicated edge profiles, such as shown in any of FIGS. 1-60. For example, substrate 11*a* can have the tongue and groove profiles and geometries shown for plank or tile 1*a* in FIG. 12, or other edge profile illustrations herein. The bonding layer 13*a* can be a separate layer or coating from the carpet layer 12*a*, or alternatively may be an adhesive or tackifiable constituent or layer of the carpet layer 12*a* itself, which can be located at the underside of carpet layer which faces the substrate. The bonding material can be, for example, any adhesive, such as, any thermoplastic adhesive, thermosetting adhesive, or rubber adhesive, or any combinations thereof, which can securely bond to both the bottom surface material 112*a* of carpet layer 12*a* and the top surface material 111*a* of substrate 11*a*. For example, an adhesive used to secure fibers at the backside of a tufted carpet may also be used to secure the carpet to the substrate after tufting. The carpet layer 12*a* is not particularly limited, and generally comprises a textile substrate. Examples of textile substrates include, for example, hard backed or cushion backed textile substrates. The textile substrate can comprise, for example, textile fibers defining a fibrous face, a primary backing to which the textile fibers are secured, and a secondary backing secured to the primary backing. The term "textile substrate" can relate to, for example, a woven fabric, a knitted fabric, a nonwoven fabric, an upholstery fabric, a tufted carpet, or a piled carpet (e.g., cut piled), a pile and loop carpet, any of which can be formed from natural and/or synthetic fibers. In addition to a textile substrate (e.g., layer 12*a*), for example, other carpet layers can optionally be included, such as a backing layer, a secondary backing layer, any other polymer layer in a carpet structure (such as an intermediate layer, strengthening layer, polymer layer, and the like). Besides optional virgin thermoplastic material, other ingredients can be present along with optional recycled or reclaimed material to form any carpet layer, such as one or more of a textile substrate, a backing layer, or an intermediate layer. These additional ingredients may comprise, for example, inorganic fillers, resins, plasticizers, stabilizers, foaming agents, and/or blowing agents, and the like. The use and amount of any one of these ingredients can be the same as conventionally used by those skilled in the art in forming such carpet layers. In some examples of manufacturing the carpet tile, the substrate material (e.g., VCT, LVT, or rubber material) can be punched to the desired sizes, then the punched substrate tiles can be edge profiled, and then similarly dimensioned pieces of carpet layer can be attached to a surface of the punched and edge profiled substrate tiles to provide a laminate product tile. For example, substrate tiles punched to 12 inch squares can be edge profiled, and then can have a carpet layer piece in similar 12 inch square dimensions laminated thereon. The carpet tiles can have square shapes, or other rectangular shapes, e.g., shapes wherein one pair of opposite sides has a different length than the other pair of opposite sides.

The present invention further relates to a floor formed by connecting two or more floor planks together using the mechanical lock system of the present invention. The present invention further relates to a method of connecting various pieces of floor plank together to form a surface covering. An advantage of the present invention is that one does not need to lift previously connected pieces in order to install a new piece which can be very typical with many laminate flooring profiles. With the present invention, the long edge (or side) or the short edge (or side) can be installed first without any problem or need to lift or move a previously-installed flooring plank. Furthermore, with the present invention, if a plank is mis-installed for any reason or if the floor needs to be lifted, the planks can be separated from each other using some pull force, but the floors can be reconnected and essentially maintain the same connecting strength that previously existed.

The present invention includes the following aspects/embodiments/features in any order and/or in any combination:

1. The present invention relates to a floor plank comprising:
   a resilient composite sheet having four sides, an upper surface, a lower surface, and an overall thickness, and said composite sheet comprising at least one base layer, wherein said at least one base layer comprising at least one polymeric material and at least one filler,
   wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and
   having at least one of the following features:
   (a) wherein said first tongue having a first tongue length (TL) measured between the first side of the composite sheet and a distal end of the first tongue, wherein the ratio of the first tongue length (TL) to the composite sheet overall thickness (CSt) is at least about 1.5,
   (b) wherein said composite sheet having a first pair of opposing sides comprising said first and second sides that are shorter than a second pair of opposing sides extending between the first pair of sides, wherein the second pair of sides comprise a third side and a fourth side, wherein said first groove on said second side is defined between a first flange extending along a first edge of the composite sheet and protruding from said second side of the composite sheet and a second flange extending along an opposite second edge of the composite sheet and protruding from said second side of the composite sheet, wherein the second flange comprises an interference that projects in a direction toward a horizontal plane of the upper surface of the composite sheet and includes an inclined inner surface defining part of the first groove, wherein said first groove being defined between said first and second flanges and opening toward the horizontal plane of the upper surface of the composite sheet, wherein a locking angle defined between said inclined inner surface of the interference of the second flange and a horizontal plane parallel to the lower surface of the composite sheet is from about 55° to about 65°, and wherein said plank having a flexural force at 0.3" (pli), as determined according to Modified ASTM D790, of 1±0.35, and/or
   (c) wherein said first groove on said second side is defined between a first flange extending along a first edge of the composite sheet and protruding from said second side of the composite sheet and a second flange extending along an opposite second edge of the composite sheet and protruding from said second side of the composite sheet, wherein said first groove includes a groove bottom portion and a minimum groove thickness (Tg) is defined between said groove bottom portion and a horizontal plane of the lower surface of the composite sheet, and the second flange comprises an interference having a first height (H) that projects in a direction toward a horizontal plane of the upper surface of the composite sheet, and said first tongue comprises a member having a minimum thickness (Tt) extending from the first side, and a distal end of said tongue includes a downward extending projection comprising a tongue underside and having a second height (H') from the member, wherein Tg and Tt are within ±24% of each other and H and H' are within ±7% of each other, and wherein a tongue tip thickness (Tt') is defined as a shortest vertical distance between the horizontal plane of the upper surface of the composite sheet and the tongue underside, wherein Tg/Tt' is from about 0.35 to about 0.82.

2. The plank of any preceding or following embodiment/feature/aspect, wherein H and H' are within ±5% of each other.

3. The plank of any preceding or following embodiment/feature/aspect, wherein the composite comprises a laminate comprising a print design located above said at least one base layer.

4. The plank of any preceding or following embodiment/feature/aspect, further comprising at least one wear layer on top of the printed design.

5. The plank of any preceding or following embodiment/feature/aspect, wherein said printed design simulates the appearance of natural wood, stone, or brick.

6. The plank of any preceding or following embodiment/feature/aspect, including (a) wherein the ratio of the first tongue length to the composite sheet overall thickness is from about 1.5 to about 2.0.

7. The plank of any preceding or following embodiment/feature/aspect, including (a) wherein the ratio of the first tongue length to the composite sheet overall thickness is from about 1.7 to about 1.9.

8. The plank of any preceding or following embodiment/feature/aspect, including (a) wherein said plank having a flexural force at 0.3" (pli), as determined according to Modified ASTM D790, of 1±0.35, 9. The plank of any preceding or following embodiment/feature/aspect, wherein the groove bottom portion is inclined at a nonzero angle relative to a horizontal plane of the lower surface of the composite sheet, and said second flange comprises a groove lip landing inclined at a nonzero angle relative to a horizontal plane of the lower surface of the composite sheet, and said tongue comprises a tongue underside inclined at a nonzero angle relative to a horizontal plane of the upper surface of the composite sheet.

10. The plank of any preceding or following embodiment/feature/aspect, wherein said first flange comprises a deck overhang.

11. The plank of any preceding or following embodiment/feature/aspect, including (b) wherein said first pair of opposing sides having approximately equal first side lengths, and said second pair of opposing sides having approximately equal second side lengths, wherein the first side length is at least 10% shorter than the second side length.

12. The plank of any preceding or following embodiment/feature/aspect, including (b) wherein said first pair of opposing sides having approximately equal first side lengths, and said second pair of opposing sides having approximately equal second side lengths, wherein the first side length is at least 100% shorter than the second side length.

13. The plank of any preceding or following embodiment/feature/aspect, further including (c).

14. The plank of any preceding or following embodiment/feature/aspect, including (b) wherein the composite sheet further comprises a second tongue on said third side and a second groove on the opposite fourth side, wherein the second tongue and the second groove have complementary shape to each other to be interlockingly engageable with a corresponding groove or tongue on an adjacent floor plank.

15. The plank of any preceding or following embodiment/feature/aspect, wherein said second tongue having a second tongue length measured between the third side of the base layer and a distal end thereof, wherein the ratio of the second tongue length to the base overall thickness is at least about 1.5.

16. The plank of any preceding or following embodiment/feature/aspect, including (c) wherein said plank having a flexural force at 0.3" (pli), as determined according to Modified ASTM D790, of 1±0.35, 17. The plank of any preceding or following embodiment/feature/aspect, wherein said at least one base layer comprising polyvinyl chloride, at least one plasticizer, at least one inorganic filler, and at least one stabilizer.

18. The plank of any preceding or following embodiment/feature/aspect, wherein said at least one base layer comprises a VCT material, an LVT material, or a rubber material.

19. The plank of any preceding or following embodiment/feature/aspect, wherein said at least one base layer comprising from about 15 wt % to about 30 wt % polyvinyl chloride, from about 4 wt % to about 15 wt % plasticizer, from about 50 wt % to about 80 wt % filler, and from about 1 wt % to about 5 wt % stabilizer.

20. The plank of any preceding or following embodiment/feature/aspect, wherein said at least one base layer comprising a first base layer comprising polyvinyl chloride, plasticizer, inorganic filler, and stabilizer, and a second base layer attached to a lower surface of the first base layer wherein said second base layer comprising polyvinyl chloride, plasticizer, inorganic filler, and stabilizer, wherein said first base layer has a lower wt % polyvinyl chloride than said second base layer, said first base layer has a lower wt % plasticizer than said second base layer, said first base layer has a higher wt % inorganic filler than said second base layer; and said first base layer has a lower wt % stabilizer than said second base layer.

21. The plank of any preceding or following embodiment/feature/aspect, wherein said composite sheet has a thickness of from about 3 mm to about 5 mm, a width of from about 5 cm to about 30 cm, and a length of from about 30 cm to about 130 cm.

22. The plank of any preceding or following embodiment/feature/aspect, further including (c), wherein the plank comprises a luxury vinyl tile (LVT)-based composite structure, wherein Tg/Tt' is from about 0.60 to about 0.82.

23. The plank of any preceding or following embodiment/feature/aspect, further including (a) and (c), wherein the plank comprises a vinyl composition tile (VCT)-based composite structure, wherein TL/CSt is at least about 2.0, Tg and Tt are within ±5% of each other, H and H' are within ±5% of each other, and Tg/Tt' is from about 0.35 to about 0.62.

24. The plank of any preceding or following embodiment/feature/aspect, wherein said plank further comprises a carpet layer.

25. The plank of any preceding or following embodiment/feature/aspect, wherein the opposite sides of the composite sheet further define a grout groove when the first tongue and the first groove, having complementary shape to each other, are interlockingly engaged on an adjacent floor plank.

26. A plank comprising:

a resilient composite sheet having four sides, an upper surface, a lower surface, and an overall thickness, and said composite sheet comprising at least one base layer and a print design located above said at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank to have a first pull strength (pli)-to-overall thickness (mm) ratio of at least 2.

27. The plank of any preceding or following embodiment/feature/aspect, wherein the first pull strength (pli)-to-overall thickness (mm) ratio is at least 2.5.

28. The plank of any preceding or following embodiment/feature/aspect, wherein the first pull strength (pli)-to-overall thickness (mm) ratio is from about 2.75 to about 4.

29. The plank of any preceding or following embodiment/feature/aspect, wherein said composite sheet having a first pair of opposing sides comprising the first side and the second side and a second pair of opposing sides extending between the first pair of sides wherein the second pair of sides comprise a third side and a fourth side, wherein said first pair of opposing sides are shorter than the second pair of opposing sides, wherein the composite sheet further comprises a second tongue on the third side and a second groove on the opposite fourth side, wherein the second tongue and second groove have complementary shape to each other to be interlockingly engageable with a corresponding groove or tongue on an adjacent floor plank providing a second pull strength (pli)-to-overall thickness (mm) ratio of at least 2.

30. The plank of any preceding or following embodiment/feature/aspect, wherein the second pull strength (pli)-to-overall thickness (mm) ratio is from about 2.75 to about 4.5

31. The plank of any preceding or following embodiment/feature/aspect, wherein said first pair of opposing sides having approximately equal first side lengths, and said second pair of opposing sides having approximately equal second side lengths, wherein the first side length is at least 85% shorter than the second side length.

32. The plank of any preceding or following embodiment/feature/aspect, wherein said plank having a flexural force at 0.3" (pli), as determined according to Modified ASTM D790, of 1±0.35, 33. A surface covering plank:

a resilient composite sheet having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank to have a first pull strength (pli)-to-overall thickness (mm) ratio of at least 2, and having at least one of the following features:

(a) wherein said first tongue having a first tongue length measured between the first side of the composite sheet and a distal end thereof, wherein the ratio of the first tongue length to the composite sheet overall thickness is at least about 1.5, (b) wherein said composite sheet having a first pair of opposing sides comprising said first and second sides that are shorter than a second pair of opposing sides extending between the first pair of sides, wherein the second pair of sides comprise a third side and a fourth side, wherein said first groove on said second side is defined between a first flange extending along a first edge of the composite sheet and protruding from said second side of the composite sheet and a second flange extending along an opposite second edge of the composite sheet and protruding from said second side of the composite sheet, wherein the second flange comprises an interference that projects in a direction toward a horizontal plane of the upper surface of the composite sheet and includes an inclined inner surface defining part of the first groove, wherein said first groove being defined between said first and second flanges and opening toward the horizontal plane of the upper surface of the composite sheet, wherein a locking angle defined between said inclined inner surface of the interference of the second flange and a horizontal plane parallel to the lower surface of the composite sheet is from about 55° to about 65°, and wherein said plank having a flexural force at 0.3" (pli), as determined according to Modified ASTM D790, of 1±0.35, and/or (c) wherein said first groove on said second side is defined between a first flange extending along a first edge of the composite sheet and protruding from said second side of the composite sheet and a second flange extending along an opposite second edge of the composite sheet and protruding from said second side of the composite sheet, wherein said first groove includes a groove bottom portion and a minimum groove thickness (Tg) is defined between said groove bottom portion and a horizontal plane of a lower surface of the composite sheet, and the second flange comprises an interference having a first height (H) that projects in a direction toward a horizontal plane of the upper surface of the composite sheet, and said first tongue comprises a member having a minimum thickness (Tt) extending from the first side, and a distal end of said tongue includes a downward extending projection comprising a tongue underside and having a second height (H') from the member, wherein Tg and Tt are within ±24% of each other and H and H' are within ±7% of each other, and wherein a tongue tip thickness (Tt') is defined as a shortest vertical distance between the horizontal plane of the upper surface of the composite sheet and the tongue underside, wherein Tg/Tt' is from about 0.35 to about 0.82.

34. The plank of any preceding or following embodiment/feature/aspect, wherein H and H' are within ±5% of each other.

35. The plank of any preceding or following embodiment/feature/aspect, wherein the composite comprises a laminate comprising a print design located above said at least one base layer.

36. The plank of any preceding or following embodiment/feature/aspect, further comprising at least one wear layer on top of the printed design.

37. The plank of any preceding or following embodiment/feature/aspect, including (a) wherein said plank having a flexural force at 0.3" (pli), as determined according to Modified ASTM D790, of 1±0.35.

38. The plank of any preceding or following embodiment/feature/aspect, including (c) wherein said plank having a flexural force at 0.3" (pli), as determined according to Modified ASTM D790, of 1±0.35, 39. A floor comprising a plurality of the planks of any preceding or following embodiment/feature/aspect joined together 40. A floor comprising a plurality of the planks of any preceding or following embodiment/feature/aspect joined together to prevent horizontal movement of the floor planks in two directions that are perpendicular to each other and wherein said two directions are parallel to the plane of the upper surfaces of said floor planks.

41. The floor of any preceding or following embodiment/feature/aspect, wherein said floor is a floating floor.

42. A floor comprising a plurality of the planks of any preceding or following embodiment/feature/aspect joined together.

43. The floor of any preceding or following embodiment/feature/aspect, wherein said floor is a floating floor.

44. A surface covering plank comprising:

a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and said first groove is defined by a) at least a groove landing lip that has rounded corners, b) a groove interference wall having an upper edge and lower edged that are rounded, and said first tongue is defined by a) tongue distal end that has an underside that is slanted or sloped relative to the planar upper surface, b) by a tongue recess wall that is unsloped or sloped or slanted relative to the planar upper surface and having rounded corners, c) by said tongue distal end have an upperside that is slanted or sloped relative to the planar upper surface wherein the upperside and underside are separated by a tongue distal edge surface that has an upper and lower rounded corners, and wherein upperside has an angle of slope that is 25 to 50 times greater than an angle of slope for said underside.

45. A surface covering plank comprising:

a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove having a groove deck on the opposite second side, wherein the first tongue and first groove have complementary shape to each other to be interlockingly engageable with a corresponding groove or tongue on an adjacent floor plank, and wherein when said first tongue is interlockingly engaged with said corresponding groove on said adjacent floor plank, a first clearance exists between i) a tongue distal end having an upperside that is slanted or sloped relative to the planar upper surface and ii) a groove deck of said corresponding groove, and a second clearance exists between i) a distal edge of the lower lip of said corresponding groove and the tongue channel wall.

46. The surface covering plank of any preceding or following embodiment/feature/aspect, wherein said second clearance extends to at least a portion of the underside of the tongue distal end.

47. The surface covering plank of any preceding or following embodiment/feature/aspect, wherein said second clearance extends to a groove interference wall.

48. The surface covering of plank of any preceding or following embodiment/feature/aspect, further comprising a third clearance located between said first clearance and said second clearance.

49. A surface covering plank comprising:

a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and wherein said tongue and said groove each have at least one flexible portion that flexes during mechanical locking into a respective corresponding groove or tongue on said adjacent floor plank.

50. The surface covering plank of any preceding or following embodiment/feature/aspect, wherein said flexible portion is located at a groove deck of said groove and located at said tongue at the downward facing recess.

51. The surface covering plank of any preceding or following embodiment/feature/aspect, wherein said flexible portion is located at groove landing.

52. The surface covering plank of any preceding or following embodiment/feature/aspect, further comprising a flexible portion that is located at the groove landing.

53. A surface covering plank comprising:
a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler,
wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and
wherein said tongue has a tongue tip cross-sectional area that is from 8% to 20% of the entire cross-sectional area of said tongue.

54. A surface covering plank comprising:
a resilient composite sheet that is flexible and having an overall thickness of 5 mm or less, and having a planar upper surface, and having four sides, an upper surface, a lower surface, and an overall thickness, and said composite sheet comprising at least one base layer, wherein said at least one base layer comprising at least one polymeric material and at least one filler,
wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank, and
wherein said tongue has a tongue tip cross-sectional area and said groove has a groove deck cross-sectional area, wherein the tongue tip cross-sectional area and said groove deck cross-sectional area is within 15% of each other.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES

Example 1

Various floor planks of the present invention were made having a square edge design such as illustrated in FIG. 16.

The formulations are set forth in Tables 1 and 2 below. An LVT design is illustrated in this example. The plank is formed as two sheets with two base layers provided in a first sheet and a third base layer used as a second sheet that is consolidated with the first sheet in forming the plank. Rectangular shaped pieces with flat edges on all four sides having the dimensions, or slightly larger dimensions, as indicated for planks 1 and 2 in Table 1 are punched out from the consolidated sheet.

Planks formed with these formulations and constructions are milled to have edge profiles on the width and longitudinal sides have tongue and groove profiles such as shown in FIG. 16 herein, wherein Tg=0.061 inch, H=0.037 inch, Tt=0.054 inch, Tt'=0.089 inch, H'=0.037 inch, Tg/Tt'=0.685, CSt=0.158 inch (4.0 mm), TL=0.270 inch, and TL/CSt=1.71. Equipment for imparting the edge profiles include, for example, the machines indicated herein.

TABLE 1

| | Thickness of each layer in mm | | | | | |
|---|---|---|---|---|---|---|
| Plank#: dimensions | AlOx-PU Protective Layer | Clear Wear Layer | Print Layer | 1$^{st}$ Base Layer | 2nd Base Layer | 3$^{rd}$ Base Layer |
| #1: 5" × 48" × 4 mm | 0.04 mm | 0.4 mm | 0.07 mm | (#1) 0.8 mm | (#2) 0.8 mm | (#3) 1.95 mm |
| #2: 4" × 36" × 4 mm | 0.04 mm | 0.1 mm | 0.07 mm | (#1) 0.95 mm | (#2) 0.95 mm | (#3) 1.95 mm |

TABLE 2

| | Formulations * | | |
|---|---|---|---|
| Ingredients | Base Layer #1 | Base Layer #2 | Base Layer #3 |
| PVC | 15%-20% | 25%-35% | 20%-30% |
| Plasticizer | 5%-10% | 5%-10% | 5%-10% |
| Filler | 65%-75% | 50%-60% | 60%-70% |
| Stabilizer | 1%-5% | 1%-5% | 1%-5% |

* all in wt %

A plank product was made for each plank size in Table 1 based on the formulations and layers in Tables 1 and 2 above, and the indicated tongue and groove edge profiles.

The first base layer and second base layer formulations each were prepared by Barbury mixing and each were then formed by 4 roll calendar rolling by slitting into 1 meter×1 meter size. Similarly, the third base layer was prepared with the third base layer formulation and then formed by calendar rolling using the same conditions.

Then, a first sheet was formed as a composite structure by putting the first base layer on top of the second base layer, and putting a print décor layer on top, wherein the print décor layer in this example had the print design of a wood board and then a wear layer overlay of clear PVC film was added. The décor layer was formed of a printed PVC film. Then, the various layers forming the first sheet were put in a hydraulic press with an embossing plate with the embossing side facing the décor layer. One press operation can normally press out multiple panels with the same three other first sheets, each layer of sheets is separated by an embossing plate. Then, the various first sheets were pressed through a hydraulic press at a temperature of from about 125° C. to 135° C. with a pressure of 4 to 18 MPa for about 60 seconds. Then, the consolidated first sheets were annealed at a temperature of from 125° C. to about 135° C. for about 1 minute. Then, the first sheets were aged in ambient conditions (25° C.) for 72 hours and then punched into plank sizes having a length of 48" or 36" and a width of 5" or 4". A second sheet comprising the third base layer was made in the same manner with the same conditions as the first sheet but without the décor layer. The second sheet was then punched out into the projections and cut-outs that match the dimensions of the first sheet. Then, pressure sensitive adhesive was applied to the surface of the first sheet and the second sheet was then applied in register and cold-pressed at a pressure of about 50 kg for 24 hours. Then, a UV protective layer having aluminum oxide wear resistant particles was applied onto the embossed wear layer.

The side edges of the resulting composite sheet were milled to impart the indicated tongue and groove profiles. The floor planks had the properties previously described.

Example 2

A floor plank of the present invention was made having the square edge design such as illustrated in FIG. 37.

The formulation is set forth in Tables 3 and 4 below. A VCT design is illustrated in this example. The plank is formed as a single sheet. Rectangular shaped pieces with flat edges on all four sides having the dimensions, or slightly larger dimensions, as indicated for planks 3 and 4 in Table 3 are punched out from the consolidated sheet.

Planks formed with these formulations and constructions are milled to have edge profiles on the width and longitudinal sides have tongue and groove profiles such as shown in FIG. 37 herein, wherein CSt=0.122 inch (3.1 mm), Tg=0.041 in., Tg(maximum)=0.048 in., H=0.037 in., Dg=0.015 in., angle $\theta$=28°, $\theta_5$=30.29°, angle $\alpha_2$=2.29°, angle $\alpha_3$=2.00°, angle $\alpha_5$=5.00°, angle $\beta$=63.10°, G1=0.274 in., G4=0.085 in., G6=0.080 in., G7=0.052 in., H=0.037 in., Tt=0.040 in., Tt'=0.073 in., Tg/Tt'=0.56, H'=0.037 in., TL=0.337 in., TL/CSt=2.76, T1=0.055 in., T2=0.015 in., Tt (max)=0.042 in., $\alpha_4$=2.00°, $\alpha_1$=2.00°, angle $\theta_1$=27.59°, angle $\theta_2$=25.59°, angle $\theta_3$=62.00°, and angle $\theta_4$=95.00°. Equipment for imparting the edge profiles include, for example, the machines indicated herein.

TABLE 3

| Plank #: dimensions | Overlay Layer | Single Base Layer |
|---|---|---|
| #3: 5" × 48" × 3.1 mm | None | 3.1 mm |
| #4: 4" × 36" × 3.1 mm | None | 3.1 mm |

TABLE 4

| Formulation | |
|---|---|
| Ingredients | Single Base Layer, amt. in wt %. |
| PVC | 10%-20% |
| Plasticizer | 5%-15% |
| Filler | 70%-90% |
| Stabilizer | 1%-3% |
| Pigments | 0.1%-2% |

A plank product was made for each plank size in Table 3 based on the formulations and layers in Tables 3 and 4 above, and the indicated tongue and groove edge profiles. All component amounts indicated in Table 4 are weight percentages.

A single base layer formulation was prepared by Barbury mixing and dropped into two roll mill to form a sheet; a pre-determined ratio of multi-color chips with similar formulation as described above were added into the background color sheet to form multi-color blended sheet. Sheet was cooled down and then broken into granulates with a size of 25.4 mm to 0.149 mm by the size reduction equipment, such as Hammer mill or granulator. These chips were then fed into multiple sets of calendar rollers to gradually reduce the thickness to the target. The sheet is then annealed to eliminate any induced stress from the process that can result in some dimensional changes in service. The sheet can be punched or slit into plank size.

The side edges of the resulting composite sheet were milled to impart the indicated tongue and groove profiles. The floor plank had the properties previously described.

Example 3

Non-grouted VCT floor tiles were made as 3 mm (CSt) tiles, which had the profiled edge design and dimensions shown in FIG. 12 and described herein. For these tiles, the VCT material was modified to include a higher level of vinyl material in the composition than the formulation shown in Example 2, and were punched into 16 inch×16 inch square-shaped tiles in one production run, and 12 inch×12 inch square-shaped tiles in another production run, but otherwise the manufacture of the tiles was substantially similar to that described for the VCT material of Example 2.

The formulation of the VCT material used for this example is shown in Table 5. All component amounts indicated in Table 5 are weight percentages.

TABLE 5

| Formulation | |
|---|---|
| Ingredients | Single Base Layer, amt. in wt %. |
| PVC | 25%-28% |
| Plasticizer | 10%-23% |
| Filler | 55%-80% |
| Stabilizer | 1%-3% |
| Pigments | 0.1%-2% |

The tile products were easily installable and formed strong joints. The floor tiles had the properties previously described.

Example 4

Non-grouted LVT floor tiles were made as 4 mm (CSt) tiles, which had the profiled edge design and dimensions shown in FIG. 13 and described herein. The LVT material had a construction and was manufactured substantially similar to the LVT material of Example 1 other than the print décor layer in this example had the print design of a stone surface and the LVT material was punched into square shaped tiles. The tiles were punched into 16 inch by 16 inch sizes. The tile products were easily installable and formed strong joints. The floor tiles had the properties previously described.

Example 5

Grouted LVT floor tiles were made as 4 mm (CSt) tiles, which had the profiled edge design and dimensions shown in FIG. 15 and described herein. The LVT material had a construction and was manufactured substantially similar to the LVT material of Example 1 other than the print décor layer in this example had the print design of a stone surface and the LVT material was punched into square shaped tiles. The tiles were punched into 16 inch by 16 inch sizes. Channel halves were cut into upper edge portions of the tongue and groove sides of each tile, such as shown in FIG. 15. A pre-cut 0.25 inch wide, 0.040 inch deep channel above the joint was defined when the tiles were joined along the profiled edges. The tile products were easily installable and formed strong joints, and defined a grout channel above the joint of the mating surfaces. The floor tiles had the properties previously described.

Example 6

Figure 62:
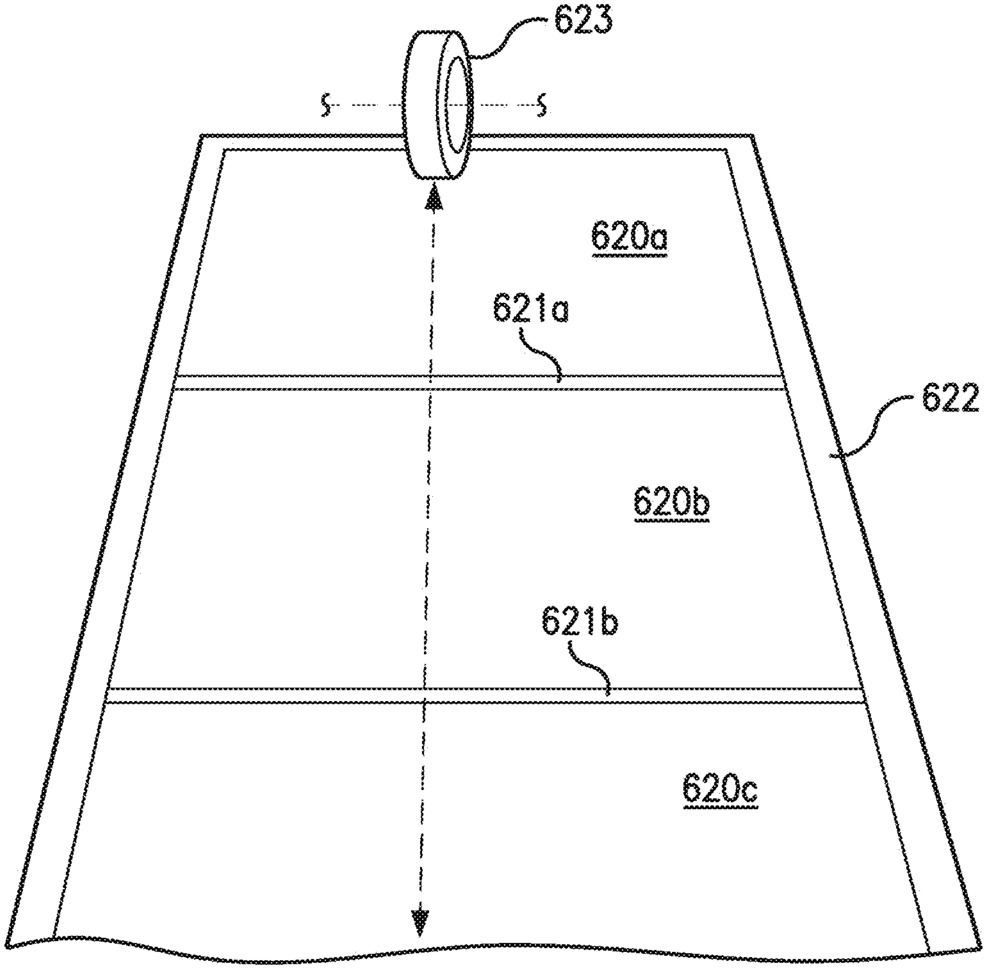

Grouted LVT floor planks were made as 4 mm (CSt) planks, which had the profiled edge design and dimensions shown in FIG. 15 and described herein. The LVT material had a construction and was manufactured substantially similar to the LVT material of Example 1. The planks were punched into rectangular shapes as in Example 1. Channel halves were cut into upper edge portions of the tongue and groove sides of each plank, such as shown in FIG. 15. A pre-cut 0.25 inch wide, 0.040 inch deep channel above the joint was defined when the planks were joined along the profiled edges. Conventional grout material was easily applied into the channel. Following application of the grout material, no separation between grout and plank edges was observed after a 24 hour cure. At least three of the grouted and mated planks were securely fastened with adhesive tape at their border edges areas to a generally flat stable surface, then subjected to rolling caster load across the planks. The mated plank sample was then subjected to rolling load with 160 pounds (lbs) weight. The rolling load was rolled across and back all the planks and grout channels and back for each cycle. The general testing conditions are illustrated in FIG. 62 (tiles: 620*a-c*, grouted channels 621*a-b*, adhesive tape: 622, load roller caster: 623). No grout or joint failure was detected after 7,477 cycles. The test was terminated prior to any failure. The test cycle count result was well beyond any expectations.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A surface covering plank comprising:

a composite sheet having an overall thickness of 5 mm or less, and having a planar upper surface, four sides, and a lower surface, the composite sheet comprising at least one base layer, wherein the at least one base layer comprises at least a homogenous blend of a thermoplastic polymeric material and a filler in sheet form, wherein opposite sides of the composite sheet comprise a first tongue on a first side and a first groove on the opposite second side, wherein the first tongue and the first groove have complementary shapes to each other to be interlockingly engageable at a joint seam with a corresponding groove or tongue on an adjacent floor plank, and wherein an uppermost surface of the surface covering plank ends at a vertical line intersecting a lowermost edge of the first groove, wherein the first tongue extends outwardly from the surface covering plank beyond the vertical line intersecting the lowermost edge of the first groove, and wherein the first tongue has a tongue tip extending from the vertical line with a tongue tip cross-sectional area that is from 8 percent to 20 percent of an entire cross-sectional area of the first tongue.

2. The surface covering plank as claimed in claim 1, wherein said at least one base layer comprises from about 50 wt % to about 90 wt % filler.

3. The surface covering plank as claimed in claim 1, wherein the filler is one or more of limestone, clay, talc, silicates, and aluminates.

4. The surface covering plank as claimed in claim 3, wherein the filler is in the form of particles.

5. The surface covering plank as claimed in claim 1, wherein said at least one base layer comprises a stabilizer.

6. The surface covering plank as claimed in claim 1, wherein the molecular weight of the polymeric material is from 10,000 to 1,000,000, based on weight average molecular weight.

7. The surface covering plank as claimed in claim 1, further comprising a print layer with a printed design.

8. The surface covering plank as claimed in claim 7, wherein the print layer is a PVC film.

9. The surface covering plank as claimed in claim 7, further comprising at least one wear layer on top of the print layer.

10. The surface covering plank as claimed in claim 7, wherein the printed design simulates the appearance of natural wood, stone, or brick.

11. The surface covering plank as claimed in claim 7, wherein the upper surface comprises a textural or embossed surface.

12. The surface covering plank as claimed in claim 11, wherein the embossed surface is registered with the print design.

13. The surface covering plank as claimed in claim 5, wherein the stabilizer is zinc-calcium and/or epoxidized soybean oils.

14. The surface covering plank as claimed in claim 1, wherein the filler is an inorganic filler.

15. The surface covering plank as claimed in claim 14, wherein the thermoplastic polymeric material is a polyvinyl chloride.

16. The surface covering plank as claimed in claim 1, wherein the tongue tip cross-sectional area is from 10 percent to 15 percent of the entire cross-sectional area of the first tongue.

17. The surface covering plank as claimed in claim 1, wherein the tongue tip cross-sectional area is from 10 percent to 18 percent of the entire cross-sectional area of the first tongue.

* * * * *